(12) United States Patent
Alda

(10) Patent No.: US 10,489,373 B1
(45) Date of Patent: Nov. 26, 2019

(54) METHOD AND APPARATUS FOR GENERATING UNIQUE HEREDITARY SEQUENCES AND HEREDITARY KEY REPRESENTING DYNAMIC GOVERNING INSTRUCTIONS

(71) Applicant: Genetic Internet, Inc., Cambridge, MA (US)

(72) Inventor: John Alda, Cambridge, MA (US)

(*) Notice: Subject to any disclaimer, the term of this patent is extended or adjusted under 35 U.S.C. 154(b) by 612 days.

(21) Appl. No.: 15/148,427

(22) Filed: May 6, 2016

Related U.S. Application Data

(60) Provisional application No. 62/199,594, filed on Jul. 31, 2015, provisional application No. 62/158,824, filed on May 8, 2015.

(51) Int. Cl.
*G06F 16/23* (2019.01)
*G06F 16/25* (2019.01)
*G06F 16/951* (2019.01)

(52) U.S. Cl.
CPC ............ *G06F 16/23* (2019.01); *G06F 16/258* (2019.01); *G06F 16/951* (2019.01)

(58) Field of Classification Search
None
See application file for complete search history.

(56) References Cited

U.S. PATENT DOCUMENTS

| | | | | |
|---|---|---|---|---|
| 6,700,677 B1* | 3/2004 | Onodera | ............... | G06F 21/12 358/1.14 |
| 7,383,270 B1* | 6/2008 | Kostamaa | ......... | G06F 17/30501 707/693 |
| 8,073,259 B1* | 12/2011 | Jin | ....................... | G06K 9/6211 382/190 |
| 8,674,993 B1* | 3/2014 | Fleming | ................. | G06Q 40/06 345/440 |
| 9,646,260 B1* | 5/2017 | Tunstall-Pedoe | .... | G06N 99/005 |
| 2007/0043708 A1* | 2/2007 | Tunstall-Pedoe | .......................... | G06F 17/30654 |
| 2007/0055656 A1* | 3/2007 | Tunstall-Pedoe | .......................... | G06F 17/30654 |
| 2009/0112905 A1* | 4/2009 | Mukerjee | .......... | G06F 17/30625 |
| 2011/0119310 A1* | 5/2011 | Kolovski | .......... | G06F 17/30507 707/794 |
| 2011/0289108 A1* | 11/2011 | Bhandari | .......... | G06F 17/30905 707/769 |
| 2017/0116284 A1* | 4/2017 | Champaneria | .... | G06F 17/30864 |

OTHER PUBLICATIONS

Dunne, "Scientists Can Now Store Digital Images in DNA," published on Apr. 11, 2016. Retrieved from the internet on Sep. 13, 2016 at http://hyperallergic.com/289715/scientists-can-now-store-digital-images-in-dna/.

* cited by examiner

*Primary Examiner* — Richard L Bowen
(74) *Attorney, Agent, or Firm* — Morse, Barnes-Brown & Pendleton, P.C.; Sean D. Detweiler, Esq.

(57) ABSTRACT

A computer implemented method and apparatus for use in conjunction with mobile, desktop, server devices, Internet-based applications and websites including one or more heuristics for generating a unique hereditary sequence, hereditary key, and hereditary network representing dynamic governing instructions, for a search term, dictionary term, alphabetic letter, number, entity, person, object, computer, mobile device, class, ontology, taxonomy, image, video, document or website.

23 Claims, 24 Drawing Sheets

METHOD AND APPARATUS FOR GENERATING UNIQUE HEREDITARY SEQUENCES AND HEREDITARY KEY REPRESENTING DYNAMIC GOVERNING INSTRUCTIONS

CROSS-REFERENCE TO RELATED APPLICATION(S)

This application claims priority to, and the benefit of, U.S. Provisional Application 62/158,824, filed on May 8, 2015 and U.S. Provisional Application 62/199,594, filed on Jul. 31, 2015, for all subject matter common to all applications. The disclosures of said provisional applications are hereby incorporated by reference in their entirety.

FIELD OF THE INVENTION

The present invention is capable of interaction with the Internet, Word Wide Web, Hidden Web, Internet search, social media, web advertising, Internet copyright, digital file networking and information networking. In particular, the present invention relates to a system and method for generating hereditary media files, encoding, or embedding digital media files with hereditary sequences and hereditary keys and providing a heuristic approach for searching and locating digital media files using a hereditary ontology associated with hereditary sequences and hereditary keys.

BACKGROUND

Generally, the Internet is a global network of computers that include websites, servers and data stores. The Domain Name Service (DNS) directs Internet traffic to the appropriate websites, email servers and related machines. DNS is a hierarchical database containing the relationship of a given Internet Protocol (IP) address and it's corresponding website Uniform Resource Locator (URL). The World Wide Web (WWW) enables billions of commercial, social and intellectual transactions per day. The Hidden Web represents the data and websites that exist outside the reach or interest of conventional search engines. The Internet Stack represents a layered protocol model. DOM (Document Object Model) is the hierarchical model related to the structure of a web page. Hypertext Markup Language (HTML) is the language or code used to design and create webpages including placement of images, videos, documents and links on a particular webpage. Meta-data (or Meta tag) is HTML code that quite limited and does not provide a comprehensive detail of the content, images and videos of a web page.

Conventional search engines are used to search for information on the WWW, including digital media files stored throughout the WWW (e.g., on webpages). Conventional search engines operate by web crawling HTML markup pages for webpages, indexing the data resulting from the web crawling (e.g., meta-data), and searching the indexed data (e.g., using a combination of searching algorithms). Prior to the present invention, searching for digital media files is limited to the use of these conventional search engines since an Internet classification system does not exist for Internet-based information: websites, video files, audio files, and digital media files within websites.

In the context of the Internet, digital media files (e.g., images, videos, audio, etc.) are positioned on a webpage using HTML tags (e.g. <img src="image_file1.jpg"> and in some cases <embed src="audio_file1.mp3">). Accordingly, digital media files do not reside on a webpage, but represent a hyperlink to the binary image, video or document on the sever file-system. For example, in HTML and website design, digital media files are external to their relative web pages (e.g., stored on a server of a web host). When a web user accesses the above noted digital media files by visiting a webpage, the image, movie and/or audio files are transferred to the cache folder of the user's web browser and computer from the external source. Therefore, digital media files exist independently of their respective websites. In the context of computer devices, such as a computer desktop, server, and mobile devices, digital media files are binary and inert. Accordingly, digital media files become useful only when opened and edited within their associated applications, e.g. Microsoft Word (DOC), Adobe Acrobat (PDF) or Adobe Photoshop (JPG, PNG; among others).

Digital media files can include, but are not limited to Hypertext Markup Language (HTML) web pages (.html), Portable Document Format (PDF), Adobe Illustrator (.AI), Adobe Photoshop (.PSD), Word Documents (.DOC), Text Editor (TXT, RTF), Computer Aided Design (CAD); and image files, JPEG/JPG, PNG, GIF, BMP, TIFF; and video files, MOV, AVI, MPEG, MP4; and audio files, MP3, AU, AIFF and WAV. Digital media files include meta-data to provide additional information to search engines and other applications about the content of the digital media files. Meta-data is information about a file contained within the file. The form, content and extent of meta-data is determined by the file format, e.g. PDF, JPG, .DOC. Meta-data does not contain "instructions" related to Internet search, web advertising, pricing, commercial licensing, copyright revocation settings, image recognition, file networking, broadcasting or self-organization. The meta-data of a given digital media file is not networked with other files or to a global (meta-data) database, Internet database, Internet classification system, Internet ontology, or phylogenetic structure. The classification of files and file meta-data is commercially desired by search engines, information designers and advertisers; it would be useful in organizing the digital media files on the Internet, their copyright ownerships, subject matter, copyright licensing and advertising in relation to all other files on the Internet. However, meta-data is static and inert. Meta-data does not automatically enrich itself heuristically based on information or knowledge gained from additional Internet content, searches of the Internet or interaction with an Internet classification system.

For example, JPG files provide meta-data in form of extended information or Exchangeable image file format (EXIF). EXIF meta-data provides information related to the geographic information system (GIS) of the photo, shutter speed, ISO settings, and related technical specifications. The EXIF does not contain information about the subject of the photo unless explicitly established by the user. The EXIF does not organize the file into a global ontology; thereby, relating the file to all other files on the Internet in an organized format and does not allow the JPG to network with other JPG's, (e.g., with images or documents of similar subject matter). Additionally, EXIF does not contain instructions for search engines ("search"), advertising and copyright. Similarly, the meta-data for other digital media files (e.g., PDF's, MP3's, MOV's etc.) are limited to technical specifications of the file and do not contain instruction for search, advertising, and copyright. For example, digital media files do not offer their associated copyright owners the ability to license or revoke content across the Internet, websites or computer desktops of users, globally. Moreover, digital media files on a computer desktop, server or website do not independently network, broadcast, or communicate with other files, servers, computers or mobile devices. Additionally, files cannot self-organize into an ontology, taxonomy, classification system, phylogenetic tree, or other organizational structure. Accordingly, in terms of the structure, point of view and processing of digital media files, the current programming dogma treats digital media files as external and separate from business logic, algorithms, applications, programs and webpages. This point of view dictates that a digital media file be controlled, manipulated and rendered as an inert object through code not contained within the file format itself, but by an external program, executable, method or module.

In response to shortcomings of search engines being able to identify information about the content of digital media files, web developers often generate algorithms in an effort to have digital media files appear more frequently and higher in web searches to generate more exposure for these digital media files. These algorithms can be simple, complex, or related to artificial intelligence. The input/output stream (reading and writing to a file), and manipulation of a file is executed by separate code not contained within the file itself. For example, using the C language an engineer can write a text string to a file using the following executable C code:
  f=fopen("file_a.txt", "a");
Using C++, an engineer can write a text string is as follows:
  ofstream myfile;
  myfile.open ("file_a.txt");
  myfile <<"Write the word Apple to the file.n";
  myfile.close( );
Using Java, an engineer can write a text string is as follows:
  public static void main(String[ ] args) throws IOException {
  File file=new File ("file_a.txt");
    PrintWriter printWriter=new PrintWriter ("file_a.txt");
    printWriter.println ("hello");
    printWriter.close ( );
Writing the above code for the "file_a.txt" can be labor intensive when writing similar code for each digital media file on a website. Additionally, the file does not independently search the Internet for similar content contained within itself [file_a.txt] to achieve richer content within the content of the file. Furthermore, JPG, PNG, MP3, MP4 files do not contain inherent logic or instructions, that govern their own behavior, their role, or classification in relation to other files on the Internet.

Existing web searching methodologies experience additional shortcomings. Specifically, in the majority of cases, meta-data does not contain information that is substantively useful to search engines, web users, web advertisers, or copyright holders. In particular, meta-data does not define or express the subject matter contained within the media files, e.g. words in a song (e.g., an MP3, WAV), people or places in a photo (e.g., a JPG/PNG), scenes in a film (e.g., an MP4, MPEG, AVI), words of a poem (e.g., a DOC), or technical terms within a scientific publication (e.g., a PDF) in a manner that is efficiently located by search engines.

Traditionally, code is required for a search engine to find a digital media files on the WWW. Similarly, code is required to display advertising and to provide meta-data about a web page. In aggregate, a significant amount of code is required for a website or image to be successfully accessed on the Internet. The need for code creates a labor intensive process to have digital media files found by search engines. Additionally, depending on the code and the received search terms, the search results returned by the search engines may not be all inclusive and/or accurate. As an example, a website containing Martin Luther King's, "I have a Dream Speech," which has a complex and inspiration narrative, may be summarized in an HTML meta tag as follows: <meta keywords="MLK I have a dream speech">. If a web user is searching for a particular phrase with the speech, the meta tag (e.g., metadata) is not useful in this instance of search.

Search engines address this issue by using a string tokenizer provided by programming languages, such as Java. A string tokenizer is a class, an application program interface (API), algorithm or method for recognizing individual words on a web page to index certain key words or phrases. Search engines rely upon HITML meta-data to determine the basic premise of a given website in the creation of a search index. Meta-data is the fundamental hindrance preventing search engines from generating rich search results. Search engines require enormous computing power in the form of hardware and algorithms to index the content on a given webpage that extends beyond its metadata. Specifically, search engines begin by interacting with the Domain Name Service (DNS) to locate websites by Internet Protocol (IP) address. Once a website is found, the content (web pages, images, videos) is copied to the servers of the search engines. The computer method for performing the above described task is referred to as a web spider or web bot.

The newly found websites files (web pages, images, videos) exist on the search engine's servers with very little meta-data describing the retrieved set of files (e.g., the meta-tag of the webpage, and the meta-data within the images, EXIF). Subject to very little information, the search engine uses a string tokenizer to parse the text of the related webpage and compare it with existing HTML meta-data and file meta-data EXIF. The files are processed by hundreds of specialized algorithms that attempt to collect information useful in classifying the website for use in a web search or web results. For example, some of the search engine algorithms address specific variables such as geographic location, rank, weight and context. As part of these algorithms, artificial intelligence (AI) plays an important role in attempting to create a relationship among disparate forms of Internet information. As part of this technical movement, Semantic Web is an extension of HTML moving toward machine-readable language. In a specific example, algorithms are used to process images and identify people within a photo or group of photos. Once the search engine has created a search index, a given website has its place in the index with no relationship to websites globally. Should the website have related results with the index, the relationships have been determined by many optimized algorithms designed by using data from past user searches. Search engines also provide features on top of, or while accessing, the search index via a search page. Such features include autocomplete and spell correction.

The central revenue stream of a search engine is keyword advertising, which also has its own set of shortcomings. Keyword advertising can include selection of keywords by an advertiser, bid/ask fees for each keyword paid by the advertiser, meta-tags with keywords on the advertiser website, advertising specific programming code (HTML/Javascript) advertiser website, and cookies. Advertising customers select keywords in the search engine advertising tool to design their marketing campaigns. In effect, the advertisers are guessing what a web user will type into a search engine. For example, a clothing store may select the keywords, "women's dresses." The clothing store pays a fee for using the keywords, "women's dresses," which is a determined by a bid/ask system similar to a stock exchange. Given the demand, the fees can be high in relation to their performance. The higher the bid, the more likely an advertisement will reach the top of the search results. After purchasing the keywords, the clothing store must author code for their website with advertising specific computer code and update their meta-tag with the keywords: "women's dresses." The clothing store's ultimate goal is that when a user types in "women's dresses" they are driven to the clothing store's website. This model is commonly referred to as a Pay-Per-Click model (PPC); however, there are many shortcomings with keyword advertising and PPC. An advertiser's budget is reduced by the price of each click. Not every click results in driving web traffic to a website such as the clothing store's website and not every click results in product sale for the clothing store. Click fraud is also present and can further cost the advertising customer without resulting in sales. The advertising customers must also add meta-tags and advertising code to their websites. Most importantly, the advertising customers are required to rely on users visiting the stated search engine that provides the keyword to advertisement relationship. The broader the keywords, such as "golf" or "insurance" the greater the audience reach. The narrower the keywords or brand specific keywords, the lower the audience reach. At present, search engines do not offer advertisers the ability to broadcast media (videos or graphical ads) to n number of websites or customers without using the keyword model.

Moreover, the cookie is an important tool within the keyword advertising model. The cookie file is related to the web browser and is stored on the web user's local machine. As keywords are processed and a user visits a website, the cookie file is augmented by cookie data. At best, the cookie file stores the websites where users have visited or products searched: this is referred to as user profiling. However, if the cookie has been deleted or two different users having been using the same browser, the cookie can provide an inaccurate customer advertising profile. The advertisers would greatly benefit in time and resources by avoiding the selection of keywords, meta-data and website programming while obtaining a richer user profile. Additionally, the advertising customers should not be limited a user visiting a specific search engine, typing in keywords and storing the related data in a cookie file.

Advertising and digital media files can be also be provided by other service providers (e.g., social media, shopping, entertainment, etc.). These other service providers have shortcomings similar to search engines. For example, social media technologies are a form of group email corresponding to a 1:1 or 1:n relationships that are finite and do not involve heuristics. Social media are effectively HTML-based group email and subject to the same shortcomings associated with coding for search, advertising, copyright and classification.

Similarly to web search engines, shopping, entertainment, and multimedia websites provide search engines of a certain class. For example, these websites can provide search services for customers searching for books, films, songs and products. These websites typically suffer from the same meta-data, classification, HTML, coding and advertising deficiencies that challenge search engines. In particular, their ability to recommended similar or relevant books, film and movies is limited by meta-data and user data collection. Shopping, entertainment, and multimedia websites commonly make interpretations of a user's behavior a priority in their research and development efforts.

In summary, digital media files, images, videos, webpages, and documents cannot broadcast, network, communicate, or self-organize into an Internet ontology. The commonly relied upon meta-data does not provide information that is substantively useful to search engines, advertisers or copyright holders due to inherent inefficiencies and inaccuracies in the selection and establishment of the meta-data. Additionally, images, videos, and websites that are similar cannot be networked to form a pre-assembled search engine (set of search results), or to form a wiki, or social network. Furthermore images, videos, and website that are similar cannot be networked to form recommendations for users of various social, shopping, and entertainment websites. Accordingly, images, videos, and websites that are similar cannot be networked for broadcast advertising.

SUMMARY

There is a significant commercial and technical need for a new paradigm regarding the structure of digital media files (e.g., structure of data) on the Internet, WWW, and Hidden Web. In particular, there is a need for digital media files to be optimized for search engines, web advertising, copyright licensing, and global phylogenetic content classification. Additionally, there is a need to reduce the significant burden that exists for content owners and web developers to author vast amounts of programming code for web search optimization or search engines optimization (SEO). Fundamentally, there is a need to redefine how interactions within the Internet are manipulated: To yield an robust results that override the aforementioned routine and conventional sequences of events ordinarily triggered or occurring within the conventional Internet hierarchical structure and configurations for origination. Accordingly, the present invention is directed toward solutions to address these needs, in addition to having other desirable characteristics. Specifically, the present invention provides an improved technology that organizes, classifies, prepares, and pre-programs digital media files for use by search engines and their corresponding customer base such as advertisers, information networks and research firms. Classifying information, files or data enables greatly enhances business domains which is further described herein.

In particular, the present invention relies on a new data structure that reengineers the data itself, the files and their related hardware and software infrastructures, and the underlying architecture of files all across the Internet. The present invention also provides a unique architecture that considers the utility and necessity of Internet search, advertising, and copyright. As an innovation, meta-data, HTML code, copyright code, and advertising code can be replaced by a single hereditary sequence, adherent to a global classification schema. Using a single hereditary sequence adherent to a global classification schema allows digital media files the ability to broadcast, network, self-organize, issue a license, and revoke. A hereditary sequence indicates traits including, but not limited to copyright, commerce and communication representing governing instructions for Internet interactions. The hereditary sequence indicates traits wherein the representation traits are independent ontology maintained within the hereditary ontology. Accordingly, the present invention defines a hereditary system and hereditary processor that is dynamic, networked and continuously self-enriching with respect to Internet content.

In accordance with an example embodiment of the present invention, a hereditary processing system includes at least a central processing unit (CPU), a hereditary processing unit (HPU), and a memory. The HPU includes a hereditary ontology of well-known primitive objects and preprogrammed sets, each of the preprogrammed sets, Sets N, comprising a plurality of primitive objects. The HPU is configured to receive a digital media file, receive instructions to perform hereditary processing on the digital media file, and determine a datatype from the digital media file. The HPU is configured to create a new set, Set A, based on information derived from the digital media file and based on the determined datatype, the Set A comprising one or more primitive objects of the well-known primitive objects. The HPU is configured to combine all primitive objects from at least one of the preprogrammed sets, Sets N, to the Set A to create a new superset, Set Y. The HPU is further configured to apply one or more heuristics to transform the Set Y into a plurality of outputs.

In accordance with aspects of the present invention, the HPU being configured to combine all primitive objects from at least one of the preprogrammed sets, Sets N, further comprises the HPU configured to compare the one or more primitive objects of the Set A with the plurality of primitive objects of each of the preprogrammed Sets N, identify at least one matching primitive object from the at least one of the preprogrammed Sets N, and transform the Set A into the Set Y by adding all primitive objects from the at least one of the preprogrammed Sets N to the one or more primitive objects of the Set A. Being configured to identify at least one matching primitive object includes being configured to perform an intersection operation between the objects in the Set A and the plurality of primitive objects in the at least one of the preprogrammed Sets N using an operation Set A f Set N. Being configured to transform the Set A into the Set Y includes being configured to perform an union operation between the Set A and the identified at least one of the preprogrammed Sets N using an operation Set Y=Set A∪Set N. Being configured to transform the Set Y into a plurality of outputs further includes being configured to perform inheritance and compression operations on the plurality of primitive objects in the Set Y to form a unique output of hereditary traits each with independent ontologies.

In accordance with aspects of the present invention, the plurality of outputs are at least one of a hereditary sequence, a hereditary key, a hereditary bytecode, hereditary cryptographic cipher and key, and a hereditary hologram. The digital media file is one of an image, a document, a video file, an audio file, text, or an Internet search term. One or more heuristics determine a hereditary sequence for a search term. One or more heuristics determine a hereditary sequence for the digital media file. One or more heuristics determine a hereditary sequence for the digital media file relating to networking abilities. One or more heuristics determine a hereditary sequence for the digital media file relating to broadcasting abilities. One or more heuristics determine a hereditary sequence for the digital media file relating to licensing abilities. The one or more heuristics can include resolving the at least one output of the plurality of outputs through at least one of ontological graphs and geometric compression.

In accordance with an example embodiment of the present invention, a hereditary sequence natively compiled, interpreted, encoded or embedded into digital media files through a hereditary network is provided. The hereditary sequence includes a plurality of hereditary root classifications, the plurality of root classifications each comprising a plurality of hereditary traits. Each of the plurality of hereditary traits are two character representations for descriptors of the digital media files.

In accordance with aspects of the present invention, the hereditary root classifications are copyright, commerce, and communication. The hereditary root classification of copyright can include hereditary traits of a character representation for subject matter, a character representation for ontological position, a character representation for copyright owner, a character representation for media type, a character representation for hereditary system identifier, a character representation for license, a character representation for keywords, a character representation for semantics, a character representation for educational rank, a character representation for social rank, a character representation for content ranking, and a character representation for revocation rules. The hereditary root classification of commerce can include hereditary traits of a character representation for advertising, a character representation for syndication, a character representation for fees, and a character representation for payment methods. The hereditary root classification of communication can include hereditary traits of a character representation for networking rules, a character representation for broadcasting rules, a character representation for inheritance rules, a character representation for mutations, a character representation for compatible networks, and a character representation for blocked networks.

In accordance with an example embodiment of the present invention, a method for creating or mutating a hereditary sequence for a digital media file includes receiving input data and instructions for creating or mutating the hereditary sequence. The input data and the instructions are parsed. The hereditary sequence is created or mutated using a specialized hereditary processing unit (HPU) and based on the input data and the instructions. The creating or mutating of the hereditary sequence includes the HPU identifying one or more primitive objects in the input data. Further, the HPU identifies one or more processes to be performed on the hereditary sequence based on the instructions. Further, the HPU creates or mutates one or more hereditary traits within the hereditary sequence, the hereditary traits including alphanumeric character representations for the one or more primitive objects and the one or more processes to be performed. Each of the hereditary traits inherit relationships between the one or more primitive objects and a plurality of primitive objects is stored in a hereditary ontology. The HPU natively compiles, encodes, or embeds the created or mutated hereditary sequence into a digital media file associated with the hereditary sequence in such a way that the hereditary sequence is networked to other digital media files sharing hereditary traits of the hereditary sequence and is searchable utilizing the inherited relationships from the hereditary ontology of the hereditary traits. The encoded or embedded digital mediate file is returned as a hereditary digital media file and hereditary network.

In accordance with aspects of the present invention, the hereditary traits are each organized into one of three hereditary root classifications, the three hereditary root classifications comprising copyright, commerce, and communication. The hereditary root classification of copyright can include the hereditary traits of a character representation for subject matter, a character representation for ontological position, a character representation for copyright owner, a character representation for media type, a character representation for hereditary system identifier, a character representation for license, a character representation for keywords, a character representation for semantics, a character representation for educational rank, a character representation for social rank, a character representation for content ranking, and a character representation for revocation rules. The hereditary root classification of commerce can include the hereditary traits of a character representation for advertising, a character representation for syndication, a character representation for fees, and a character representation for payment methods. The hereditary root classification of communication can include the hereditary traits of a character representation for networking rules, a character representation for broadcasting rules, a character representation for inheritance rules, a character representation for mutations, a character representation for compatible networks, and a character representation for blocked networks.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
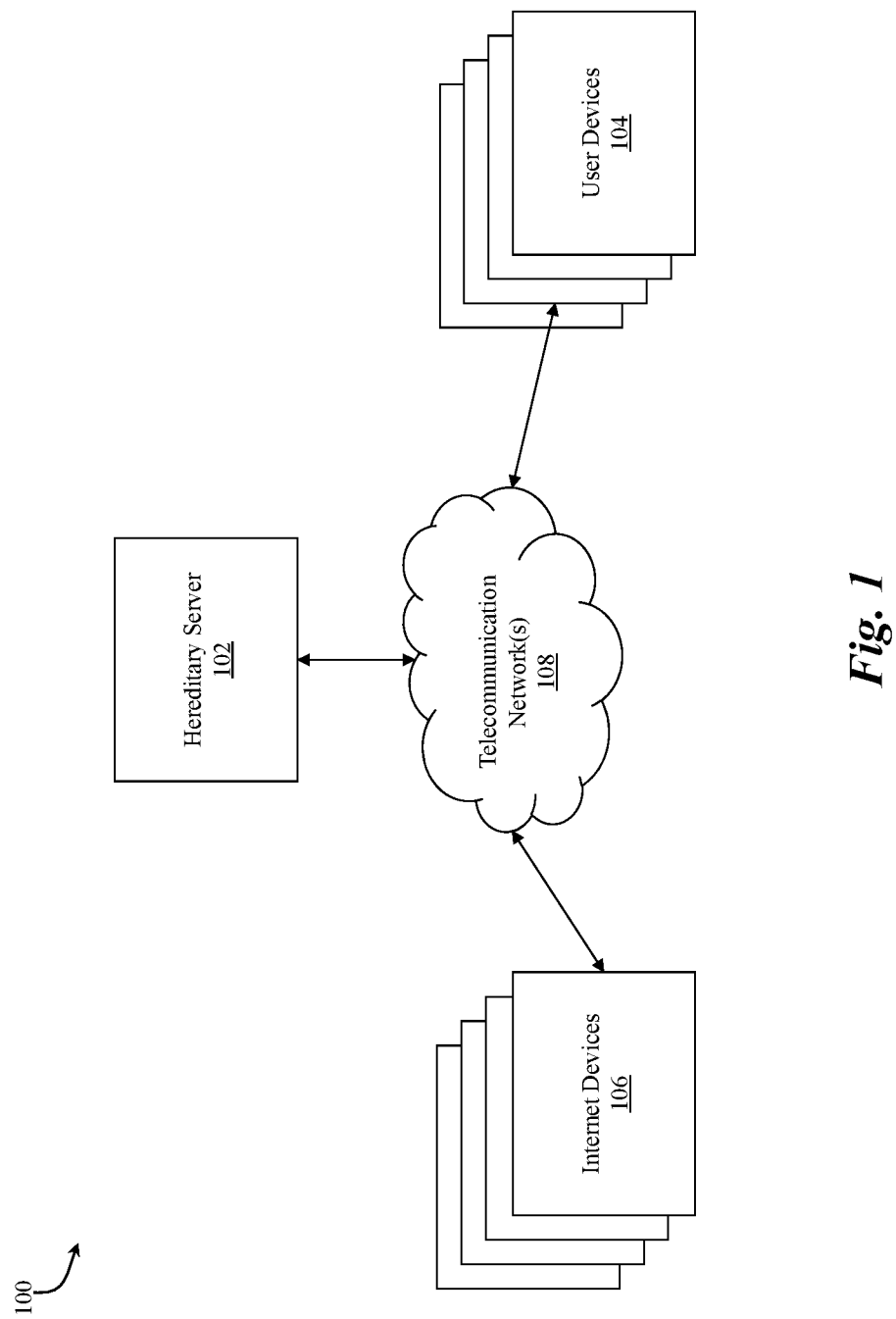
FIG. 1 is an illustrative environment for implementing aspects of the invention.

The present invention relates to the Internet, WWW, Hidden Web, Internet search, social media, web advertising, Internet copyright, digital file networking and information networking. In particular, the present invention relates to a system and method for natively compiling, encoding, or embedding digital media files with a completely novel technology providing hereditary sequences enabling a heuristic approach for searching for digital media files using a hierarchical ontology associated with the hereditary sequences. The inventive system and method enable a user to leverage the hereditary ontology to search for content that is networked using the hereditary sequences. For purposes of this disclosure, the term hereditary ontology, is meant to be interpreted as a naming and definition of primitive types, properties, and interrelationships of entities or primitive objects. The hereditary ontology as discussed herein provides classification of variables needed for a set of computations and establishes the relationships between them, to limit complexity and to organize information. Accordingly, the present invention provides a completely new technology that replaces the need for cumbersome and labor intensive web crawling and searching algorithms used in traditional web search systems, thereby fundamentally changing the traditional web search architectures. Overall, the present invention provides a novel technology in the form of a new configuration and structure for interacting with data on the Internet, altering the previously known convention for interacting with data on the Internet, and resulting in a system and process that overrides the routine and conventional sequence of events ordinarily triggered by the storage of data on the Internet, WWW, Hidden Web, etc. and searches to locate such data. The method and system of the present invention can be implemented using a combination of a specialized computer hardware processor, a specialized virtualized processor, and software.

In practice, the present invention utilizes keywords, metadata, and website programming related to digital media files to provide improvements throughout various areas of the Internet. For example, the present invention can be utilized to replace traditional advertising with a single hereditary sequence acquired by images, videos, documents, and/or websites. Specifically, the digital media files are encoded or embedded with the single hereditary sequence to create a hereditary file. The hereditary sequence is a collection of hereditary traits that describe the digital media file. The encoded digital media file or hereditary file are configured to create a hereditary network, such that digital media files with overlapping traits from their respective dynamic hereditary sequences are able to network with one another thereby creating a hereditary network. Each hereditary sequence is dynamic and constantly evolving as genetically or hereditarily similar information is generated by the hereditary ontology or hereditary network. Advantageously, the hereditary sequences can further include instructions for searching, advertising, copyright, and commerce, effectively networking the digital media files across a hereditary network. For example, a search for content related to particular subject matter will return all of the digital media files that include a trait in their respective hereditary sequence that matches that subject matter. Accordingly, the use of hereditary sequences for each digital media file effectively replaces the need for cumbersome coding for web based searches (e.g., meta-tags, html tags, etc.).

Once each of the digital media files are encoded with a hereditary sequence they are configured to self-organize into global content hereditary networks. The hereditary network is created automatically using the hereditary sequences based on a hereditary ontology. In accordance with an example embodiment of the present invention, the hereditary ontology provides naming and definitions of types, properties, and interrelationships for primitive objects throughout existence. The hereditary ontology eliminates the need for a search index since all the digital media files are networked using a common constructs for each hereditary sequence. For example, the digital media files share similar naming and definition conventions for subject matter, such that digital media files that share a similar portion of their respective hereditary sequences are related and can be networked with one another. Accordingly, digital media files can be searched independently of their respective websites, surrounding text, etc. creating an infrastructure for a new layer within the Internet stack. In particular, the digital media files can be utilized to create a layer that enables files to talk, broadcast, and network with each other independently of their respective websites. The digital media file generated through its native binary algorithm (natively compiling), encoded, or embedded with the hereditary sequence structure of the present invention is an improvement over existing digital media files; by creating an unconventional digital media file that contains logic, definitions, instructions, and independent abilities, while a traditional digital media file is controlled, manipulated and rendered as an inert object.

In contrast to the present invention, conventional digital media files (e.g., images, video, webpages) that are related to particular subject matter cannot network, broadcast or self-organize across websites, computer desktops, and servers. For example, IMDB has web page associated with actress Elizabeth Taylor, Wikipedia has web page associated with actress Elizabeth Taylor, and CNN has several web pages associated with actress Elizabeth Taylor; however, the corresponding pages, images, videos and audio files related to Elizabeth Taylor on IMDB, Wikipedia and CNN are not networked together. In other words, the individual multimedia content on those web pages cannot be searched directly and must be searched indirectly by searching content and/or metatags associated with the disparate web pages displaying that content. Furthermore, pages, images, videos and audio files related to Elizabeth Taylor cannot broadcast, communicate, self-organize, or be revoked. Similarly, a single web page displaying a video, an image, or document related to Elizabeth Taylor cannot network or communicate on the same page, sever or website.

The novel technology of the present invention enables the digital media files associated with a particular subject matter (e.g., Elizabeth Taylor) to be reduced to related hereditary sequences containing instructions for searching, web advertising, copyright licensing, and global classification with every file: images, videos, documents and websites. Accordingly, the individual digital media files for IMDB, Wikipedia, and CNN related to Elizabeth Taylor, as discussed in the above example, can be networked using the present invention. Advantageously, the present invention can perform a search query that pulls up all digital media files associated with a keyword(s) within the search query. This implementation is in contrast to traditional web-based searches which require significant text indexing and text searching to find content associated with those text indexes. The implementation of the present invention searches related digital media files via hereditary sequences without relying on text associated (e.g., web search syntax terms, header tags, image file names, meta tags, keyword optimization, etc.) with or surrounding those digital media files. Similarly, a user can utilize the hereditary sequences for the digital media files across the Internet to broadcast advertising to all the digital media files within a hereditary network comprised of hereditary websites, images, videos, documents and desktops globally. The networks may be contact specific, such as images, websites and videos of Elizabeth Taylor or to a copyright owner. The technology of the present invention provides an advertiser relief from the bounds of keywords, metadata and programming code.

In accordance with the present invention, the ability of digital media files to network, broadcast, communicate, and self-organize provides a significant technological improvement for Internet searches, Internet copyright management, web advertising, and social media. Additionally, the use of hereditary sequences in digital media files enables users to customize how files are searched and organized in a distinct manner from conventional systems. Specifically, the ability of files to network, broadcast, communicate and self-organize is extremely useful to search engines in automatically organizing content and providing rich search results for web user. The ability of files to self-organize and form networks is also extremely useful to, e.g., web advertisers that wish to broadcast advertising to networks of images with specific subject matter content, e.g. only images and videos of Elizabeth Taylor all across the Internet. Similarly, the ability of files to self-organize and form hereditary networks related to individuals creates a social media network of rich media; and, enables content rights holders the ability to license and revoke associated content.

Moreover, the ability of multi-media files to self-organize and form hereditary networks based on the hereditary sequences related to the multi-media files enables copyright holders and content rights holders to license and revoke associated content throughout the Internet with minimal effort. For example, a large music publisher may wish to revoke images and videos of a particular artist by revoking all images and video by invoking a restriction based on a portion of the hereditary sequence associated with the large music publisher and/or the particular artist. Prior to the present invention, the conventional implementation of the Internet provides no efficient method to revoke or otherwise manage access to thousands of websites, images, videos or Internet-based documents owned by a copyright owner. Such an automated method saves hundreds of hours and sizable legal fees related to pursuing copyright infringement claims (e.g., for a single video).

FIGS. 1 through 14, wherein like parts are designated by like reference numerals throughout, illustrate an example embodiment or embodiments of a system and method for generating, natively compiling, encoding, or embedding digital media files with hereditary sequences and hereditary keys and providing a heuristic approach for searching for digital media files using a hereditary ontology associated with the hereditary sequences and the hereditary keys, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed in a manner still in keeping with the spirit and scope of the present invention.

FIG. 1 is an illustrative environment for a hereditary system 100 in accordance with aspects of the present invention. The hereditary system 100 includes but is not limited to a hereditary server 102, a plurality of user devices 104, and Internet devices 106. Each of the devices throughout the hereditary system 100 is configured to communicate over various telecommunication network(s) 108 to carry out aspects of the present invention. As would be appreciated by one of skill in the art, the telecommunication network(s) 108 can include any combination of known networks. For example, the telecommunication network(s) 108 may be combination of a mobile network, WAN, LAN, or other type of network (e.g., hereditary network). The telecommunication network(s) 108 may be used to exchange data between the hereditary server 102, the plurality of user devices 104, the Internet devices 106, and/or to exchange data with additional sources and devices.

Figure 2A:
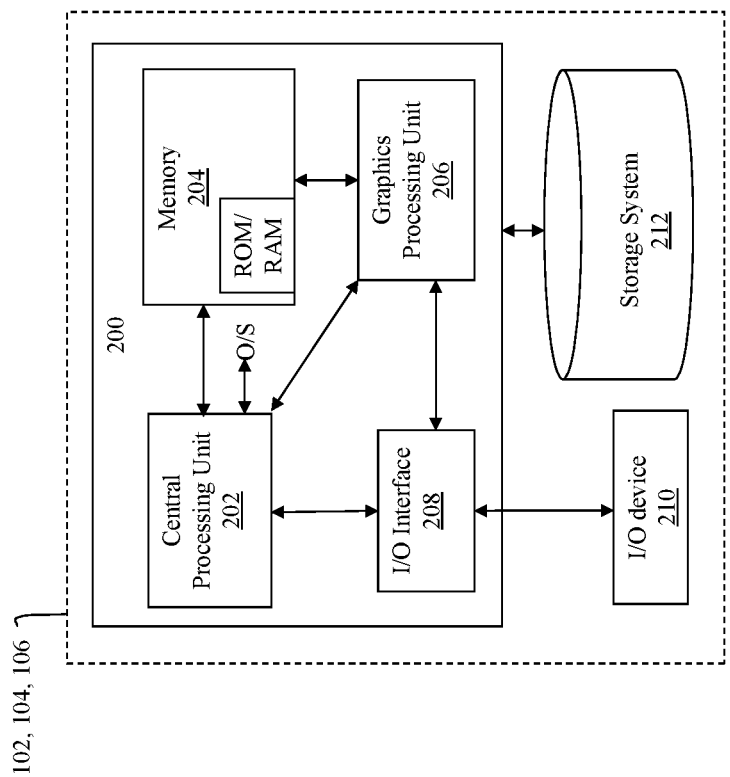
FIGS. 2A and 2B are an illustrative system environment for implementing aspects of the invention.

The hereditary server 102, the user devices 104, and the Internet devices 106 can each include a computing device 200 having a central processing unit 202, a memory 204, a graphics processing unit 206, an input output interface 208, input and output devices 210 and a storage system 212, as depicted in FIG. 2. The CPU 130 and GPU 160, circuitry and related apparatus may be configured using well known methods in the art. As would be appreciated by one skilled in the art, processors (e.g., CPU and GPU) interpret and complete logic related to the computer and the processor(s) have no direct interface with DNS, the Internet, or web search. Additionally, as would be appreciated to one of skill in the art, the storage system 212 can include any combination of computing devices configured to store and organize a collection of data. For example, storage system 212 can be a local storage device on the computing device 200, a remote database facility, or a cloud computing storage environment. The storage system 212 can also include a database management system utilizing a given database model configured to interact with a user for analyzing the database data. As would be appreciated by one skilled in the art, the computing device 200 can be a general purpose computer or a specialized computer system. For example, the computing device 200 can include a single computing device, a collection of computing devices in a network computing system, a cloud computing infrastructure, or a combination thereof, as would be appreciated by those of skill in the art.

In accordance with an example embodiment of the present invention, the plurality of user devices 104 include any combination of computing devices 200 capable of operating software (e.g., web browser, hereditary applications related to the present invention, etc.) and connecting to the Internet. For example, the user devices 104 can include a "workstation," a "server," a "laptop," a "desktop," a "hand-held device," a "mobile device," a "tablet computer," or other computing devices, as would be understood by those of skill in the art. Similarly, the Internet devices 106 include any computing devices 200 configured to connect to the Internet and exchange data with other computing devices (e.g., the hereditary server 102, the user devices 104, etc.). As would be appreciated by one skilled in the art, the Internet devices 106 can be general purpose computers, specialized computing devices, or a combination thereof. For example, the Internet devices 106 can include web servers, web host devices, databases, and/or any other computing devices connected to and/or providing content to the Internet.

The hereditary server 102, and the other hardware devices that make up the hereditary system 100, is configured to create, implement, and manage the operation of a hereditary Internet created in accordance with the present invention. The hereditary Internet refers to the hereditary server 102, the Internet devices 106 (e.g., web servers), the user devices 104, hereditary processor 216, and the hereditary applications stored therein containing hereditary digital media files (e.g., images, video, documents, and html files) that inherit and network from each other using hereditary sequences 400. In particular, the hereditary Internet is an Internet platform enabled by the devices within the hereditary system 100 providing web application interfaces and mobile device platforms that enable users to create, modify, and/or broadcast hereditary networks comprised of digital media files encoded or embedded with hereditary sequences 400. The hereditary digital media files are any digital media files that are generated, natively compiled, encoded, or embedded with a hereditary sequence 400 that can be read, interpreted, searched, networked, and modified within the hereditary system 100.

Figure 2B:
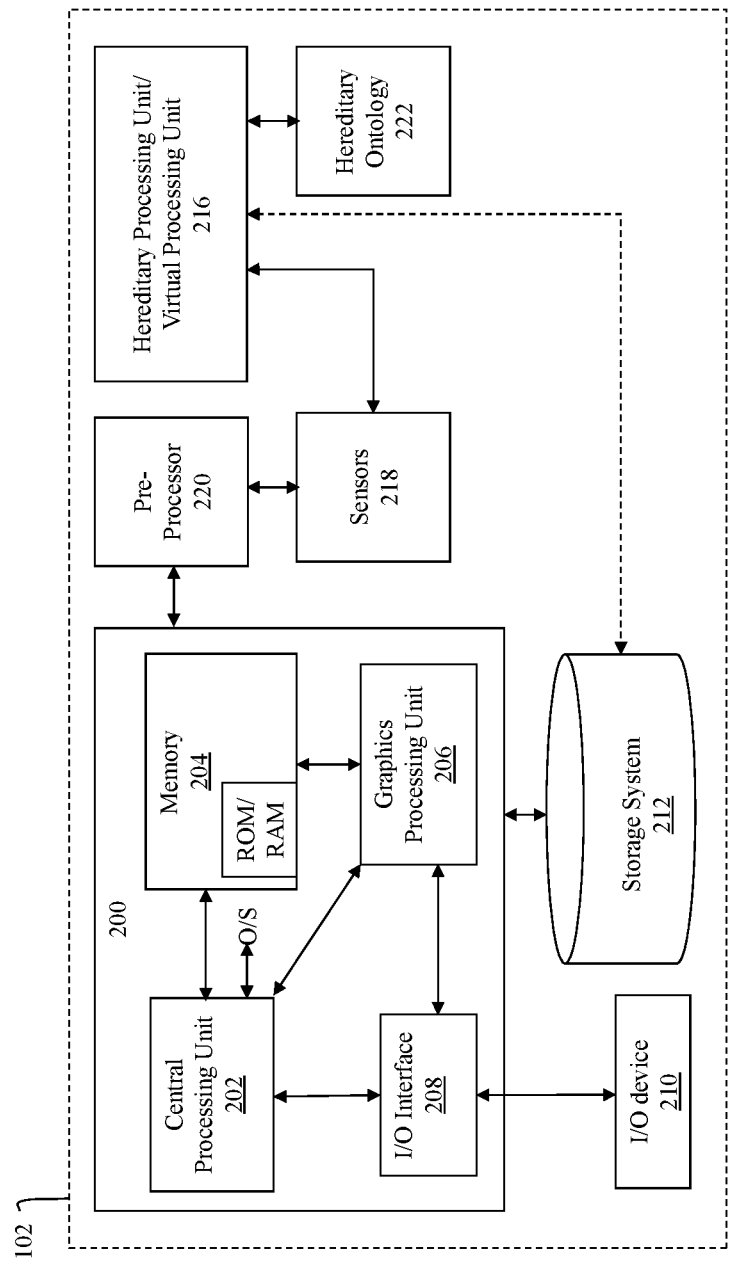

In accordance with an example embodiment of the present invention, the hereditary server 102 is a specialized computing device 200 further including a specialized hereditary processing unit 216 configured to carry out the various functions of the hereditary system 100, as depicted in FIG. 2B. In particular, FIG. 2B depicts an exemplary embodiment of the hereditary server 102 in combination with the hereditary processing unit 216 and other specialized hardware/software elements (e.g., 218, 220, 222). The hereditary processing unit 216 is a computing processor specifically designed to handle hereditary computing operations and carry out specialized functions in accordance with aspects of the present invention. In particular, the hereditary processing unit 216 is a processor capable of interpreting and routing Internet search terms, advertising, copyright, commerce, networking, broadcasting related to images, video, documents, PDF files, and html pages from uniquely formed hereditary sequences 400. As would be appreciated by one skilled in the art, the hereditary processing unit 216 can include any combination of a physical hardware processing unit and a virtual processing unit (e.g., a Java virtual machine) configured to carry out aspects of the present invention, as discussed herein.

In accordance with an example embodiment of the present invention, individual devices can be specialized with hereditary hardware to perform hereditary operations. For example, the hereditary processing unit 216 can be all in fixed hardware (with an ontology statically store on a chip) installed on the user devices 104. The hereditary processing unit 216 and the static ontology chip have the ability to create hereditary sequences 400 that are compatible with the hereditary system 100 without passing the digital media files and related data to the hereditary server 102 for processing (e.g., generation, natively compiling, encoding, embedding, of hereditary sequences 400).

As would be appreciated by one skilled in the art, the hereditary processing unit 216 can be any combination of specialized hardware and/or specialized software specifically designed to carry out the aspects of the invention. In particular, the hereditary processing unit 216 is a universal computing machine configured to organize diverse media types into hereditary sets and generating hereditary sequences 400 and hereditary networks from those hereditary sets. The hereditary processing unit 216 can be a specialized processing unit, a specialized virtual processing unit, a combination of specialized software modules, or combination thereof. Alternatively, the hereditary processing unit 216 can be a generic processing unit configured to act as a specialized processing unit, a specialized virtual processing unit, a combination of specialized software modules, or combination thereof. The hereditary processing unit 216 interacts with and is configured to process other well-known computing processes in addition to the specialized hereditary processes of the present invention. For example, the hereditary processing unit 216 can read instructions, parse data, perform image recognition, text analysis, computational linguistics, and computational computing (e.g., graphs, genetic algorithms, artificial intelligence, etc.).

In accordance with an example embodiment of the present invention, the hereditary processing unit 216 is configured to accept multiple inputs including Internet search terms, image recognition, optical character recognition, character recognition, image data and metadata, video data and metadata, audio data and metadata, binary data and ascii data.

The hereditary processing unit 216 is further configured to apply a set of heuristics to those inputs to create the hereditary sequences 400 to be associated with those inputs. Additionally, the hereditary processing unit 216 is configured to receive input from sources of data specifically applicable to the hereditary system 100. For example, the hereditary processing unit 216 can receive inputs from sources of data including, but not limited to web search terms, media networking interface, messaging interfaces (e.g., messages), user portfolios, broadcasting interfaces (e.g., broadcast ads, messages, etc.), and a web indexing engine (e.g., the hereditary server 102).

In accordance with an example embodiment of the present invention, the hereditary processing unit 216 is connected to or otherwise in communication with sensors 218. The sensors 218 can provide the hereditary processing unit 216 with instructions and other input data in a format readable by the hereditary processing unit 216 to perform the instructions. For example, the hereditary processing unit 216 can receive instructions from the sensors 218 to create a hereditary sequence 400 for a digital media file, to conduct a search for digital media files within the hereditary system 100, to perform operations on sets of data (e.g., union, intersections, etc.) with each instructions to be performed using corresponding hereditary sequences 400. The sensors 218 can include any combination of hardware and software logic configured to received program instructions and data inputs (e.g., from an application programming interface) and perform operations on the received data inputs to prepare them for the hereditary processing unit 216. In particular, the sensors 218 are configured to identify the instructions within the data inputs and parse out the instructions and any data types from the original data inputs into cache for processing by the hereditary processing unit 216. In accordance with an example embodiment of the present invention, a the hereditary server 102 can further include a preprocessor 220 to initially receive input data and perform preprocessing (e.g., parsing, checksums, etc.) prior to the sensors 218 receiving the input data. As would be appreciated by one skilled in the art, the hereditary processing unit 216, the sensors 218, the preprocessor 220, and the hereditary ontology 222 can be included within a standalone device or they can be part of the hereditary server 102.

Continuing with FIG. 2B, the hereditary processing unit 216 can be configured to perform various computations related to the instructions and the other input data received from the sensors 218. For example, the hereditary processing unit 216 can generate unique hereditary sequences 400 containing hereditary instructions for an image, audio, video or digital file, including, but not limited to copyright owner, subject matter, trademark, media type, networking, inheritance, copyright, and commerce. Similarly, the hereditary processing unit 216 can perform mutations to existing hereditary sequences 400 by modifying and/or updating a hereditary sequence 400. In particular, the hereditary processing unit 216 performs the mutation process by updating a hereditary sequence(s) 400 to reflect changes to the data stored therein and/or relationships with other data (e.g., updating hereditary relationships to other hereditary sequences 400). Utilizing the ability to create, interpret, mutate, and perform other operations on hereditary sequences 400 enables the hereditary processing unit 216 to substantially increase the efficacy of Internet search and global information organization, as discussed in greater herein. Accordingly, the hereditary processing unit 216 is operable to directly interface with the DNS to play an important role in processing search request within the hereditary system 100

In accordance with an example embodiment of the present invention, the hereditary processing unit 216 is also communicatively attached to a hereditary ontology 222. In particular, the hereditary processing unit 216 accesses and/or maintains a grammatically based hereditary ontology 222 that is used to interpret and create the hereditary sequences 400 used throughout the hereditary system 100. As would be appreciated by one skilled in the art, the hereditary ontology 222 can be a fixed set of predetermined classifications stored on a static chip (e.g., ROM) and/or a constantly updating predetermined set of classifications stored in a storage structure (e.g., cloud, database, etc.). The hereditary ontology is a superset of dynamic classifications and dynamic graphical relationships stored in a storage structure (e.g., cloud, database, etc.). In particular, the hereditary ontology 222 is a classification system that encompasses the description, identification, nomenclature, and classification for known primitive objects, hereditary files and varied datatypes in existence. In particular, the hereditary ontology 222 is a classification system that encompasses the description, identification, nomenclature, and classification for known primitive objects in existence. The classification system of the hereditary ontology 222 defines the terminology needed to describe the subject matter for Internet-based digital media files (e.g., images, videos, documents and websites) to be used in the hereditary sequences 400. In accordance with an example embodiment of the present invention, the hereditary ontology 222 includes a fixed set of alphanumeric definitions (e.g., for primitive objects) categorized into main classes used to build/characterize the various elements (e.g., hereditary traits 404) of the hereditary sequence 400. For example, the hereditary ontology 222 can be a classification system with primitive objects categorized into at least one of a person, place and/or thing nodes or networks described as n number of hereditary sequences.

In accordance with an example embodiment of the present invention, the hereditary ontology 222 can be a logical and inherent global, Internet-based hereditary classification system to organize Internet-based information. In particular, the hereditary ontology 222 defines relationships among primitive entities, primitive objects, characters, letters, numbers, checksums, varied datatypes, images, websites, videos, digital media, credit card, Internet user, and their importance that can be utilized by the hereditary processing unit 216 with heuristics to determine a hereditary sequence 400. The hereditary ontology 222 organizes the Internet-based information by creating a mapping for relationships between the all of the primitive objects defined within the hereditary ontology 222. The relationships are mapped in such a way as to create an inheritance based hereditary network. For example, the inheritance network can include a root term and network, a terminus term and network, and terms and networks between the root and terminus such that all object definitions can be related back to a plurality of other primitive object definitions (e.g., node-based relationships). As would be appreciated by one skilled in the art, the mapping can be created and stored in a dynamic mapping table, diverse database structures, mathematical model, and/or a graphical structure.

Figure 3:
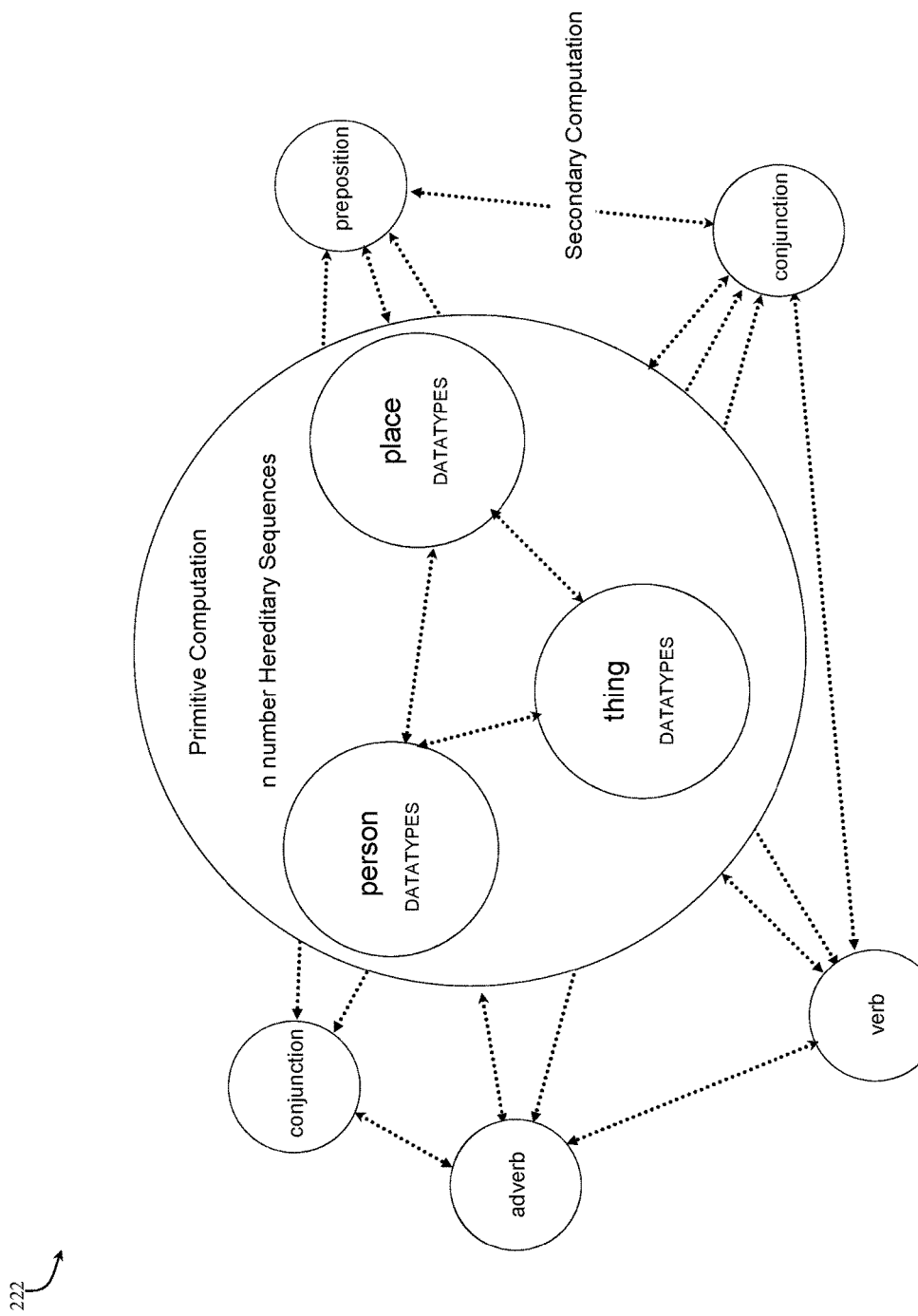
FIG. 3 is a diagrammatic illustration of an ontology for implementing aspects of the invention.

FIG. 3 is a diagrammatic illustration of an example of the hereditary ontology 222, in accordance with the present invention. In particular, FIG. 3 depicts a hereditary ontology 222 including three main datatypes of a person, place and thing. As discussed herein, each of the primitive objects stored and defined in the hereditary ontology 222 is categorized into at least one of the person, place and/or thing nodes. The core nodal relations are represented as primitive computation. The hereditary ontology employs a structure consistent with computational linguistics and linguistic abstractions enabling a broad range of computational options. The primitives may interact with a secondary level of computation which may be required to resolve user input such as search terms or document indexing. Both the primitive computations and secondary computations are dynamic classifications and dynamic graphical relationships stored with the hereditary ontology.

In accordance with an example embodiment of the present invention, the three main classifications are included within primitive computation values and include n number of hereditary sequences 400 for the n number primitive objects stored therein. In particular, each of the primitive objects stored within the hereditary ontology 222 have a unique hereditary sequence 400 associated therewith. The hereditary sequence 400 for each object includes hereditary traits 404 that are utilized to define relationships with other primitive objects within the hereditary ontology 222, as depicted in FIG. 3. Similarly, the second computation values include conjunctions, adverbs, verbs, prepositions, etc. with their own respective hereditary sequences 400. As would be appreciated by one skilled in the art, the hereditary ontology 222 can include any number of classifications (e.g., primitive computation values) and can be categorized in any manner. Additionally, the hereditary ontology 222 can include any combination of second computation values, third computation values, etc.

In accordance with an example embodiment of the present invention, the hereditary processing unit 216 can be configured to perform a broad range of operations for various applications (e.g., web applications, mobile apps, etc.) utilizing the hereditary ontology 222. The operations for the various applications can include, but are not limited to, operating as a unique hereditary sequence 400 processor and generator, method for messaging, broadcasting, networking, incensing, revoking, managing, and tendering copyright images, video, documents, audio files and other digital media files. In accordance with an example embodiment of the present invention, various combinations of additional software and hardware devices throughout the hereditary system 100 can interface with the hereditary processing unit 216 to perform hereditary functions. For example, image processors, image editors, central processing units, graphical processing units, operating systems, websites, server processes and akin can be interfaced with the hereditary processing unit 216 to carry out the various aspects of the present invention (e.g., the generation, mutations, searching of hereditary sequences 400).

Figure 4A:
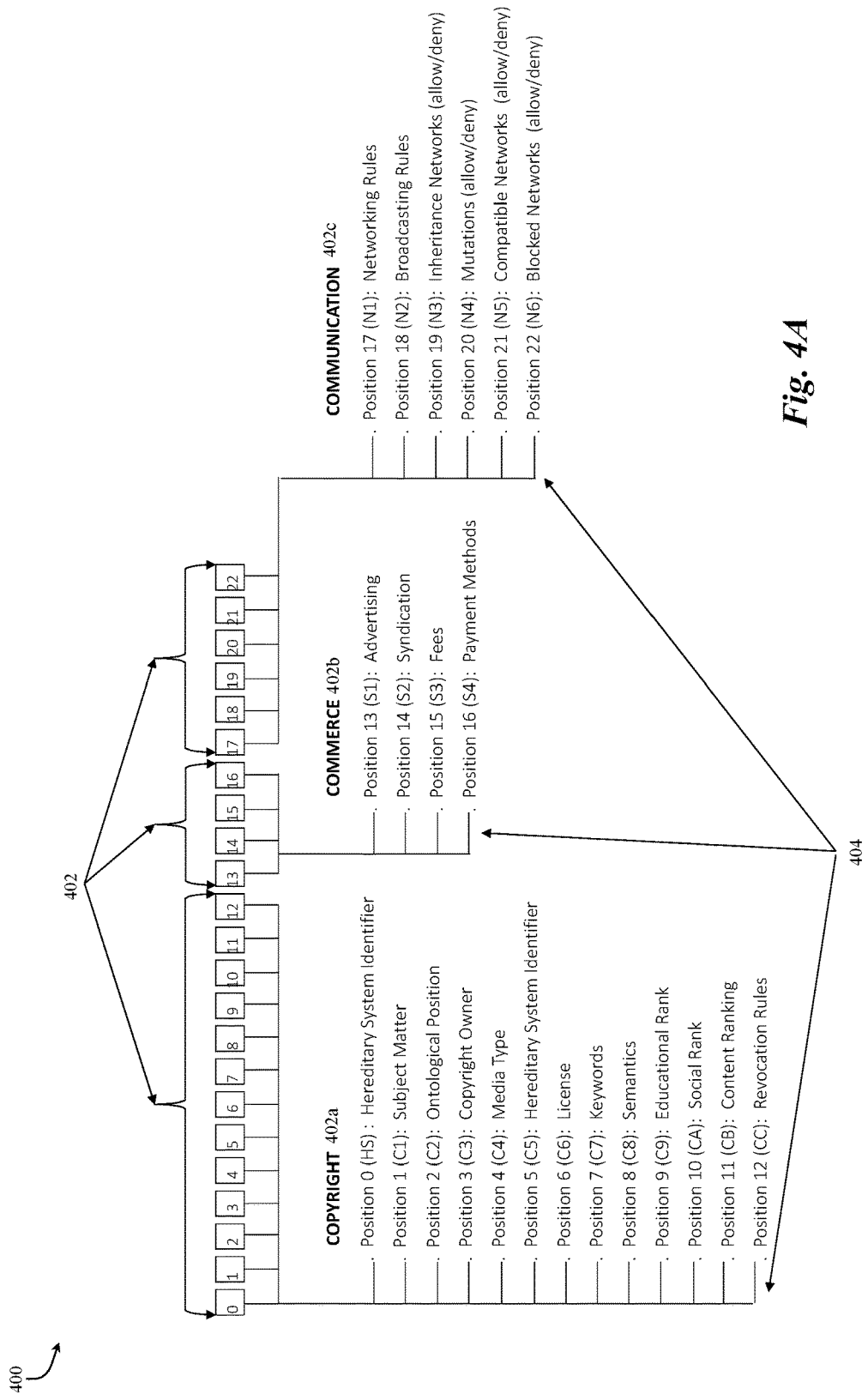
FIGS. 4A, 4B, and 4C are illustrative representations of hereditary sequences for implementing aspects of the invention.

In operation, the hereditary system 100, the hereditary server 102, and more specifically the hereditary processing unit 216 are configured to generate, natively compile, interpret, encode, embed, and mutate hereditary sequences 400 throughout the hereditary system 100 (e.g., stored the hereditary server 102, on user devices 104, Internet devices 106, etc.). In particular, the hereditary system 100 and the hereditary processing unit 216 are configured to receive data about and/or from digital media files or hosts (e.g., webpages, images, audio, video, documents, etc.) and generate a unique hereditary sequence 400 based on the received data and/or data derived from those digital media files (e.g., checksums, metatags exif, etc.). Similarly, the hereditary processing unit 216 can create new hereditary sequences 400 and mutate/update related hereditary sequences 400 (e.g., other hereditary sequences 400 sharing a relationship with the new hereditary sequence 400). In accordance with an example embodiment of the present invention, the hereditary sequences 400, as depicted in FIG. 4A, are created for and encoded or embedded within each digital media file and web page throughout the hereditary system 100 and the devices operating the applications/software related to the hereditary system 100.

The hereditary sequence 400 is a unique data structure that describes content of digital media files, web elements, functional elements, and relationships between those files and elements. In particular, the hereditary sequence 400 is a unique heuristic generated code encoded, embedded, attached or encoded within digital files, such that a single hereditary sequence 400 can be deciphered to network and identify all other related digital media files through inheritance. The unique hereditary sequence 400 can be any a code or key, hereditary bytecode, hereditary cryptographic cipher, hereditary alphanumeric code, hereditary image, hereditary scannable product image, hereditary hologram. As would be appreciated by one skilled in the art, the hereditary sequence 400 can be constructed in any organization of data that would enable the hereditary sequence 400 to defined the content of digital media files and identify relationships (e.g., network) with other digital media files sharing the same content.

In accordance with an example embodiment of the present invention, the hereditary sequence 400 is a cipher of hereditary traits 404, each defining particular pieces of a digital media file. In particular, the hereditary sequences 400 include a plurality of hereditary traits 404, that when interpreted by the hereditary system 100 (e.g., the hereditary processing unit 216, hereditary software, hereditary applications, etc.) are descriptors for the digital media file (e.g., images, video, documents, PDF file or HTML file) they are encoded or embedded thereon. The hereditary traits 404 provide character representations for descriptors and instructions related to the hereditary root classifications 402. In particular, they describe the content and instructions for how to handle the content as it relates to hereditary root classifications 402. For example, particular hereditary traits 404 can define the subject matter of a digital media item and/or identify whether the digital media file is enabled for licensing. The hereditary processing unit 216 is configured to read and interpret the hereditary traits 404 in combination with the hereditary ontology 222.

The hereditary traits 404 can be configured in any readable data format for use by the hereditary processing unit 216 and the hereditary ontology 222. For example, the hereditary sequence 400 can include a two character location hereditary trait 404 to describe a location of the content in an image file (e.g., the characters MA to represent the location of Massachusetts). In accordance with an example embodiment of the present invention, each of the primitive objects associated a character representation (e.g., hereditary trait 404) within the hereditary ontology 222 has its own hereditary sequence 400. Accordingly, each hereditary trait 404 would be associated with a hereditary sequence 400, such that the hereditary traits 404 are network nodes, intersections, and their own ontologies.

Additionally, the hereditary sequence 400 can include descriptors for different types of digital media files and groups of digital media files such as a network of digital media files or hereditary files, a network of websites, a network of web-based advertisements, a network of digital media files or hereditary files, words in a poem, thesis, HTML page or scientific document, frames in a video, words, phrases or time signatures in a song, a group of domain name addresses, checksum data, facial recognition data, signals received from signals processing, a group of email addresses, etc. Accordingly, the hereditary sequence 400 can be used to link a particular type of digital media file to another type of digital media files sharing one or more common hereditary traits 404. Advantageously, the hereditary sequence 400 eliminates enormous amounts of code writing for developers required in convention search engines since the instructions and hereditary traits 404 are inherent within all hereditary sequences 400 (meaning the concept of inheritance is leveraged to build the hereditary sequences 400). For example, a hereditary search within the hereditary system 100 can include a user entering search terms in a hereditary application (e.g., a web app) and the hereditary system 100 searching for and returning digital media files encoded or embedded with the hereditary traits 404 associated with those key terms (e.g., in the hereditary ontology 222). Advantageously, the user is able to find content that would not be easily located using conventional searching methods (e.g., relying on meta tags, key words, text crawling, etc.).

In accordance with an example embodiment of the present invention, the plurality of hereditary traits 404 of the hereditary sequences 400 organized into a unique combination of hereditary root classifications 402. The hereditary root classifications 402 provide additional functionality to the hereditary sequence 400 and level of description for the content of the digital media file. In particular, the hereditary root classifications 402 and hereditary traits 404 provide the basis for the descriptive characteristics for the hereditary sequence 400, such that the hereditary root classifications 402 can include predefined hereditary traits 404 that describe particular predetermined characteristics for a digital media file. As would be appreciated by one skilled in the art, the hereditary root classifications 402 and hereditary traits 404 of the hereditary sequence 400 can be generated as descriptors for various types of digital media files, including but not limited to, an image, video, audio, document, web page, or any digital media file known in the art.

In accordance with an example embodiment of the present invention, the hereditary sequence 400 can include three main hereditary root classification 402 subsets of copyright 402a, commerce 402b, and communication 402c as depicted in FIG. 4A. Additionally, each of the hereditary root classifications 402 includes a predefined set of narrowly defined hereditary traits 404 that define specific characteristics associated witch each of the subsets of the hereditary root classifications 402. For example, the hereditary traits 404 for the hereditary root classification of copyright 402a can include information (e.g., hereditary traits 404) related to copyright, copyright owner, subject matter, trademark, media type, license, keywords, taxonomy, ontology, history [viewed], history [networks], current location, social rank, educational rank, content rating, and revocation rules. Similarly, the hereditary root classification of commerce 402b can include information (e.g., hereditary traits 404) related to advertising instructions, syndication instructions, and fees. The hereditary root classification of communication 402c can include information (e.g., hereditary traits 404) related to networking instructions, compatible networks, predicated networks, blocked networks, inheritance, mutation, broadcasting instructions, and scheduling instructions. As would be appreciated by one skilled in the art, each of the hereditary root classifications 402 and hereditary traits 404 can be customized to include any particular broad categorized hereditary root classifications 402 and narrowly categorized hereditary traits 404 and are not limited to the specific root classifications and traits provided herein (e.g., copyright, commerce, communication, etc.).

In accordance with an example embodiment of the present invention, the hereditary sequence 400 may be comprised of a plurality of two digits pairs (e.g., hereditary traits 404) with one fixed element (A_) and a second element (AA) represented by alpha numeric characters A thru Z and/or 0 thru 9. As would be appreciated by one skilled in the art, the hereditary sequence 400 can be represented by any number of digital pairs/traits 404 using any number of characters. For example, the hereditary sequence 400 may be represented as a forty digit string of two character hereditary traits 404 such as ABBCCDDEEFFGGHHIIJJKKLLMMN-NOOPPQQRRSSTT. The hereditary sequence 400 is not limited by the number of digits, permutations, variables or character types. Each hereditary sequence 400 includes hereditary traits 404 and hereditary root classifications 402 that represent instructions for governing a digital media file, including but not limited to, Internet search, advertising, copyright owner, subject matter, trademark, media type, networking, inheritance, copyright, and commerce.

Figure 4B:
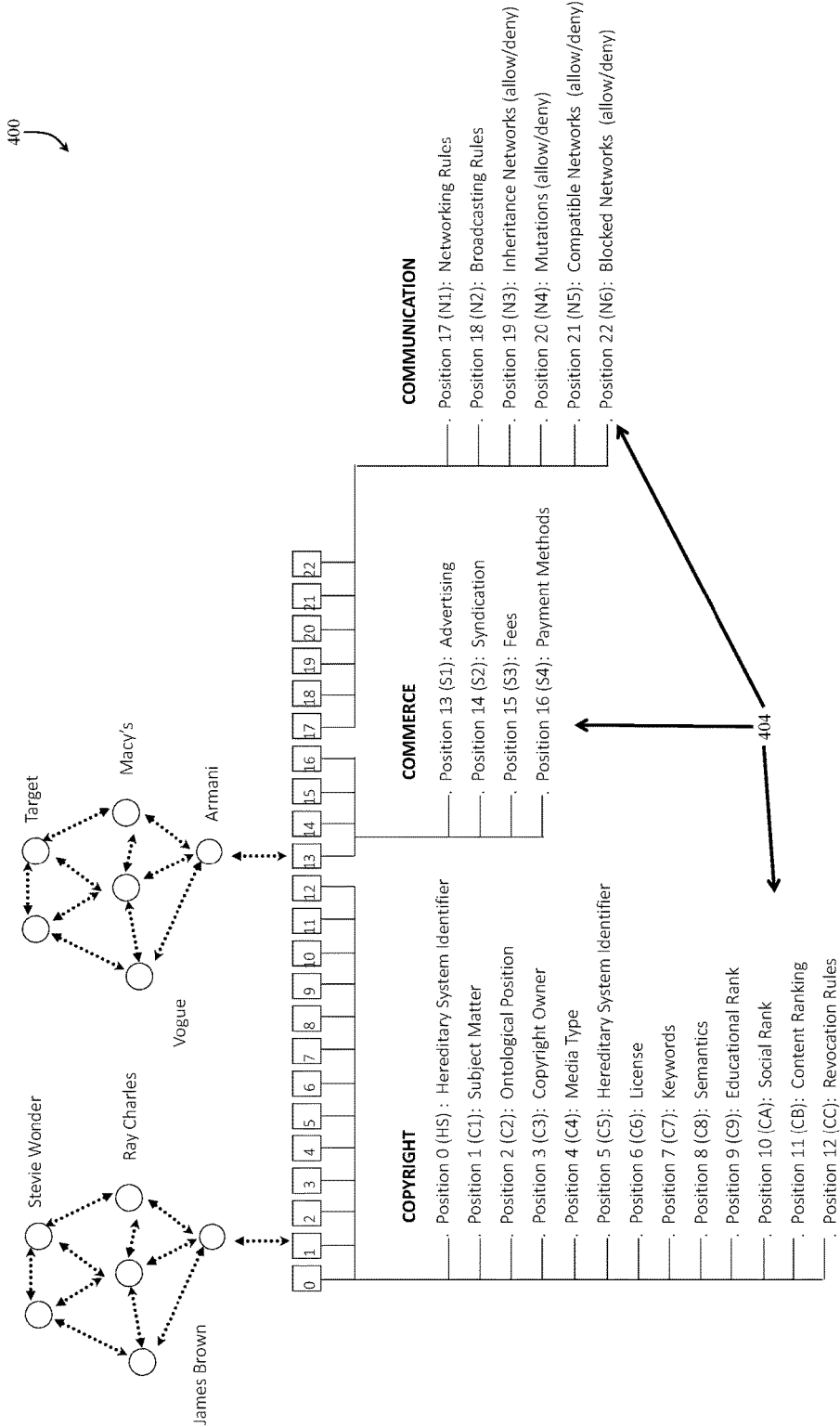

In accordance with an example embodiment of the present invention, each of the hereditary traits 404 represents a compressed form of a hereditary sequence 400 that can be resolved by the hereditary processing unit 216 utilizing the hereditary ontology 222, as discussed in greater detail herein. FIGS. 4B and 4B depict example representations of the compression and inheritance involved in the hereditary traits 404 and how each hereditary trait 404 represents an independent ontology of information maintained within the hereditary ontology 222. In particular, each hereditary trait 404 can inherit information related to the descriptor characters represent by the hereditary trait 404. The hereditary traits 404 within the hereditary sequence 400 depicted in FIG. 4B are hereditary traits 404 with inherent ontology mapping. The inherent ontology mapping, as depicted in FIG. 4B provides a map of relationships between primitive objects or entities defined by the hereditary ontology 222. The descriptor for each hereditary trait 404 inherits other primitive objects or entities based on the defined relationships.

For example, as depicted in FIG. 4B, the hereditary trait 404 at position two (e.g., subject matter) is a descriptor defining the subject matter content associated with the hereditary sequence 400 as "James Brown". The hereditary trait 404 is associated with James Brown in the hereditary ontology 222 and the hereditary trait 404 for James Brown also inherits information (e.g., digital media files, primitive objects, entities, etc.) that shares relationships with James Brown in the hereditary ontology 222 mapping (e.g., Ray Charles, Stevie Wonder, etc.). Similarly, the hereditary trait 404 descriptor at position thirteen (e.g., advertising) describes that the digital media file is related to advertisements for "Armani". Through the inherent ontology mapping maintained by the hereditary ontology 222, the hereditary trait 404 descriptor for Armani also inherits information related to other advertisers (e.g., Target, Vogue, Macy's, etc.). Accordingly, each hereditary sequence 400 is therefore a dynamic superset or subset of hereditary networks within the hereditary ontology 222 providing global hereditary media with a dynamic state. The resulting hereditary media is ever-changing, mutating and adapting as the hereditary ontology 222 is updated, providing a significant innovation over existing meta-data technologies.

Figure 4C:
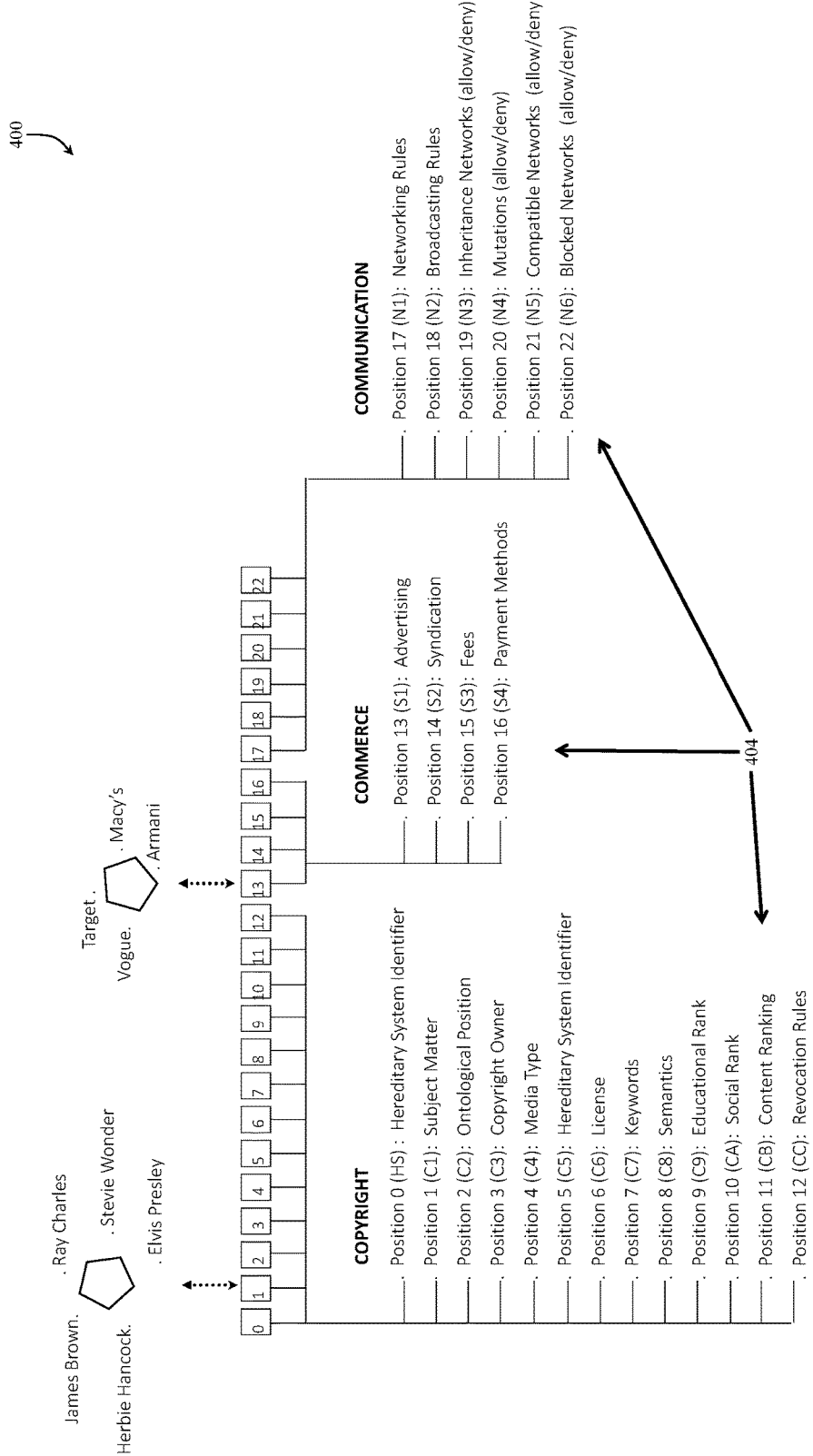

In accordance with an example embodiment of the present invention, the hereditary traits 404 can be compressed and inherit information utilizing geometric compression in place of the inheritance ontology mapping depicted in FIG. 4B. FIG. 4C depicts an example implementation of a geometric compression or cipher providing the independent ontology for hereditary traits at positions two and thirteen. Similarly to the inheritance ontology mapping depicted in FIG. 4B, the geometric compression depicted in FIG. 4C provides information that shares a relationship with the hereditary traits 404.

For example, at position two of the hereditary sequence 400 in FIG. 4C, the hereditary trait 404 descriptor for Elvis Presley inherits the information (e.g., digital media files, primitive objects, entities, etc.) related to other primitive objects or entities (e.g., Stevie Wonder, Ray Charles, James Brown, Herbie Hancock, etc.). Similarly, the hereditary trait 404 descriptor at position thirteen of the hereditary sequence 400 in FIG. 4C provides a descriptor that the digital media file is related to advertisements for "Armani". Through the geometric compression maintained by the hereditary ontology 222, the hereditary trait 404 for Armani also inherits information related to other advertisers (e.g., Target, Vogue, Macy's, etc.). Accordingly, each hereditary sequence 400 is therefore a dynamic superset or subset of hereditary networks within the hereditary ontology 222 providing global hereditary media with a dynamic state. The resulting hereditary media is ever-changing, mutating and adapting as the hereditary ontology 222 is updated, providing a significant innovation over existing meta-data technologies, such that the hereditary sequence 400 is a dynamic of hereditary networks that may be represented by a graph in which the nodes with the graph can be geometrically compressed. As would be appreciated by one skilled in the art, the hereditary traits 404 can be configured in any scheme that inherits information to create an independent ontology for each hereditary trait 404. The present invention therefore provides a novel technology that overrides the routine and conventional static meta-data construct, and creates an ongoing sequence of dynamic and automatically updating events underpinning the hereditary sequence 400 implementation and utilization.

FIG. 4A depicts an exemplary embodiment of the hereditary sequence 400. The hereditary sequence 400, as depicted in FIG. 4A, is generated from left to right and includes twenty-three unique predefined positions. Each of the unique predefined positions is a hereditary trait 404 and is represented by a two character alphanumeric string. The alphanumeric characters of the hereditary traits 404 correspond to descriptors from the hereditary ontology 222 to describe the characteristic at that particular position within the hereditary sequence 400. Each position within the hereditary sequence 400 is recognizable by the hereditary processing unit 216 and describes a particular characteristic and/instruction related to the digital media file that it is encoded or embedded thereon.

In particular, position 0 is a hereditary system identifier (e.g., the data at position 0 designates the data as being a hereditary sequence for interpretation by the hereditary processing unit 216), position 1 corresponds to subject matter of the content in the digital media file, position 2 corresponds to a position within the hereditary ontology 222), position 3 corresponds to the copyright owner of the digital media file, position 4 corresponds to a media type of the digital media file (e.g., video, audio, document, etc.), position 5 corresponds to a hereditary system identifier (e.g., a unique identifier utilized by the hereditary processing unit 216), position 6 corresponds to license rights for the digital media file (e.g., licensed, available to license, etc.), position 7 corresponds to keywords associated with the digital media file, position 8 corresponds to semantics related to the content of the digital media file, position 9 corresponds to educational rank of the digital media file (e.g., instructing the hereditary processing unit 216 to block explicit materials and content generated by the hereditary network) position 10 corresponds to social rank of the digital media file (e.g., designating digital media files for the hereditary processing unit 216 that are popular with users on the hereditary Internet), position 11 corresponds to content ranking of the digital media file (e.g., designating digital media files for the hereditary processing unit 216 as files that are "liked" within the hereditary Internet), position 12 corresponds to revocation rules associated with the digital media file, position 13 corresponds to advertising permissions for the digital media file (e.g., permission to be used in advertisements), position 14 corresponds to syndication for the digital media file (e.g., permission to be used in syndication), position 15 corresponds to fees associated with the digital media file (e.g., fees to license, advertise, etc.), position 16 corresponds to payment methods associated with the digital media file (e.g., how to pay for use of a license, advertisement, etc.), position 17 corresponds to networking rules associated with the digital media file (e.g., designating for the hereditary processing unit 216 whether the digital media file can be auto-networked with other forms of media), position 18 corresponds to broadcasting rules associated with the digital media file (e.g., designating for the hereditary processing unit 216 whether the digital media file has the privileges in a user's hereditary network to be broadcasted to other user hereditary networks), position 19 corresponds to inheritance networks associated with the digital media file (e.g., allow or deny the hereditary sequence of the digital media file to be subject to inheritance), position 20 corresponds to mutations associated with the digital media file (e.g., allow or deny the hereditary sequence of the digital media file to be subject to mutation), position 21 corresponds to compatible hereditary networks associated with the digital media file (e.g., hereditary networks permitted for being networked with the digital media file), position 22 corresponds to blocked networks associated with the digital media file (e.g., hereditary networks blocked from being networked with the digital media file), and position 23 corresponds to predicated networks (e.g., hereditary networks permitted for being networked with the digital media file).

In accordance with an example embodiment of the present invention, each of the hereditary root classifications 402 is identified in FIG. 4A with particular characters. In particular, the copyright 402a, commerce 402b, and communication 402c hereditary root classifications 402 are reserved with characters C, N, and S, respectively. The characters C, N, and S are unique identifiers within the hereditary system 100 that represent the root classifications of copyright 402a, commerce 402b, and communication 402c Accordingly, the hereditary traits 404 identified by the respective reserved characters correspond to the matching hereditary root classification 402. For example, positions 1 to 12 correspond to the copyright 402a root classification, positions 13 to 16 correspond to the commerce 402b root classification, and positions 17 to 23 correspond to the communication 402c root classification.

As would be appreciated by one skilled in the art, the hereditary sequences 400 can be implemented in a variety of ways. In particular, the hereditary sequence 400 can be implemented/deployed as a URL, filename, exif data, bytecode, image algorithms, headers, pos scanners, and part of other algorithms such as the PNG image algorithm. In accordance with an example embodiment of the present invention, the hereditary processing unit 216 can replace HTML hyperlinks within the hereditary system 100 (e.g., websites connected to the hereditary system 100) with hereditary sequences 400 containing instructions for search, advertising, and/or copyright. In particular, the hereditary sequence 400 can be placed within a hyperlink (e.g., <a href="photo 1.jpg" alt="AABBCCDDEEFFGGHHIIJJKKLLMMNN (hereditary sequence 400)">), as a meta-tag (e.g., <meta name="description" content="AABBCCDDEEFFGGHHIIJJKKLLMMNN (hereditary sequence 400)">; <meta name="keywords" content="AABBCCDDEEFFGGHHIIJJKKLLMMNN (hereditary sequence 400)">; <meta name="author" content="AABBCCDDEEFFGGHHIIJJKKLLMMNN (hereditary sequence 400)">), and/or within an image, video, document, HTML or digital file, e.g. EXIF/Photo 1.jpg: "Image Description": AABBCCDDEEFFGGHHIIJJK-KLLMMNN (hereditary sequence 400). By placing a hereditary sequence 400 within a hyperlink, the hyperlink and the content related therewith can be searched within the hereditary system 100 and will enable relationship sharing with other digital media files sharing a hereditary trait(s) 404 with the hyperlink's hereditary sequence 400.

In accordance with an example embodiment of the present invention, the hereditary sequence 400 can represent any combination of a search term or search terms, Internet search, search conducted through an Internet search engine, image recognition data determined by well-known image recognition methods, image data, image meta data, XML, exif image data from well-known file formats including, but not limited to PNG, JPG, TIFF, BMP, video image data, video image meta data, XML, video exif image data from well-known file formats including, but not limited to MP4, MPEG, M4V, AVI, and WMV, audio data, audio meta data, XML, audio exif data from well-known file formats including, but not limited to MP3, AIFF, and WAV, Portable Document Format (PDF) data, or meta data PDF XML,data, meta data or XML from well-known office document formats (DOC, DOCX, XLS, RTF), data, XML, meta data from well-known productivity document formats (CAD, PSD, AI, EPS, 3 DM, OCR, MB, MA, MAX, BLEND), data, XML, meta data from well-known Internet document formats (HTML, HTM, VRML, PHP, JSP), a single alphabetic character, symbol or unicode character, a string, word, series of characters or paragraphs, a data from text or text within webpages, emails, text messages, books, PDF's or manuscripts determined by well-known methods of computational linguistics, data or an image of a digitally generated fingerprint used for secure access to computing devices, a customer account number, credit card number or social security number used in payment processing, a set of GPS coordinates, satellite data or map data, individual IP addresses, IP blocks or Internet domain names.

In accordance with an example embodiment of the present invention, the hereditary sequence 400 can be acquired or encoded or embedded in image exif data or image metadata, HTML file, metadata related to an HTML file, HTML META TAG, HTML HREF URL, video exif data or image metadata (PNG, JPG, TIFF, BMP), an image or video through editing software, an image or video through its native algorithm or generation of an image header, stub or wrapper, in the metadata common office and productivity formats including, but not limited to PDF, DOC, DOCX, PSD, CAD, etc., in Internet browser technology, on a credit card, bar code, payment processing device, within UPC coder QR code, in well-known word processors, document creation software, image editing, 3D editing, video processing, HTTP servers, SMTP/IMAP servers, and mobile devices, in well-known enterprise software including, but not limited to databases, human resources, product tracking, control and logistics systems.

In operation, the characteristics and instructions described by the hereditary root classifications 402, hereditary traits 404, making up the hereditary sequence 400 are each derived, by the hereditary processing unit 216. In particular, the hereditary processing unit 216 derives the hereditary sequences 400 from the digital media file itself, from data automatically obtained by a device originating the digital media file, and/or from data manually input by a user to define the digital media file. The digital media files can be automatically encoded with the hereditary sequence 400 at the point of file creation and/or after the digital media files already exist (e.g., in a conversion process) by the hereditary processing unit 216. For example, a user can take a picture, input information about the picture (e.g., subject matter, data, location, etc.), and the hereditary processing unit 216 can encode the picture with the hereditary sequence 400 based on the input information. Similarly, the hereditary sequence 400 for the picture can also include additional information automatically gathered from the user device 104 and/or the digital picture itself. For example, the user device 104 capturing the picture can automatically obtain and include location information received from a global positioning system (GPS) of the user device 104 and/or perform a checksum on the picture to obtain metadata stored about the picture. A combination of the user entered data and automatically machine gathered data are used in the generation of the hereditary sequence 400.

In accordance with an example embodiment of the present invention, the hereditary sequence 400 is generated by a combination of hereditary software (e.g., installed on the user device creating the digital media file), the hereditary server 102, and/or the hereditary processing unit 216. For example, the user device 104 can be used to capture the digital media file (e.g., picture), collect data about the digital media file and the content contained within the digital media file, and pass the digital media file and collected data to the hereditary server 102 for processing (e.g., creation, natively compiling, and encoding or embedding a hereditary sequence 400). The hereditary server 102 can transmit the received digital media file and/or collected data for the digital media file to the hereditary processing unit 216 for the creation, natively compiling, and encoding or embedding of the hereditary sequence 400 for that digital media file. In particular, the generating software/hardware (e.g., the sensors 218 and preprocessor 220) can accept the input information related to a digital media file (e.g., a picture) in the native format (e.g., asci format) provided by the originating device (e.g., the user device 104) and convert the native format into a format convertible by the hereditary processing unit 216 (e.g., binary, bytecode, etc.). Using the converted format, the hereditary processing unit 216 can generate a hereditary sequence 400 for the digital media file (e.g., the picture) based on the received input information and encode or embed the hereditary sequence 400 into the digital media file. In accordance with an example embodiment of the present invention, the hereditary sequence 400 is generated utilizing the descriptors defined in the hereditary ontology 222 by applying a set of heuristics form the hereditary ontology 222 to the received data information for the digital media file. The heuristics employ probability, three-dimensional analysis, graphical model analysis to determine inheritance relationships for each of the hereditary traits 404 within the hereditary sequence 400. For example, the hereditary system 100 determines the probability to a plurality of checksums, search terms, letter, bytecodes are (x) standard deviations from primitives within the hereditary ontology 222.

In particular, the application of the heuristics associates the received data information for the digital media file with the appropriate descriptors in the hereditary ontology 222 to create the hereditary trait(s) 404 associated with that information. The received data information can include information about the content of the digital media file (e.g., subject matter, copyright owner, etc.) and/or instructions on how to treat the digital media file (e.g., enable for networking, sharing, licensing, etc.) For example, if the hereditary processing unit 216 receives data indicating that the subject matter of the digital media file is Paris, then the hereditary processing unit 216 will look up the descriptor associated with Paris in the hereditary ontology 222. The descriptor for Paris in the hereditary ontology 222 can be represented with unique characters or symbols representing hereditary intersections based on the mapping in the hereditary ontology 222, for example, and the hereditary processing unit 216 can utilize the unique characters to populate the subject matter hereditary trait 404 (e.g., position 1 of the hereditary sequence 400) when generating the hereditary sequence 400.

In accordance with an example embodiment of the present invention, the utilization of hereditary sequences 400 enable unique a hereditary Internet in which the hereditary ontology 222 is constantly and dynamically updating digital media files throughout the hereditary system 100. Similarly, the hereditary sequences 400 are dynamically updating, such that when primitive objects related to the hereditary sequence 400 are updated in the hereditary ontology 222, the hereditary sequences 400 are also updated. For example, numerous websites are available on the Internet and each website includes a plurality of digital media files. Each of the websites and the plurality of digital media files included therein are linked and via their respective hereditary sequences 400. Websites and the digital media files sharing portions of hereditary sequences 400 can be updated via mutation whenever the hereditary ontology 222 has been updated. Accordingly, all the digital media files within the hereditary system 100 form a global hereditary networking scheme. In accordance with an example embodiment of the present invention, the dynamic updating and networking can be initiated by the hereditary server 102 (e.g., URL callbacks). The result is that a single photo of Paris, France will automatically network with millions of related images, videos, webpages, and text, such that every file containing a hereditary sequence 400 will enable content on the hereditary Internet to self-organize into hereditary networks and hereditary ontologies.

In accordance with an example embodiment of the present invention, the hereditary server 102 can encode or embed existing digital media files and/or web content with hereditary sequences 400. The existing digital media files and/or web content that are converted to include hereditary sequences 400 will be included within the hereditary system 100. Once the digital media files and/or web content are included within the hereditary system 100, those digital media files and/or web content can be networked and share relationships with all the other digital media files and/or web content in the hereditary system 100. Advantageously, the converted digital media files and/or web content can be searched, networked, etc. in accordance with aspects of the invention. For example, in the process of encoding, well known programs such as Adobe Photoshop, Final Cut Pro, or Microsoft Word will interact with the hereditary processing unit 216 to acquire a hereditary sequence 400 during the digital media file encoding process. In other well know programs or programming language API's, the hereditary processing unit 216 is accessed during the compiling process of a given binary output such as PNG or JPG. In another example process, a digital media file (e.g., Word doc, image, PDF, etc.) is accessed for writing a hereditary sequence 400 to its metadata. As would be appreciated by one skilled in the art, the hereditary ontology 222 is essentially a large graph allowing ease of traversal in comparison with traditional linear hierarchy. For example, Martin Luther King (MLK) or Elvis are primitive entities within the hereditary ontology 222 with no direct mapping between their respective primitive entity name and the name of the entity meaning, such that Elvis Presley is not equal to EP. Once the hereditary processing unit 216 finds intersection across a broad range of primitive objects or primitive elements (e.g., from checksums, bytecode, etc.) the hereditary processing unit 216 simply transcribes the value of each intersection (network node), a cipher representing that network into the position on the hereditary sequence 400. In other words, the hereditary processing unit 216 is directly mapping inheritance and physical digital characteristics with ciphers using the mapping in the hereditary ontology 222.

To convert existing digital media files and/or web content the hereditary server 102 employs known methods for acquiring and indexing existing websites and the files within the acquired websites. For example, the hereditary server 102 can use various known methods such as a string tokenizer to parse website content or perform checksums on images, and acquire metadata to gather information about the content. Upon adequate aggregation of indexed websites and data, the hereditary server 102 can initiate to hereditary processing unit 216 to perform a series of heuristic processes to create hereditary sequences 400 for all elements of a given websites. For example, the hereditary processing unit 216 can create hereditary sequences 400 for images, documents, HTML pages, videos and audio files. The aggregated data, now represented or modified by hereditary sequences 400, is placed into the organized hereditary ontology 222, and thus replacing a traditional search index. In effect, the hereditary sequences 400 within the hereditary ontology 222 represent hereditary data for N number of websites, images, videos and document; and therefore, now exist as a hereditary global network.

In accordance with an example embodiment of the present invention, the hereditary sequence 400 includes instructions for the digital media file based on user selected settings (e.g., user settings selected in a user experience or user interface). For example, the hereditary sequence 400 can include instructions related performing an Internet search, advertising, copyright, networking of digital media files, licensing, etc. The instructions within the hereditary sequences 400 enable digital media files to independently network and self-organize into hereditary networks eliminating the need for vast amount of software code used in traditional search and advertisement systems. In particular, the digital media files are networked by identifying all other digital media files sharing a common hereditary trait 404. In other words, the hereditary sequences 400 represent a plurality of hereditary digital media files interacting with the hereditary processing unit 216 and possess permissions within the hereditary sequence 400 to network. When the hereditary processing unit 216 identifies that the digital media files have permissions to network, the hereditary processing unit 216 networks the respective digital media file by mutating the hereditary sequence 400 of the digital media file such that intersections with hereditary sequences 400 of other digital media files represent a network. Upon mutation/updating of the hereditary sequence 400 for a digital media file, the independent interaction with the hereditary server 102 and hereditary processing unit 216 allows each hereditary digital media files to send and receive messages. To send and receive messages the digital media files must be executable. For example, the digital media files can be configured similarly to a PNG file such that it can read/write from the file system.

In accordance with an example embodiment of the present invention, the instructions within the hereditary traits 404 can be related to but not limited to networking, content networking, broadcasting, media type, copyright, ownership, permissions, trademark, subject matter, advertising, inheritance, mutation, relevance, content rank, educational rank, social rank, taxonomy, ontology, licensing, syndication, prices, fees, history, blocked networks. Each of the different instructions can be provided to the hereditary processing unit 216 and the hereditary processing unit 216 will recognize the instruction and perform specific operations to fulfill those instructions and/or encode or embed the instructions into the hereditary sequence 400. As would be appreciated by one skilled in the art, the hereditary sequence 400 can provide data for instructions that can be implemented using computer code or website code (e.g., Javascript, PHP, HTML, Python) containing instructions for search, advertising and copyright for a variety of usages. In accordance with an example embodiment of the present invention, the hereditary sequence 400 can be implemented to replace traditional functions related to search engines, news, live feeds, RSS feeds, etc. with a single hereditary sequence 400 containing instructions for searching, advertising, copyright, social media, etc.

In accordance with an example embodiment of the present invention, the hereditary sequences 400 encoded or embedded within each digital media file can be interpreted by the hereditary processing unit 216 utilizing the unique hereditary ontology 222 maintained and/or stored in the hereditary server 102. For example, the hereditary processing unit 216 can receive a hereditary sequence 400 and decipher all of the characteristics and instructions (e.g., hereditary traits 404) for the digital media file associated with that hereditary sequence 400. Additionally, the hereditary system 100 and/or the hereditary processing unit 216 can be configured to interpret and manage finite ontologies, generate mutations, perform mutations, and executes heuristic functions related to the hereditary sequences 400, as discussed in greater detail herein. In accordance with an example embodiment of the present invention, the hereditary sequence 400 can be encoded or embedded in digital media files throughout the web (e.g., the hereditary Internet) enabling the content of the digital media files to be searchable by the hereditary processing unit 216 and/or a hereditary system 100. For example, the hereditary system 100 can execute searches to find any digital media files matching (e.g., utilizing sets) the search criteria (e.g., particular traits) without relying on searching text based search algorithms utilized in traditional web searching systems.

As would be appreciated by one skilled in the art, the various functions or instructions can be received and executed by the hereditary system 100 (e.g., hereditary server 102, etc.) utilizing the hereditary sequence 400 and the results of the executed functions or instructions can be provided to the user via a user experience (UX) or user interface (UI). For example, the user can access the user experience or user interface to perform functions related to Internet searches, create and upload content, manage their profile of content, etc. Each of these functionalities presented in the user experience or user interface would be uniquely designed to perform the respective functions (e.g., searching) using hereditary sequences 400 and/or influence the creation or mutation of hereditary sequences 400, as discussed in greater detail herein.

Figure 5:
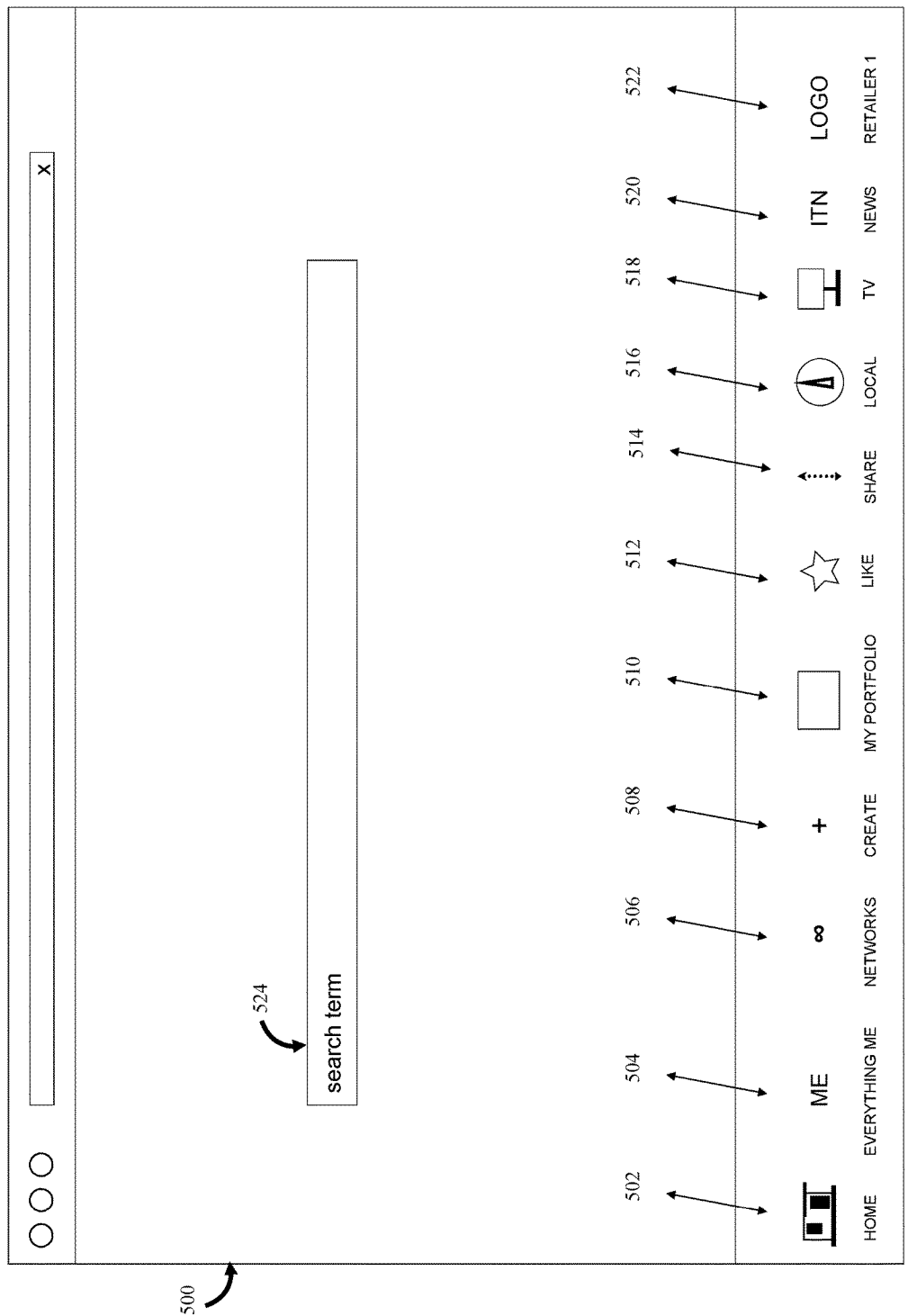
FIG. 5 is a an illustrative user interface environment for implementing aspects of the invention.

In accordance with an example embodiment of the present invention, the hereditary server 102 is configured to generate the user experience 500. In particular, the hereditary server 102 is configured to provide an interface to be displayed on user devices 104 (e.g., hosts a web app, web page, etc.). FIG. 5 depicts an illustrative example of the user experience 500 generated by a user device 104. For example, the user experience 500 can be generated and represented by a web-based application, mobile device application, or firmware interface on a computing device 200 (e.g., a user device 104). As would be appreciated by one skilled in the art, the user interface can be implemented as any type of application known in the art (e.g., a mobile app, a software application, etc.). The user experience 500 includes a variety of functional elements accessible by the user to activate the respective functions to be carried out combination with the hereditary server 102 and/or the hereditary processing unit 216. The hereditary server 102 and/or hereditary processing unit 216 includes or is otherwise in communication with the user experience 500 and are operable to carry out the functional aspects of the present invention.

In accordance with an example embodiment of the present invention, the user experience 500 functional elements include, but are not limited to, a home function 502, a user profile function 504, a network function 506, a create function 508, a like function 512, a share function 514, a local function 516, an entertainment function 518, a new function 520, an advertisement function 522, and a search bar function 524. Each of the user experience 500 functional elements provides unique functionality provided by the hereditary system 100. In particular, the user experience 500 provides functional elements that trigger instructions to be executed by the hereditary server 102. For example, by entering search terms into the search bar function 524, the user experience 500 will create a data string including the search terms and instructions for the hereditary processing unit 216 to execute a search within the hereditary system 100 using those search terms. In response to receiving the instructions from the user experience, the search will be performed by the hereditary server 102 and the results will be returned to the user experience 500 for display to the user. As would be appreciated by one skilled in the art, each functional element can include a particular instruction(s) to be passed to the hereditary processing unit 216 for processing. Accordingly, upon activation of a particular functional element by the user, the user experience 500 will include an instruction associated with the functional element with the other data (e.g., digital media file data, hereditary sequences 400, etc.) being transmitted to the hereditary server 102.

In accordance with an example embodiment of the present invention, activation of each of the user experience 500 functional elements initiates one or more instructions to be sent to the hereditary server 102 and/or hereditary processing unit 216 for processing and subsequently displaying the result. In particular, activation of a functional element in the user experience 500 will cause the hereditary processing unit 216 to mutate an existing hereditary sequence 400 to be mutated and/or cause a creation of a new hereditary sequence 400, depending which function element is activated. In accordance with an example embodiment of the present invention, activation of functional elements in the user experience 500 can dictate certain hereditary traits 404 to be mutated and/or created in a hereditary sequence 400 and by association its respective digital media file. For example, the user can enable or disable certain characteristics of a hereditary sequence, such as enabling the digital media file associated with the hereditary sequence 400 being available for sharing, networking, advertising, etc.

As would be appreciated by one skilled in the art, each of the user experience 500 functional elements can be activated by selecting/clicking a graphical button displayed on a device (e.g., user device 104). Each of the functional elements provides the user with unique functionality and unique instructions to be provided to the hereditary processing unit 216 to produce the unique functionality. For example, the home function 502 provides the user with a customizable home screen which is stored and managed by the hereditary server 102 (e.g., on the storage system 212). The home screen provide by the home function 502 can include information specific to the user logged into the hereditary system 100 (e.g., hereditary application/software). Similarly, the user hereditary profile function 504 provides the user with content populated by the hereditary system 100 customized to the user and the user's previous behaviors and/or interactions with the user experience 500. In particular, each user has a hereditary profile with a unique hereditary sequence 400 (e.g., Set T) stored within the hereditary system 100. The Set T associated with the hereditary sequence 400 for the hereditary profile represents a hereditary ontology. The hereditary profile associated with that user which is constantly modified as the user performs actions within the user experience 500 (e.g., searching, creating networks, etc.), as discussed in greater detail herein. In accordance with an example embodiment of the present invention, the user can create a hereditary profile with points of interest and the hereditary system 100 will deliver the digital media files related to the points of interest directly to the user when the user profile function 504 is activated.

As would be appreciated by one skilled in the art, any data related to the user experience 500 (e.g., the home screen, user profile, etc.) can be stored and/or managed by a variety of locations and devices. For example, the local device (e.g., user device 104) can store cache data within the hereditary application; the hereditary server 102 can store the data, and/or some other data storage system (e.g., a cloud based system). In accordance with an example embodiment of the present invention, whenever the user activates any of the functional elements, the user experience 500 will also transmit the hereditary sequence associated with the user profile to be updated to reflect the user's actions. Accordingly, each action the user takes in the user experience 500 will affect the user's hereditary sequence 400 and the digital media files that will be populated in the user's home page.

In accordance with an example embodiment of the present invention, the user experience 500 and the hereditary system 100 provides other functional elements that involve creating and mutating hereditary sequences 400 to provide customizable user experiences. As would be appreciated by one skilled in the art, reference to the hereditary system 100 performing steps, operations, processing related to the functional elements can include any combination of the hereditary devices (e.g., as depicted in FIG. 1), the hereditary software, and the applications carrying out those functional elements. Similarly, to the user profile function 504, the network function 506, the create function 508, the like function 512, the local function 516, the entertainment function 518, the news function 520 and the advertisement function 522 each allow users to create and mutate hereditary sequences 400 associated with each of those functions for unique experiences. In particular, creating and mutating the hereditary sequences 400 associated with these functional elements will change the type, amount and how digital media files that area returned and/or networked. In other words, each of the hereditary sequences 400 associated with those functions (504, 506, 508, 512, 516, 518, 520, 522) will cause a unique collection of digital media files to populate within the user experience 500 based on the user's preference and/or specified criteria. For example, the hereditary sequence 400 associated with the news function 520 will cause the user experience 500 to populate news digital media items customized to the user's preferences (as defined in the hereditary sequence 400) when the news function 520 is activated.

In accordance with an example embodiment of the present invention, the network function 506 enables a user to access and modify a unique hereditary sequence 400 utilized by the hereditary system 100 to populate a network of digital media files related to that hereditary sequence 400. Hereditary networks are networks of files of hereditary files able to communicate through a hereditary server. In particular, the hereditary networks enable global networking of digital media files distributed across a network (e.g., the Hereditary Internet) with links back to the hereditary server 102 that are mutated and inherited by the hereditary processing unit 216. For example, a user can utilize the user experience 500 to access a constantly updating network that populates all digital media files associated with a particular set(s) of subject matter. The networked digital media files can be viewed and/or modified by the network function 506. The hereditary sequence 400 associated with a network can be dynamically updated with new digital media files whenever relationships associated with hereditary sequence 400 within the hereditary ontology 222 are updated. In accordance with an example embodiment of the present invention, the hereditary networks can be automatically created by one the user's actions with other functional elements of the user experience 500. For example, each search performed by the user experience 500 creates a new hereditary network (e.g., superset of all digital media files related to the search terms) to be added to the network function 506.

Similarly, the create function 508 enables a user to create a unique hereditary sequence 400 to populate a new network of digital media files related to that hereditary sequence 400. In particular, the user enters content to be used in creation of a new hereditary network and the content is transmitted to the hereditary server 102 with instructions to create a hereditary sequence 400 for that particular content. The hereditary sequence 400 can be utilized by the user experience 500 to populate a network of digital media files related to that hereditary sequence 400. For example, the user can create a network for digital media files related to automobiles and Europe and the hereditary processing unit 216 will create a unique hereditary sequence 400 to encapsulate all the digital media files including either automobiles, Europe or both (based on a user preference). The resulting hereditary sequence 400 will then cause the user experience 500 to populate digital media files including hereditary trait(s) 404 for automobiles and/or Europe. As would be appreciated by one skilled in the art, once a user has created a new network utilizing the create function 508, the updated network can be accessed at a later date using the network function 506.

In accordance with an example embodiment of the present invention, the like function 512 initiates a modification to the user's personal hereditary sequence 400 (e.g., the user's hereditary profile), as discussed in greater detail herein. For example, the user activating the like function 512 while viewing a particular digital media file or set of digital media files, will trigger the hereditary system 100 to automatically update the hereditary sequence 400 associated with the user's hereditary profile be updated to reflect the user's interest in that content. As would be appreciated by one skilled in the art, all of the user's interactions with the user experience 500 can be tracked and used to update the user's profile hereditary sequence 400, such that the content throughout the user experience is customized to the user.

In accordance with an example embodiment of the present invention, the share function 514 enables a user an ability to share and/or broadcast a digital media file to other users over a variety of communication mediums and/or systems. For example, the user can select a digital media file they are viewing within their personal user experience 500, activate the share function 514 to trigger the hereditary system 100 to automatically share that content to other users via short message service (SMS), email, messenger service, social media systems, and/or within the hereditary system 100. As would be appreciated by one skilled in the art, the share function 514 can include preferences allowing the user to specify how and to whom the content is shared. For example, the user can select a friend or group of friend to share the content over all related social media accounts.

In accordance with an example embodiment of the present invention, the advertisement function 522 enables the user to create and modify a unique hereditary sequence 400 related to advertising content presented to the user within the user experience 500. For example, the user can select types, genres, amounts, etc. criteria as it relates to advertising and the advertising hereditary sequence 400 is automatically updated accordingly. Similarly, the advertisement function 522 can provide the user with preferences as to what promotions, incentives, and discounts that the user would be interested in receiving. Based on the user preferences in the advertisement function 522, the user experience 500 can broadcast targeted advertisements to hereditary networks, promotions, etc. to the user. In accordance with an example embodiment of the present invention, the advertisement function 522 can be utilized by the user to make personal content (e.g., from the user portfolio function 510) available for use by advertisers. For example, the user can set preferences in the advertisement function to allow access to the user's own digital media files (e.g., photographs) and/or portfolios to be used in advertisements for a user defined fee. As would be appreciated by one skilled in the art, advertising entities can similarly use the advertisement function 522 to seek out digital media available for use in advertisements.

In accordance with an example embodiment of the present invention, the search bar function 524 enables the user to enter search terms to be processed by the hereditary server 102 and/or hereditary processing unit 216, as discussed in greater detail herein. In particular, the search term entered into the search bar function 524 will be transmitted to the hereditary server 102 with instructions to create a hereditary sequence 400 for that particular search term. The hereditary server 102 will generate a unique search hereditary sequence 400 derived from the search term using the hereditary ontology 222. For example, the user can perform a search related to automobiles and the hereditary processing unit 216 will create a unique hereditary sequence 400 to encapsulate all the digital media files including automobiles. The resulting hereditary sequence 400 will then cause the user experience 500 to populate digital media files including hereditary trait(s) 404 for automobiles. The unique search hereditary sequence 400 will be returned to the user experience 500 which will cause the user experience 500 to populate all of the digital media files with hereditary sequences 400 related to the hereditary sequence 400 produced from the search terms.

Figure 6A:
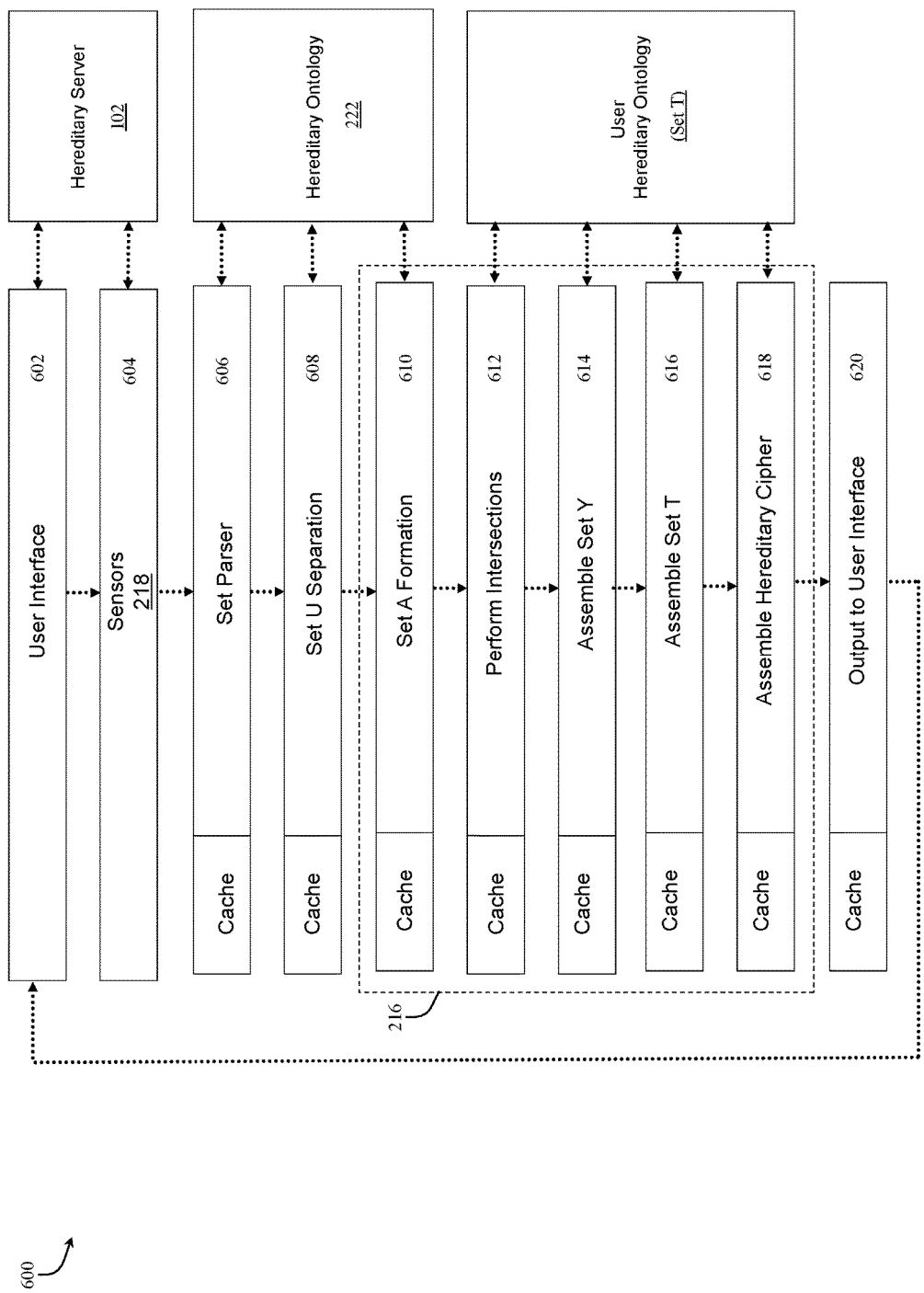
FIGS. 6A and 6B are illustrative flowcharts depicting an exemplary architecture, in accordance with aspects of the invention.

In operation, the hereditary system 100 follows a pipeline of operations 600 for generating, mutating, and/or utilizing hereditary sequences 400 and/or executing the various user experience 500 functional elements related to those hereditary sequences 400. An illustrative example of the pipeline of operations 600 is depicted in FIG. 6A. In particular, FIG. 6A depicts the pipeline of operations as they relate to the hardware elements in the hereditary system 100. In accordance with an example embodiment of the present invention, the pipeline of operations 600 begins with the user experience 500 (step 602). In particular, the pipeline of operations 600 is initiated by activation of one or more functional elements (functional elements 504, 506, 508, 510, 512, 514, 516, 518, 520, 522, 524) in the user experience 500. For example, a user can trigger the pipeline of operations 600 by entering a search term into the search bar function 524 and initiating the search (e.g., hitting enter, hitting search button, etc.) within the hereditary Internet (e.g., searching digital media files encoded with hereditary sequences 400 included within the hereditary system 100). As would be appreciated by one skilled in the art, a user selecting any of the functional elements of the user experience 500, as discussed herein, can be used to initiate the pipeline of operations 600 and subsequent generation, modification, and/or utilization of the hereditary sequences 400 in accordance with the present invention. The input from the user experience 500 is transmitted to the hereditary server 102 to be passed to the sensors 218.

The sensors 218 perform preprocessing on the input data and organize the data for further processing by the hereditary processing unit 216 (step 604). The input data is provided to a set parser to separate the user experience 500 instructions (e.g., instructions associated with the activated functional element) from the input data (e.g., search string) (step 606). The parsed input data is stored in a content cache for Set A and the instructions are stored in a cache for Set U. Each of the individual received instructions can be stored in as a separate entry in the cache for Set U (step 608). As would be appreciated by one skilled in the art, each functional element of the user experience 500 can include a single or multiple instructions to be passed to the hereditary server 102 for processing.

Once the input data received from the user experience 500 has been parsed and stored into the respective cache storage, the hereditary processing unit 216 can perform the requested hereditary processing (e.g., creation, natively compiling, encoding or embedding, mutation, etc. of hereditary sequences 400). The hereditary processing unit 216 starts by reading the input data from the content cache to create Set A. The hereditary processing unit 216 parses the individual primitive objects from the input data and creates a set of primitive objects and stores the set of primitive objects as Set A (step 610). The hereditary processing unit 216 compares the primitive objects in the Set A to the primitive objects in predetermined sets stored in the hereditary ontology 222 (e.g., Sets N) to identify intersections between the compared sets (step 612).

The hereditary processing unit 216 assembles a new Set Y from the Sets N that have primitive objects that intersect with the primitive objects in Set A. In particular, the hereditary processing unit 216 performs a union of the primitive objects between the identified Sets N and the Set A to create the new Set Y (step 616). The hereditary processing unit utilizes the new Set Y and a user's hereditary profile sequence 400 (Set T) to assemble a new Set T (step 616), as discussed in greater detail with respect to FIGS. 7D and 7E. The Set T represents the user's hereditary ontology, specifically, the hereditary sequence 400 and the network derived from that hereditary sequence 400 associated with the user's hereditary profile. As discussed in greater detail herein, the hereditary sequence 400 associated with the profile stores all the likes, content, search, advertising, etc. performed by the user in the user experience 500 such that it defines the user's behaviors and preferences. As would be appreciated by one skilled in the art, the Set T can be assembled utilizing a similar process in assembling Set Y. The hereditary processing unit 216 transforms the resulting Set Y and Set T into a hereditary sequence (step 618). In particular, the hereditary processing unit 216 transforms the sets into corresponding hereditary sequences 400 utilizing a combination of inheritance and compression as discussed in greater detail herein. The hereditary processing unit 216 and/or the hereditary server 102 outputs the resulting Set Y and the resulting Set T to the user experience 500 for display (step 620). As would be appreciated by one skilled in the art, the steps in FIGS. 6A and 6B are different depictions of the same pipeline of operations performed by the hereditary system 100, such that FIGS. 6A and 6B share the same implementation.

Figure 6B:
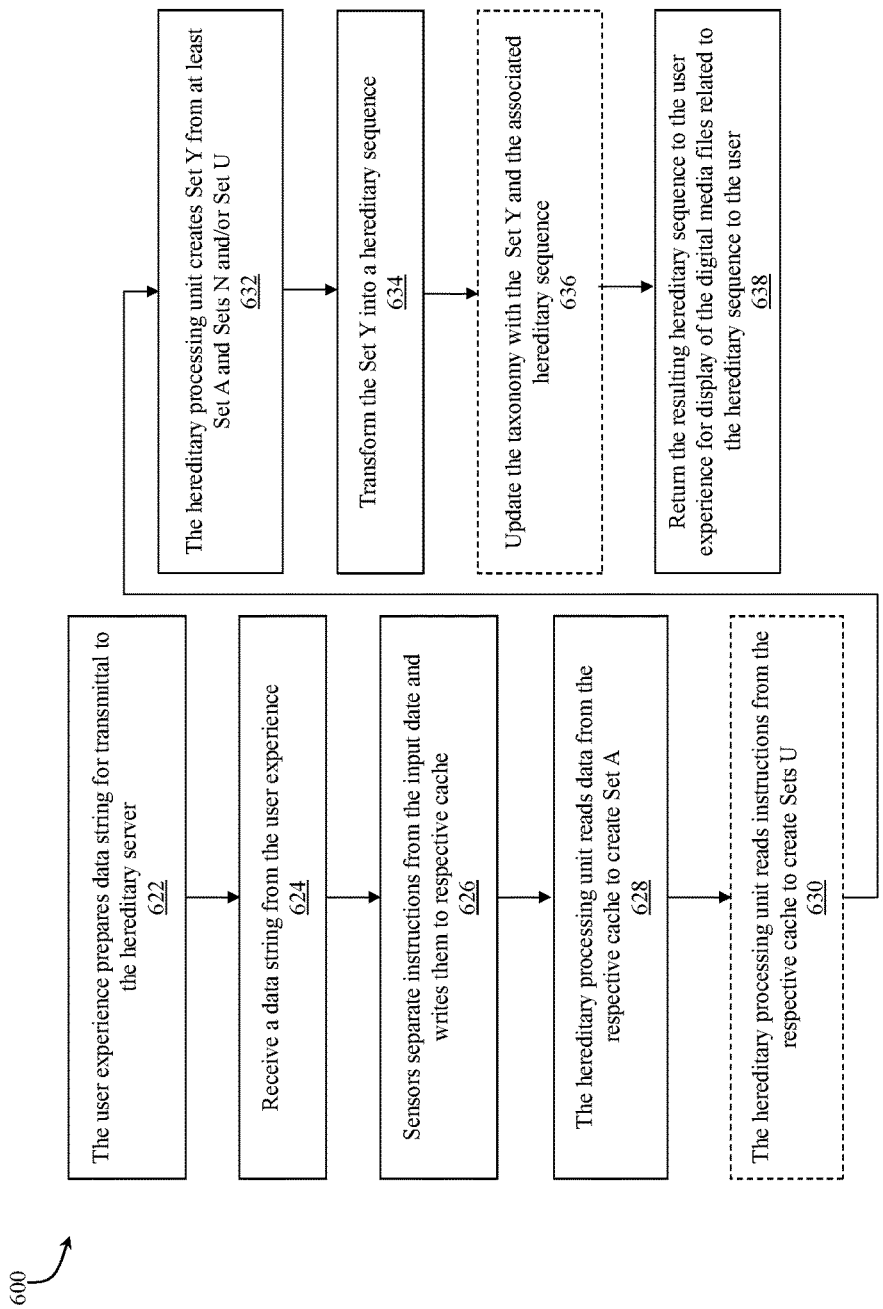

FIG. 6B depicts a flowchart of the pipeline of operations 600 as it relates to the hereditary server 102 and the hereditary processing unit 216. At step 622, the user experience prepares data to be transmitted to the hereditary server 102 for processing. In particular, the user experience 500 receives input data and/or activation of a particular functional element (504, 506, 508, 510, 512, 514, 516, 518, 520, 522, 524) from the user navigating the user experience 500. Based on the input data and/or the functional element being activated, the user experience 500 will prepare a data string including the input data and an instruction(s) corresponding to the particular function element. The instruction(s) can include any combination instructions to instruct the hereditary processing unit 216 to create and/or mutate the required hereditary sequence 400 required by the activated functional element. For example, the instructions can include instructions to create a new set by identifying intersections between sets (e.g., Sets A and Sets N) (for the search bar function 524) and combining intersecting sets, create a new set (e.g., Set Y) of selected primitive objects regardless of primitive object types (for the creating a network function 506), create a new set and find intersections of users and media (for the sharing function 514), etc. The prepared data string can be sent to the hereditary server 102 to be processed by the hereditary processing unit 216 in accordance with the included instructions. As would be appreciated by one skilled in the art, the data string can be prepared in any format known in the art. For example, the data string can be prepared in asci, binary, bytecode, etc.

At step 624 the hereditary server 102 receives input data from a source device (e.g., user device 104, Internet device 106). The input data can include varied datatypes including digital media files, hereditary sequence(s) 400, and instructions for what operations to be performed by the hereditary processing unit 216. In accordance with an example embodiment of the present invention, the hereditary server 102 can include a preprocessor 220 configured to prepare the different datatypes to prepare and extract the necessary information from the input datatypes (e.g., data strings) for processing by the hereditary processing unit 216. For example, the preprocessor 220 can be configured to run algorithms well-known in the art to extract the necessary information (e.g., checksums, discrete cosine transformation, etc.) from the received input data. As would be appreciated by one skilled in the art, the preprocessing step can vary based on the types of data received. For example, receiving a datatype including a search term and instructions to perform search operations may only require parsing or conversion of the data format of the datatype while receiving a digital media file may require running a checksum to extract metadata or exif data from the image to be used in creating a hereditary sequence 400 for the digital media file.

At step 626, the sensors 218 receive the resulting data, from the preprocessing performed in step 624, and organize the data for further processing. In particular, the sensors 218 receive the combination of the instructions and input data (e.g., search term, hereditary sequence 400, digital media file metadata, etc.) related to the instructions in a format readable as prepared by the preprocessor 220. The sensors 218 separate the instructions from the input data, and stores the separated instructions and input data into corresponding caches. For example, the instructions can be stored in a user cache for Set U and the input data into a content cache for Set A. The Set U represents a unique identifier pertaining to a user action derived from the user experience 500 (e.g., activating a particular functional element). In accordance with an example embodiment of the present invention, the sensors 218 can be programmed and perform operations (e.g., separations, storage, etc.) as dictated by a programming instructions interface (e.g., an application programming interface (API)).

At step 628, the hereditary processing unit 216 reads the input data from the content cache to create Set A. In particular, the hereditary processing unit 216 reads the input data and identifies the individual primitive objects in the input data. The individual primitive objects are parsed from the input data and creates a set of primitive objects and stores the set of primitive objects as Set A in a framework set cache. The hereditary processing unit 216 compares the primitive objects in the Set A to the primitive objects in predetermined sets stored in the hereditary ontology 222 as Sets N. In accordance with an example embodiment of the present invention, the hereditary ontology 222 includes a plurality of predetermined sets, Sets N, to describe various primitive objects throughout existence. The hereditary processing unit 216 identifies the Sets N that have primitive objects that intersect with the primitive objects in Set A and performs a union of the primitive objects between the identified Sets N and the Set A. The union of the Set A and the identified Sets N are formed to create a superset, Set Y. Accordingly, the superset Set Y is a network of unions and intersections of primitive objects. The Set Y is associated with a unique identifier and stored for additional processing and/or later recovery.

In accordance with an example embodiment of the present invention, the pipeline of operations 600 can include an optional step for performing additional modifications to a hereditary sequence 400 for a Set Y. In particular, the hereditary server 102 can receive specific user instructions to make modifications to settings (e.g., mutation to a hereditary trait(s) 404) for particular digital media file(s) or a collection of digital media files (e.g., networking, portfolio, etc.). For example, the user can provide specific instructions that include, but are not limited to, set all my photos and videos (e.g. in a portfolio) to indicate my copyright ownership, set all my photos to networking "on" to enable networking of the user's photos, my selected photos are available for license to enable other users to license the user's photos, etc.

Figure 7A:
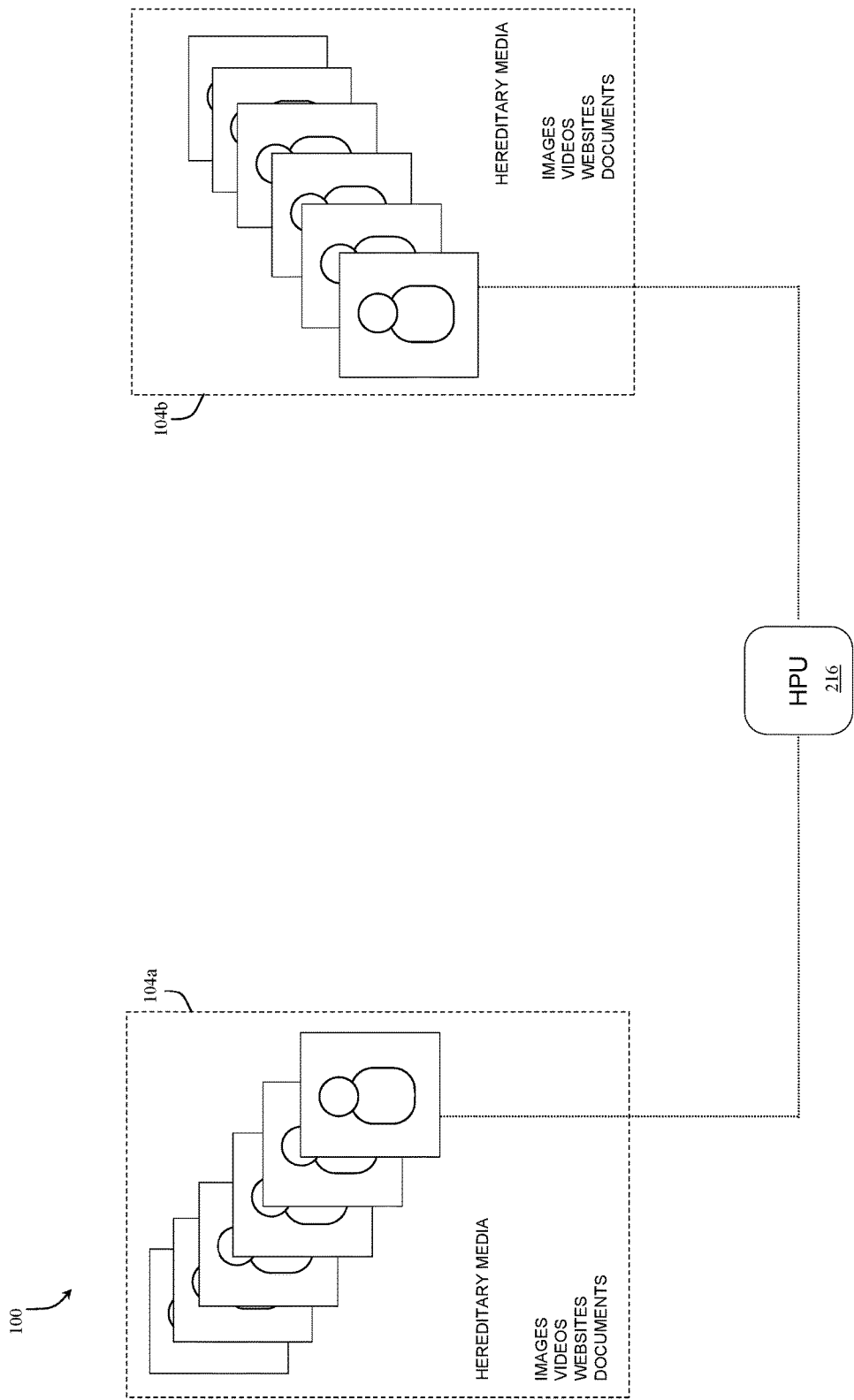
FIGS. 7A, 7B and 7C are diagrammatic illustrations of hereditary networking operations, in accordance with aspects of the present invention.
Figure 7B:
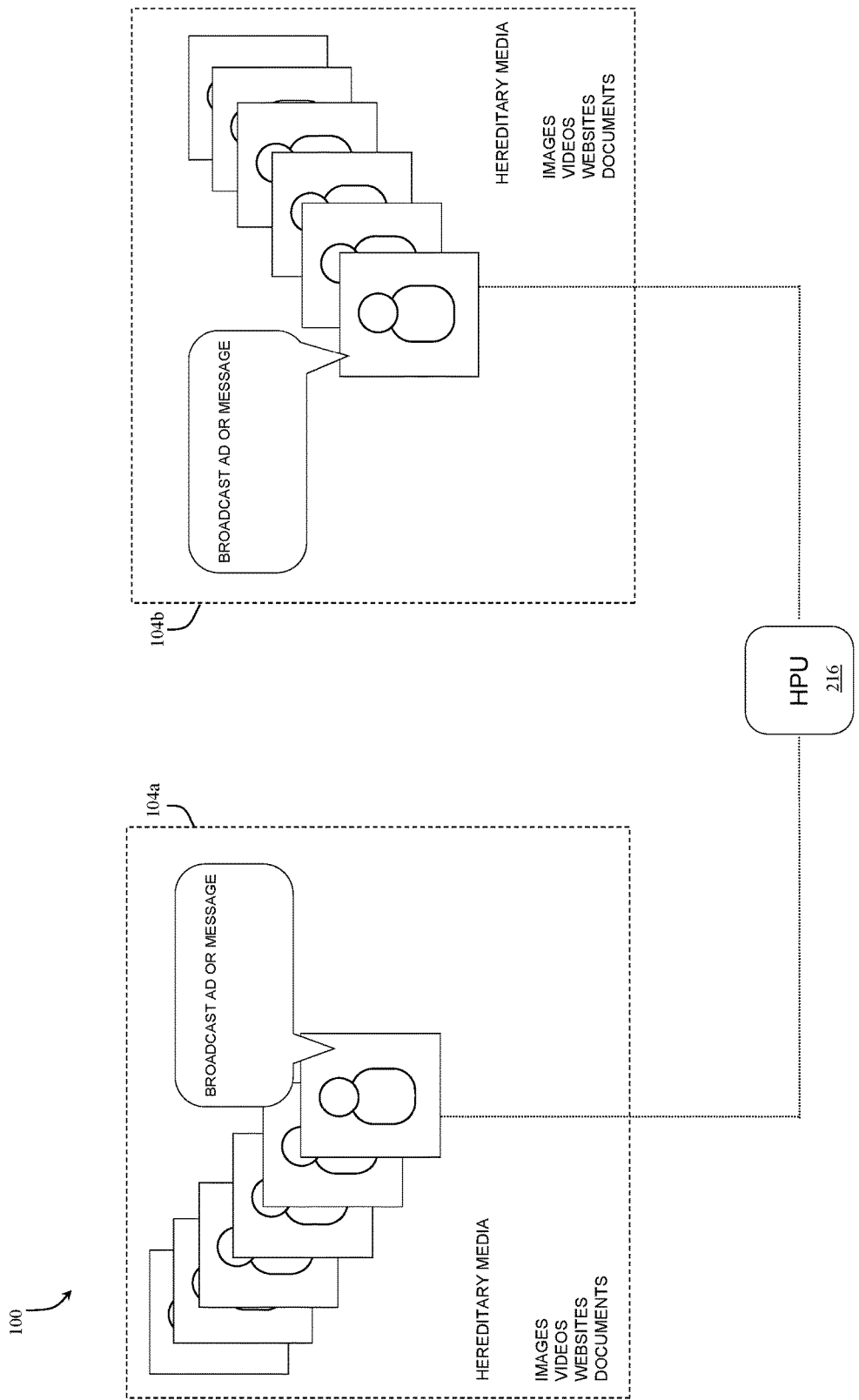

FIGS. 7A and 7B are diagrammatic illustrations of the networking process between users/user computing devices 104 within the hereditary system 100. In particular, FIGS. 7A and 7B depict the relationship between two separate collections of digital media flies and/or hereditary user profiles stored on separate user computing devices 104. The separate user computing devices 104 each maintain their own hereditary profiles and digital media files and can network, share, etc. the digital media files using the user experience 500. The hereditary processing unit 216 operates as an intermediary for providing user's functionality related to broadcasting content, advertisement content, social media content, and/or messaging content.

FIG. 7A depicts functionality related to utilizing the search engine functionality (e.g., the search bar functional element 524) of the hereditary system 100. Specifically, FIG. 7A depicts the inherent networking relationships between the digital media files, and their respective hereditary sequences 400, stored on separate computing devices (e.g., user computing devices 104, Internet devices 106, etc.). In particular, the related digital media files form a new ontology based on the shared hereditary traits 404 within their respective hereditary sequences 400. When performing a search within the hereditary system, as discussed in greater detail with respect to FIG. 8A, the hereditary system 100 can identify related digital media files (via intersection process of hereditary sequences 400) residing on a wide range of websites, servers and workstations globally are inherently networked (e.g. photos, videos and content of Kate Winslet on thousands of websites). The inherent networks are formed and searched through the existing hereditary processing unit 216 processes of forming sets, as discussed in greater detail with respect to FIGS. 6A, 6B, and 8A-8E, resulting in a hereditary or genetic network of hereditary media. The configuration of the hereditary server 102 and hereditary ontology 222 for the basis of forming a search engine are considered to be an automatic process (e.g. web crawling, bots, and web indexing).

Similarly, as would be appreciated by one skilled in the art, the inherent networking relationships can also be tied to the hereditary sequences 400 associated with user profiles. A user seeking social relationships and connections can instruct the hereditary processing unit 216 to perform intersection matching between the hereditary sequence 400 associated with the user's profile with other user profile hereditary sequences 400. For example, a numbers of users have established their desire to form social relationships (e.g., via the my profile functional element 510) with other users holding hereditary similarities (e.g., similar hereditary traits 404) within their hereditary profile.

FIG. 7B depicts an example of the user functionality related to broadcasting, advertising, and/messaging to users. In particular, FIG. 7B depicts an inherent networking relationship based on a user's hereditary profile settings in combination with the global network within the hereditary Internet in which an advertiser or user desire to broadcast advertising or messages. The content of the desired broadcast message, advertisements, etc. possess hereditary sequences 400 to be utilized by the hereditary processing unit 216 to identify users to display the content. In particular, the hereditary processing unit 216 performs intersect identification between the hereditary sequences 400 associated with user's hereditary profile settings and the hereditary sequences 400 of the content to be broadcast to identify matching interests/settings (e.g., hereditary traits 404). The hereditary processing unit 216 subsequently broadcasts the content to the identified users that match the content for the broadcast. For example, if the hereditary profile of the user, as reflected in the hereditary sequence 400 for the profile, indicates that the user would like to receive advertising related to automobiles, then advertising content related to automobiles, via their respective hereditary sequences 400, can be broadcast to the user.

In accordance with an example embodiment of the present invention, digital media files within the hereditary system 100 can be configured to broadcast advertisements, messages, etc. The hereditary processing unit 216 can identify matching digital media files with hereditary sequences 400 sharing a common hereditary trait 404 (e.g., images of Ray Charles) on all websites, server and workstations that possess compatible hereditary settings to receive broadcast messages. The compatible hereditary digital media files that are identified and configured to display broadcasts can receive the broadcast content and display them within their existing display (e.g., website, webpage, etc.). For example, the hereditary digital media files may accept network socket connections interacting with the hereditary server; or in other cases, the hereditary media may require the support of HTML or similar technologies to display the broadcast advertising or message.

As would be appreciated by one skilled in the art, the user setting instructions can be transmitted to the hereditary server 102 along with the other input data and instructions. The user instruction settings are individual traits 404 within the hereditary sequences 400 within the user's profile (e.g., portfolio). The user setting instructions will be handled by the hereditary server 102, the sensors 218, and the hereditary processing unit 216 in a manner similar to the other instructions discussed herein. In accordance with an example embodiment of the present invention, each of the particular individual hereditary traits 404 can have their own instructions with settings that can be modified by a user by selecting settings within the user experience 500. By changing settings in the user experience 500, the user triggers modifications to the hereditary traits 404 associated with the corresponding digital media file(s) and the settings to be performed by the hereditary processing unit 216.

At the optional step 630, the hereditary processing unit 216 reads the instructions from the user experience 500 representing functional element commands, such as network the primitives in the set or otherwise stored in cache as Set U. In particular, the hereditary processing unit 216 reads the input data and identifies the user instruction settings in the input data. The user instruction settings are parsed from the input data and the hereditary processing unit 216 compares the user instruction settings to the predetermined instruction settings stored by the hereditary system 100. For example, the hereditary processing unit 216 can reference a look-up table or profile to determine what instruction Sets correspond to the identified user setting instructions. The corresponding instruction Sets combined with the hereditary sequence 400 being modified and with the user setting instructions and are stored the set of primitive objects as Set U in a framework set cache. The hereditary processing unit 216 compares the primitive objects in the Set U to the primitive objects in predetermined instruction Sets to form a new Set U to be stored in the user cache.

In accordance with an example embodiment of the present invention, based on the particular received user settings instruction(s), the process of mutating a hereditary sequence 400 for a user setting instructions Set U can be simplified to modifying a single hereditary trait 404 of a hereditary sequence 400. For example, if the user indicates in the user experience 500 that they want to enable a particular digital media file to be available for licensing, then the user instruction is transmitted to the hereditary server 102 with the hereditary sequence 400 associated with the target digital media file and the user setting instruction to enable licensing. The hereditary processing unit 216 can then modify the single hereditary trait 404 associated with licensing (e.g., position 6 of the hereditary sequence 400) with the hereditary characteristics reflecting licensing enabled. As would be appreciated by one skilled in the art, this modification can be performed utilizing any combination of algorithms known in the art.

Figure 7C:
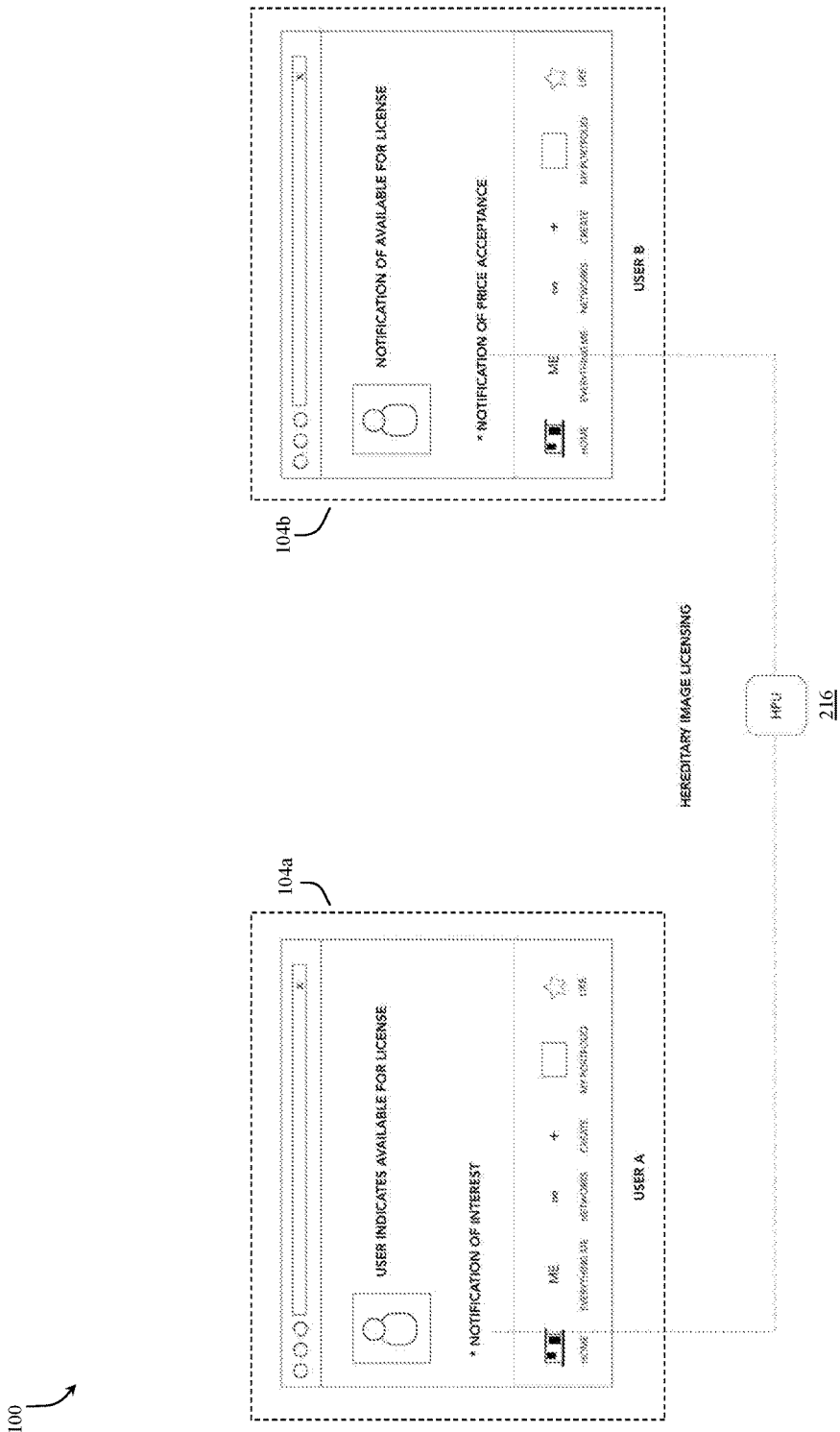

FIG. 7C depicts and exemplary depiction of the licensing process between two users in the hereditary system 100. In particular, FIG. 7C depicts the relationship between two separate collections of digital media files and/or hereditary user profiles stored on separate user computing devices 104a, 104b and the hereditary processing unit 216. As depicted in FIG. 7C, the separate user computing devices 104a, 104b each maintain their own hereditary profiles and digital media files and can network, share, etc. the digital media files using a user experience 500. The hereditary processing unit 216 operates as an intermediary for providing user's functionality related to licensing content between user devices.

In accordance with an example embodiment of the present invention, a first user (on computing device 104a) can select a digital media file(s) in their portfolio and indicate that the digital media file(s) (e.g., content including blonde hair blue eye model) is available for license (e.g., via the my portfolio functional element 510). Making the digital media file(s) available for license causes the hereditary processing unit 216 to mutate the hereditary sequence 400 of the digital media file(s) to reflects the modified availability. For example, the hereditary processing unit 216 receives instructions to mutate the hereditary sequence 400 to be available for license and mutate/update the hereditary sequence 400 accordingly (e.g., changing the character representation at position 6 of the hereditary sequence 400) and returned to the user computing device 104a.

Additionally, once the hereditary sequence 400 for the digital media file(s) is modified as available for licensing, the hereditary processing unit 216 can perform match making of the hereditary sequence 400 for the user of computing device 104a with hereditary sequences 400 of users requesting to license similar content (e.g., user of computing device 104b). The match making can be performed by performing an intersection analysis of the Set Y and other Sets N, as discussed herein. When the hereditary processing unit 216 matches a licensee (user of computing device 104a) and a licensor (user of computing device 104b) a message is transmitted to the respective user experience 500 for each user indicating a notification of interest and/or notification of price acceptance. Upon acceptance, the digital media file from the user of computing device 104a will be made available for use to the user of computing device 104b. As would be appreciated by one skilled in the art, the digital media file can be made available using any processes known in the art.

Continuing with FIG. 7C, a second user on a computing device 104b can express interest in licensing a particular form of digital media file (e.g., images, video, audio, etc.) matching a certain criteria (e.g., content including blonde hair blue eye model). The interest in licensing a digital media file can be made via the my portfolio functional element 510, as discussed in greater detail herein. The corresponding instructions and criteria are transmitted to the hereditary processing unit 216 for processing. In particular, the hereditary processing unit 216 is instructed to create a new Set T requesting a digital media file matching the user's request. The hereditary processing unit 216 mutates the Set T to reflect the request and stores the Set T in the hereditary ontology 222. Once the Set T is mutated and stored, the hereditary processing unit 216 can perform matching operations (e.g., intersection processing as discussed herein) to identify digital media files available for license matching the user's preferred criteria (e.g., content including blonde hair blue eye model). When a match is identified, the user can be notified that digital media file(s) matching their request are available for licensing. As would be appreciated by one skilled in the art, all matching digital media files can be returned for review of the content itself and the fees associated therewith. Upon acceptance of a given digital media file (e.g., from the user of computing device 104a), the digital media file from the user of computing device 104a will be made available for use to the user of computing device 104b. In accordance with an example embodiment of the present invention, the matching between a licensee and an interested licensor can be executed automatically by the hereditary processing unit 216, when the hereditary processing unit 216 identifies a match of user interests.

As would be appreciated by one skilled in the art, the example provided by FIG. 7C relates to licensing, but can be modified to operate in accordance with any identified relationship based on the other functional elements of the user experience 500 (e.g., advertising, networking, etc.). For example, the hereditary processing unit 216 can identify and automatically match a buyer and a seller of a particular digital media file or other tangible goods. In particular, the hereditary system 100 can track a number of users that are selling products (e.g. shoes, clothing, books and music) and match them to a number of users expressing a desire to buy those products (e.g., via the user experience 500). The corresponding hereditary sequences 400 between buyer and seller are resolved and intersections are identified through the hereditary processing unit 216, thereby forming an automatic transaction.

At step 632, the hereditary processing unit 216 creates Set Y from Set A and a union with at least one of Sets N or Set U or both. In particular, the Set A created and stored in step 628 is combined with the identified intersecting Sets N (as discussed in greater detail with respect to FIGS. 6A and 8A) and/or the Set U instructions derived and stored in step 630. As would be appreciated by one skilled in the art, if the received instructions from step 624 did not include user settings instructions to be process, then the Set Y will remain the union of Set A and the identified intersecting Sets N. If however there is a Set U created in step 630, then the original Set A from step 624 will be processed as a union with Set U, in addition to or in place of Set N, by the hereditary processing unit 216. For example, if there are instruction primitive objects in Set U then Set Y is created as a union of Set A, Sets N, and Set U. Otherwise, if there are no instruction primitive objects in Set U, the Set Y is created as a union of Set A and Sets N. In accordance with an example embodiment of the present invention, the union of Set A and Set U can be processed in the same manner as the Set A and Sets N, discussed with respect to FIGS. 6A and 8A. Once the Set Y is updated/created with the content of Sets N and/or Set U, the updated Set Y is stored and a hereditary sequence 400 is derived from the Set Y.

In particular, at step 634, the hereditary processing unit 216 utilizes the hereditary traits 404 and inheritance structure in the hereditary ontology 222 to create a hereditary sequence 400 that defines the primitive objects in Set Y (e.g., the combination of Set A and Sets N and/or Set U). For example, the hereditary processing unit 216 utilizes a graph organized by the hereditary ontology 222 in combination with the primitive objects in the Set Y to identify the hereditary traits 404 to create the hereditary sequence 400. As would be appreciated by one skilled in the art, not all positions of the hereditary sequence 400 will have to be resolved in this manner, they can be simple resolved by identifying the user setting instructions defined in Set U. In particular, positions 13-27, as depicted in FIG. 4A, can be defined by the values established in the user setting instructions of Set U. For example, if the user specifies that the resulting hereditary sequence 400 will not be used in syndication, then the hereditary trait 404 in position 14 will correspond to the pair of characters that reflect that syndication (e.g., position 14 of the hereditary sequence 400 as depicted in FIG. 4A) is disabled (e.g., as defined in the hereditary ontology 222).

At step 636, the hereditary ontology 222 is updated with the Set Y and its associated hereditary sequence 400. In particular, the Set Y, the hereditary sequence 400 for Set Y, and the unique identifier associated therewith is stored in the hereditary ontology 222. Once the Set Y is stored in the hereditary ontology 222, it can be constantly updated and networked with other digital media files sharing portions of the hereditary sequence 400. For example, each time a new Set Y is created, the Set Y in the hereditary ontology 222 acts as one of the Sets N for intersection with the new Set Y. When an intersection is found, both the new Set Y and the previously stored Set Y are updated to reflect the new linked relationship of primitive objects. In particular, if the new Set Y shares at least one object with the previously stored Set Y but also includes additional primitive objects no previously included in the primitive objects of the previously stored Set Y, then the hereditary processing unit 216 will update both Sets accordingly.

In accordance with an example embodiment, when a hereditary sequence 400 is updated in the hereditary ontology 222, the hereditary server 102 can transmit an updated hereditary sequence 400 to the corresponding digital media file in the hereditary system 100 associated with the updated Set. Each time a hereditary sequence 400 is updated, the hereditary system 100 considers this a mutation of the hereditary sequence 400. As would be appreciated by one skilled in the art, each time an update occurs to one or more hereditary sequences 400 in the hereditary ontology 222, the entire hereditary ontology 222 is updated because the relationships (symmetry) among hereditary sequences 400 are also updated in a chain reaction. Accordingly, all hereditary sequences 400 are constantly updating whenever new relationships are identified such that the digital media files for updated hereditary sequences 400 acquire new hereditary sequence 400 with each update.

At step 638, the resulting hereditary sequence 400 is returned to the user experience 500. In particular, the hereditary sequence 400 is returned to the user experience 500 and the user experience 500 can populate the digital media files that are associated with the hereditary sequence 400 for display to the user. The populated digital media files will include any digital media files that match at least a portion (e.g., one or more hereditary traits 404) of the hereditary sequence 400.

FIGS. 8A-8F depict illustrative examples of different functional elements being activated within the user experience 500 and how the hereditary processing unit 216 processes instructions related to the user interactions with the user experience 500 to generate, modify, and/or utilize hereditary sequences 400.

Figure 8A:
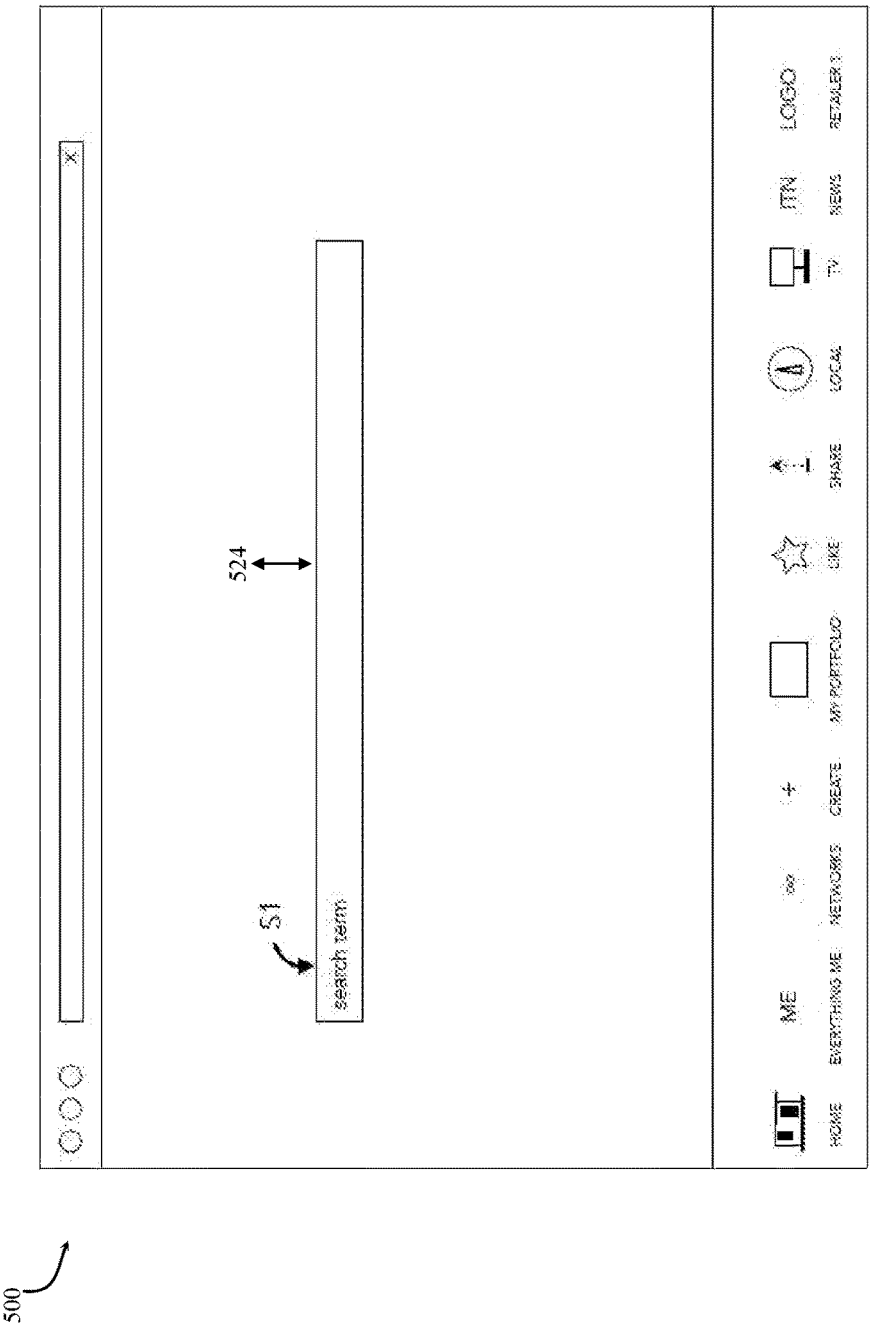
FIGS. 8A, 8B, 8C, 8D, and 8E are illustrative diagrams depicting an exemplary user interface, in accordance with aspects of the invention.

FIG. 8A depicts an example search S1 being performed by a user on the user experience 500. In particular, FIG. 8A depicts an illustrative example of performing a search within the hereditary internet (as depicted in FIG. 8A), once a user enters a search term(s) and initiates a search using the search bar function 524, the search term is converted into a data string (S1) including the search term and a set of instructions indicating that S1 is a search (step 602). As would be appreciated by one skilled in the art, the search S1 can consist of alpha numeric character or a string of characters entered into a search bar. For example, the user can enter keywords for a person, place, or thing that they are interested in finding related content and/or digital media files. For purposes of explanation the data string is referred to as S1, however, as would be appreciated by one skilled in the art, the use of S1 is not intended to limit the present invention to such identifiers. The set of instructions indicate that S1 is a search term/string to be processed by the hereditary system 100 or hereditary processing unit 216. As would be appreciated by one skilled in the art, the instructions can be encoded or embedded with the search term in the data string S1 by the hereditary application running the user experience (e.g., hereditary software, web application, mobile app, etc.). The data string S1 is transmitted to the sensors 218 via the hereditary server 102 and transmits the S1 to the hereditary processing unit 216 (step 604).

In accordance with an example embodiment of the present invention, the sensors 218 parse the data string S1 to identify instructions that S1 is a search with the search term(s) to be used in the search. As would be appreciated by one skilled in the art, the preprocessor 220 can perform the parsing and pass the instruction and search terms to the sensors 218 for additional processing. Upon identification that the data string S1 is a search (e.g., receiving or interpreting the instructions in S1) the sensors 218 place the search terms from S1 into a framework set, Set A of the cache (step 606). In particular, the sensors 218 identify each individual search term in the search S1 and add them as an individual primitive objects in the Set A. For purposes of explanation the framework set is referred to as Set A, however, as would be appreciated by one skilled in the art, the use of Set A is not intended to limit the present invention to such identifiers. The sensors 218 instruct the hereditary processing unit 216 that the data is ready for processing and that the processing is a search.

The hereditary processing unit 216 can utilize any combination of well-known processes to find intersections between the primitive objects in Set A with primitive objects in the other pre-existing sets (Sets N) stored in the preprogrammed relationships and/or the hereditary ontology 222 (step 608). For example, the hereditary processing unit 216 executes a comparison algorithm to identify all of the sets that include at least one object matching at least one of the primitive objects in the Set A (e.g., Set A f Sets N). The primitive objects from the Sets N that intersect with Set A and the primitive objects from Set A are aggregated into a new Set Y by the hereditary processing unit 216 (step 610). In other words, all of the primitive objects from Set A and all of the primitive objects from the identified Sets N intersecting with Set A are combined into a super Set Y. As would be appreciated by one skilled in the art, the Set Y can be created using any combination of known algorithms known in the art (e.g., the Dijkstra's algorithm). For example, a union or intersection operation can be performed with Set A and the Sets N that intersected with Set A (e.g., Set A∪Set N or Set A∩Set N). A unique identifier is associated with the new Set Y and Set Y is stored by the hereditary system 100. In accordance with an example embodiment of the present invention, the hereditary ontology 222 maintained by the hereditary server 102 is updated to include the new Set Y.

The hereditary processing unit 216 outputs Set Y back to the user experience 500 in a format readable by the user experience 500 (step 612). The user experience 500 can use the information included within the Set Y to aggregate all digital media files within the hereditary system 100 that include matches of portions of their hereditary sequence 400 with one or more primitive objects in Set Y. As would be appreciated by one skilled in the art, the user experience 500 can utilize any known methods of aggregation known in the art, utilizing the combination of devices in the hereditary system 100 (e.g., the hereditary server 102), to aggregate all the digital media files related to Set Y. As would be appreciated by one skilled in the art, the results can be sorted, filtered, weighted etc. using any method known in the art to provide the user with the best results to be displayed to the user via the user experience 500. In particular, digital media files matching the Set Y are presented within the user experience 500 by relevance of the original search terms and relevance to the user profile.

In accordance with an example embodiment of the present invention, prior to the hereditary processing unit 216 outputting Set Y to the user experience 500, the hereditary processing unit 216 generates a unique hereditary code 400 for the Set Y. The hereditary sequence 400 for Set Y is transmitted to the user experience 500 and it is utilized to populate the search results and/or perform other functions. In particular, Set Y can be transformed into a hereditary sequence 400 representing all of the primitive objects included within the super set (e.g., all the primitive objects of Set A and intersecting Sets N). The hereditary sequence 400 is resolved by the hereditary processing unit 216 by assigning independent representative ontologies to teach hereditary trait 404 within that hereditary sequence 400. As would be appreciated by one skilled in the art, each of the in independent representative ontologies are representative of n-number of primitive objects based on the predetermined hereditary ontology 222, such that the assigned independent representative ontology for each hereditary trait 404 includes the individual hereditary traits 404 for each of the primitive objects in Set Y through the inheritance map dictated by the predetermined hereditary ontology 222, such that all of the results pulled by the hereditary sequence 400 (e.g., by the user experience 500 and/or hereditary system 100) generated from Set Y will include all of the digital media files related to the primitive objects included in Set Y. For example, the representative ontology hereditary trait 404 value for the state of Georgia can inherit from the United State of America, or vice versa, and retrieve digital media files related to both Georgia and the United States of America.

In accordance with an example embodiment of the present invention, user interactions with the user experience 500 can be utilized by the hereditary system 100 or hereditary software to automatically update the user's hereditary profile displayed within the everything me function 506 of the user. In particular, each user interaction within the user experience 500 (e.g., executing the search S1) causes the hereditary system 100 to perform the interaction and then cause the hereditary sequence 400 associated with the user hereditary profile to be automatically updated based on the interaction. The user interactions with the user experience 500 can be represented by user actions SN. The user actions SN can include but are not limited to initiating search terms, capturing/saving digital media files (e.g., pictures, music, documents, etc.), creating networks 506, clicking the like function 512, clicking on the advertisement function 522, etc.

The hereditary sequence 400 for the user hereditary profile can be updated in a similar fashion as discussed with respect to FIGS. 6A, 6B and 8A. In particular, all user actions SN are transmitted to the hereditary processing unit 216 for mutation. The user actions SN received by the sensors 218 are subsequently passed to the hereditary processing unit 216 with instructions to network all incoming datatypes. The user actions SN are placed into Set A, similarly as the S1 discussed with respect to FIGS. 6A, 6B, and 8A. The hereditary processing unit 216 utilizes a combination of algorithms, as discussed with respect to FIGS. 6A, 6B, and 8A, to identify intersections with other Sets N. The primitive objects from the Sets N that intersect with Set A and the primitive objects from Set A are aggregated into a new Set T by the sensors, similarly as discussed with respect to Set Y with respect to FIGS. 6A, 6B, and 8A (e.g., Set T=Set A∪Set N). The resulting Set T is saved within the hereditary system 100. For example, the hereditary server 102 can be configured to store and maintain and manage all of the user hereditary profiles throughout the hereditary system 100. The hereditary processing unit 216 outputs Set T to be presented to the user through the user hereditary profile in the user experience 500.

Each of the functional elements (functional elements 504, 506, 508, 510, 512, 514, 516, 518, 520, 522, 524) discussed herein can include similar steps as discussed with respect to the pipeline of operations 600 and FIGS. 6A, 6B, and 8A. The FIGS. 8B-8F depict illustrative examples of other functional elements and varied pipeline operations 600 associated with those functional elements. In particular, the pipeline operations 600 for the functional elements depicted in FIGS. 7B-7F that follow the same basic operations as discussed with respect to FIG. 7A with some variation based on which functional element is being accessed.

Figure 8B:
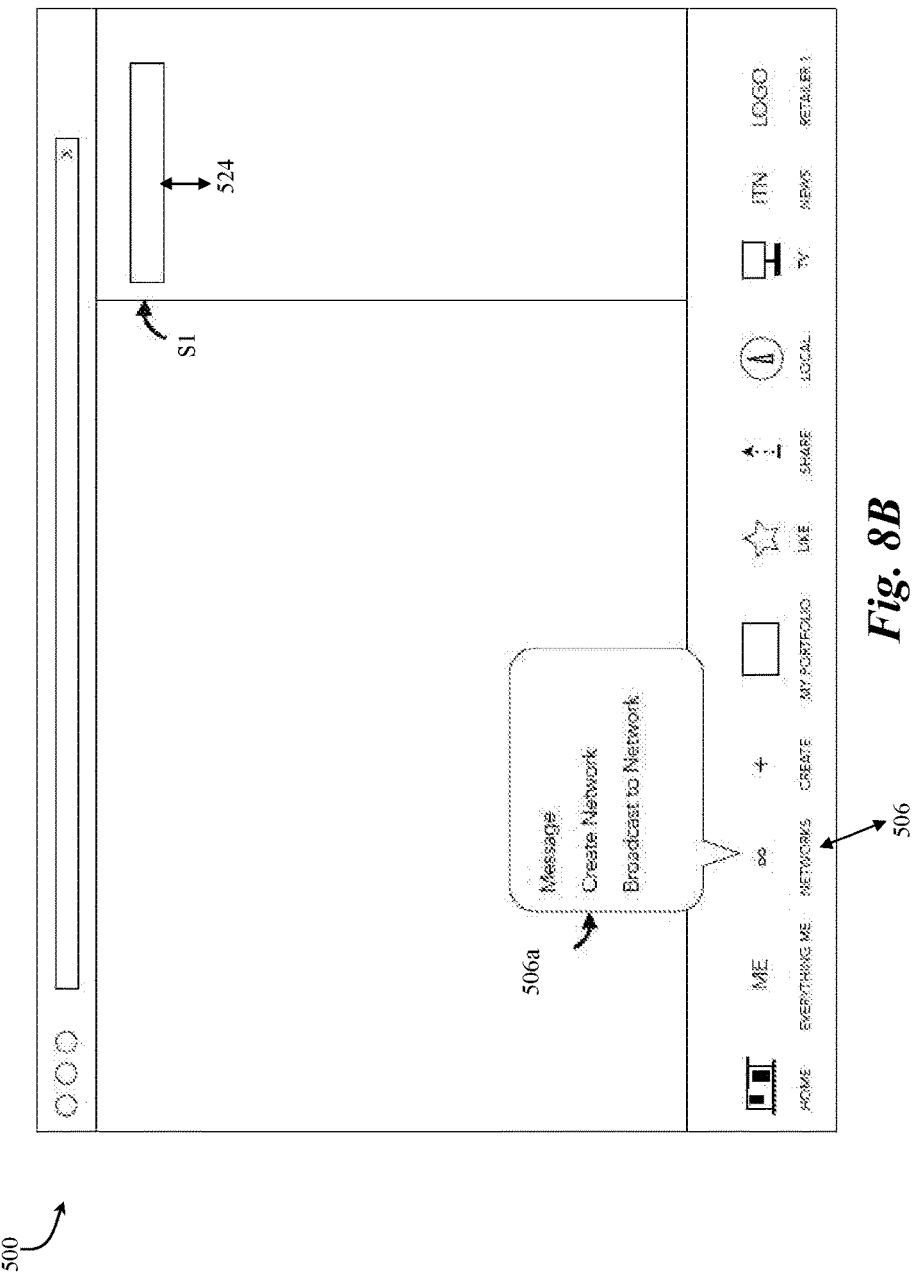

FIG. 8B depicts an example implementation of how a user can utilize the user experience 500 and the hereditary system 100 to create a network of information and digital media files (e.g., images, videos, websites, documents, etc.), a network for advertising, a network for copyright management to manage a large number of digital media files for copyright. The process for creating a network is similar to the process for conducting a search, as discussed with respect to FIGS. 6A, 6B, and 8A. In particular, the process starts with the user selecting the network function 506 and selecting create a network 506a from the menu presented in response to selecting the network function 506. Then the user will be presented with a search bar function 524 for entering a search term(s) or criteria for the network (S1). The term(s) S1 is transmitted from the user experience 500 to the sensors 218 with instructions to create a network. The term(s) S1 are parsed and placed into primitive Set A. The hereditary processing unit 216 utilizes a combination of algorithms to identify intersections between Set A other Sets N. The hereditary processing unit 216 combine all of the primitive objects from the intersecting Sets A and Sets N to create a new Set Y. The hereditary processing unit 216 creates a unique identifier for the Set Y, stores the Set Y, and outputs Set Y to the user experience 500. Set Y is presented to the user through the user experience 500 representing S1 as networked results.

Figure 8C:
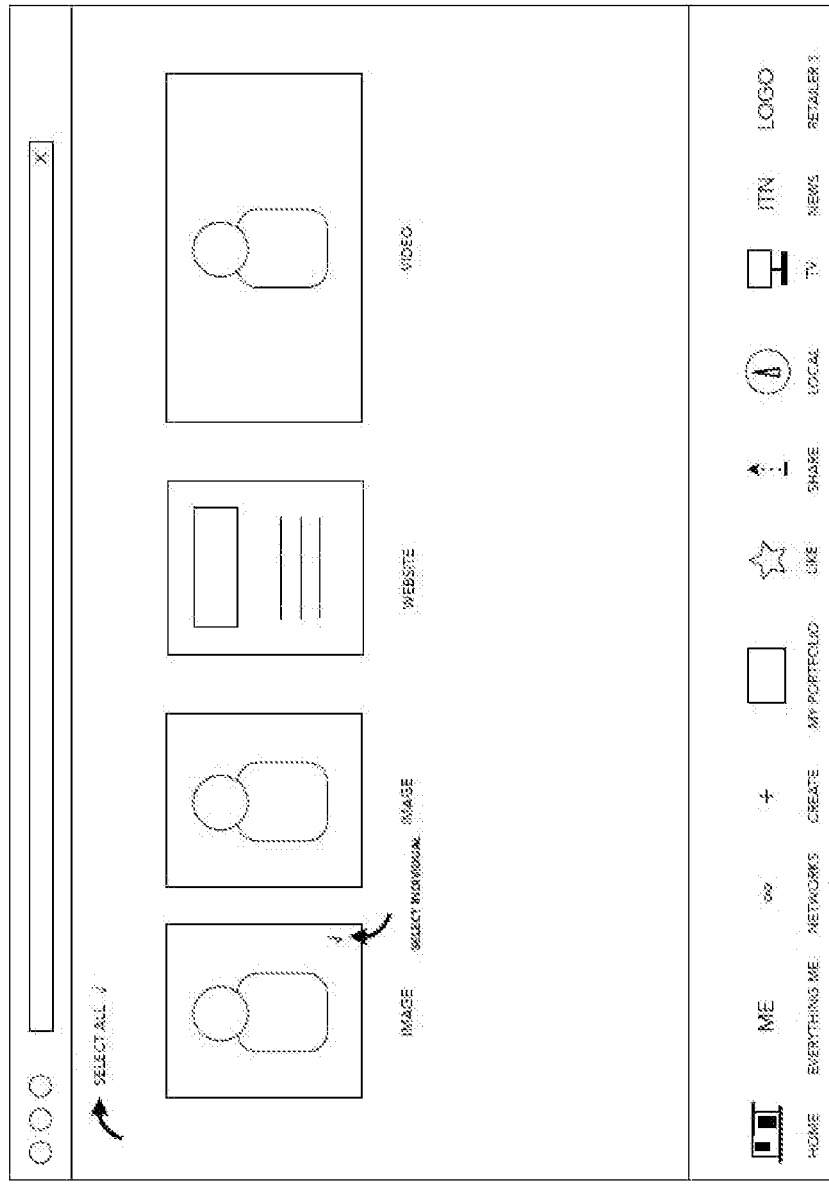

Alternatively to the search feature discussed with respect to FIG. 8A, the network feature allows the user to further edit the content included within the networked Set Y, as depicted in FIG. 8C. In particular, FIG. 8C depicts how the user can select individual and groups of images, videos, websites, or other content to be excluded within the networked Set Y. In accordance with an example embodiment of the present invention, once the user performs edits (e.g., selections for removal 506*b*) on the displayed networked Set Y, the hereditary system 100 updates Set Y accordingly by repeating the previous steps (e.g., steps 604-612). As would be appreciated by one skilled in the art, the networked Set Y can constantly be updated according to a user's preference (e.g., removals, additions, etc.). Additionally, Set Y may be a collection of Set Ys after a union of multiple separate searches S1*s*. In accordance with an example embodiment of the present invention, the Set Y is further associated with the user hereditary profile. In particular, the Set Y can additional saved to the user's hereditary profile. This enables the user linked to the user hereditary profile to also be linked to the created network included within the Set Y.

Figure 8D:
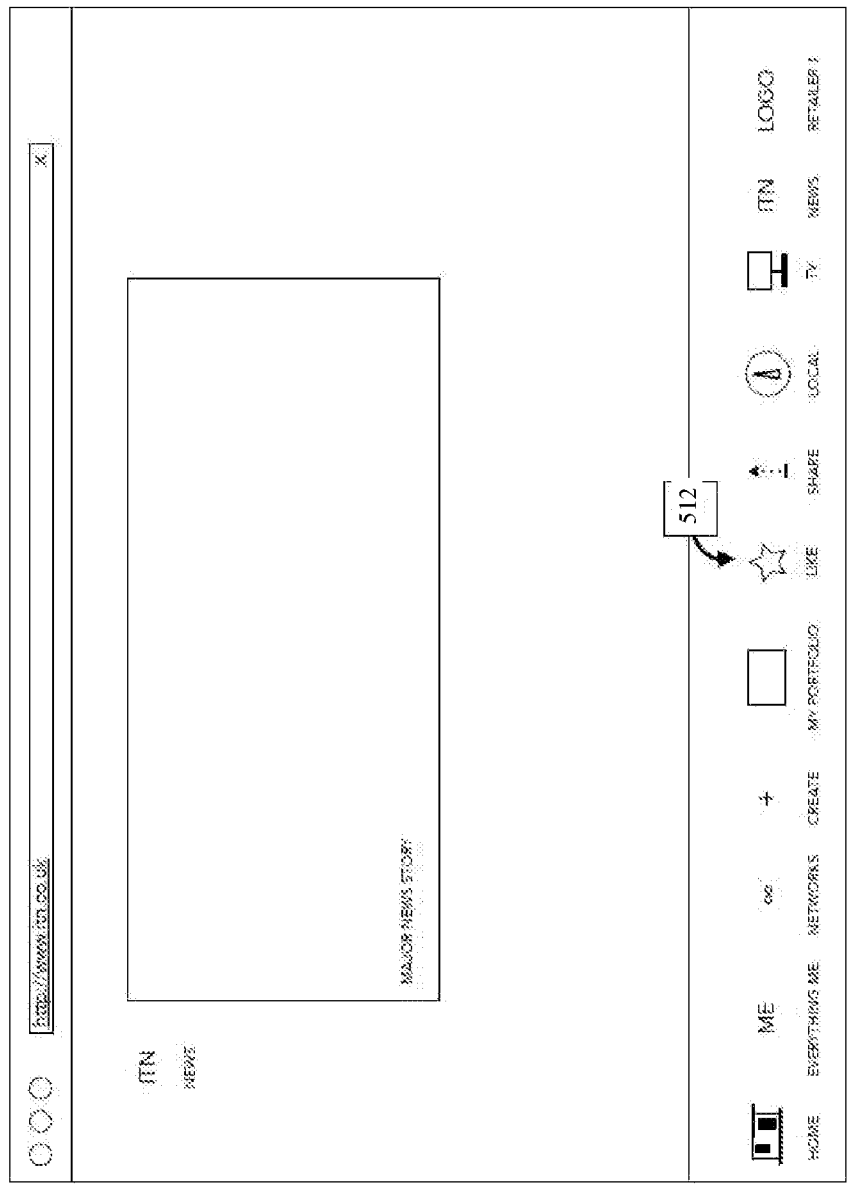

FIG. 8D depicts an example implementation of how a user can utilize the user experience 500 and the hereditary system 100 to "like" particular content that is currently displayed within the user experience 500. For example, as depicted in FIG. 8D, the user experience 500 can be displaying a major news story and the user can select the like function 512. Subsequent to selecting the like function 512, instructions will be sent to the hereditary processing unit 216 to modify other hereditary sequences 400 in the user experience 500 (e.g., a hereditary profile for the user's hereditary profile) to reflect the "liked" content (e.g., the major news story). The process for processing the like selection and updating the user hereditary profile is similar to the process for updating a user hereditary profile, as discussed with respect to FIGS. 6A, 6B, and 8A.

In particular, the process starts when the user views an image, video, website, or other digital media file on the user experience 500 and hits the like function 512. The digital media file(s) currently being view will be scanned by the hereditary system 100 for pre-existing hereditary sequences 400 and other metadata describing the digital media file(s). All of the hereditary sequences 400 and metadata for the displayed digital media file(s) are aggregated as a plurality of primitive objects into Set N. As would be appreciated by one skilled in the art, the digital media file(s) displayed in the user experience 500 can be scanned using any methodology known in the art. For example, the hereditary content can be scanned utilizing URLs, image checksums, scans, exifs, etc. Set N and instructions related to the like functional element 512 are transmitted to the hereditary server 102 for additional processing. Set N is placed into the framework set, Set A in cache. The hereditary processing unit 216 utilizes any combination of well-known algorithms to find intersections with other pre-existing Sets N maintained by the hereditary ontology 222 (e.g., stored in the preprogrammed relationships and/or the hereditary ontology 222). The primitive objects from the Sets N that intersect with Set A and the primitive objects from Set A are aggregated into a new Set Y by the hereditary processing unit 216. The resulting Set Y updates the user hereditary user profile 502 (e.g., the user's hereditary ontology) to reflect the user's indication of liking a particular piece or set of displayed content. As would be appreciated by one skilled in the art, the user's hereditary ontology can be updated utilizing a similar process as creating Set Y. In particular, a combination of algorithms can be applied to the primitive objects from Set Y and Set T to form a union of those primitive objects (e.g., the user's hereditary ontology=Set Y U Set T). Once Set T has been updated to include the content of Set Y, the set is transformed into a corresponding hereditary sequence 400, as discussed in greater detail herein.

Figure 8E:
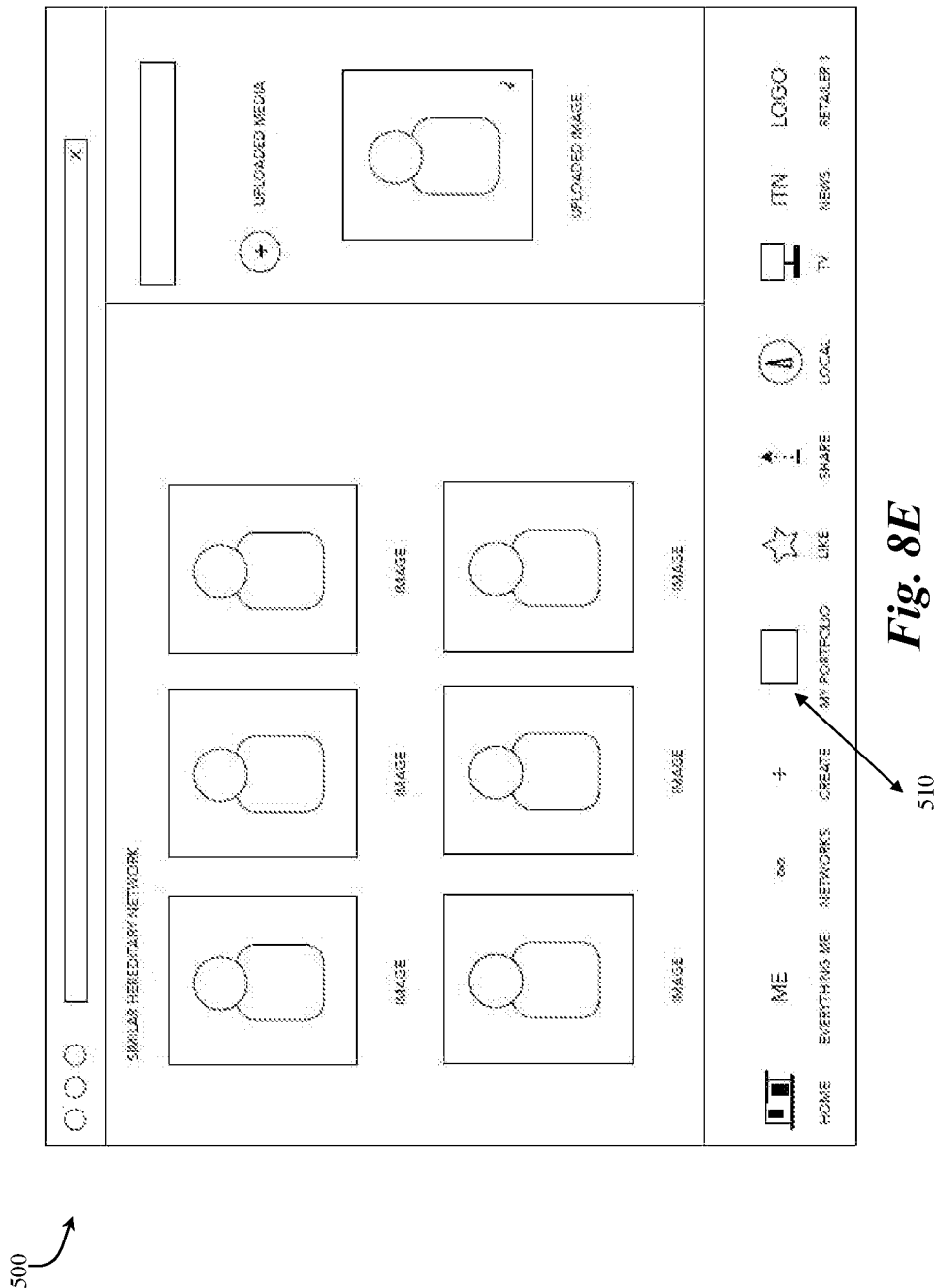

FIG. 8E depicts an example implementation of how a user can utilize the user experience 500 and the hereditary system 100 to create and modify a portfolio. The portfolio can include any combination of digital media files that the user wishes to share and/or manage (e.g., copyright management). For example, as depicted in FIG. 8E, the user experience 500 can include a portfolio of images owned and managed by the user under the "my portfolio" functional element 510. By selecting the "my portfolio" functional element 510, instructions will be sent to the hereditary processing unit 216 display the user's portfolio(s) stored in the hereditary system 100. The digital media files in each portfolio will be provided by the hereditary system 100 (e.g., the hereditary server 102) for display and modification via the user experience 500. The process for processing selection of the my portfolio function element 510 and updating content within the user's portfolio(s) is similar to the process for creating a network function 506, as discussed with respect to FIGS. 6A, 6B, and 8A-8D.

In particular, the process starts when the user selects the my portfolio functional element 510 in the user experience. Selecting the my portfolio function element 510 triggers instructions to be sent to the hereditary system 100 to retrieve the digital media files included within the user's portfolio(s). As would be appreciated by one skilled in the art, the digital media files can be stored locally (e.g., on the user device 104) or remotely (e.g., on the hereditary server 102). Once the digital media files are retrieved, the user can interact with the files using the user experience 500. The user interactions can include, but are not limited to, adding content, removing content, editing content, sharing content, revoking sharing of the content, etc. Each of the user interactions in the portfolio will cause the hereditary system 100 to perform corresponding actions to update the hereditary sequences 400 associated with the portfolio(s) and digital media file(s) being effected.

In an illustrative example, the user can upload a digital media file (e.g., a photo, video, or document) to their portfolio, as depicted in FIG. 8E. In accordance with an example embodiment of the present invention, whenever a digital media file is uploaded within the hereditary system 100, informational data about that digital media file is uploaded and encoded or embedded within the digital media file with a hereditary sequence 400. In particular, a combination of manually user entered data (e.g., subject matter, copyright owner, etc.) and automatically obtained metadata (e.g., scanned, checksums, etc.) is provided to the hereditary system 100 and the digital media file is encoded or embedded with a hereditary sequence 400 based on the informational data. The hereditary sequence 400 is created by the hereditary processing unit 216 by transforming the informational data associated with the digital media file into the hereditary sequence 400 using the pre-existing ontologies, as discussed in greater detail herein with respect to FIGS. 4, 6A, 6B, and 8A-8D.

Continuing with the illustrative example of FIG. 8E, in response to uploading the digital media file to a user's portfolio, the hereditary processing unit 216 will automatically create a subset of Set T representing information to be written to the user's hereditary ontology (e.g., the Set/hereditary sequence associated with the user's profile) based on the hereditary sequence 400 created for the digital media file. The Set T can be created by networking the hereditary sequence 400 of the uploaded digital media file with the existing hereditary network (e.g., devices within the hereditary system 100) associated with the portfolio. As would be appreciated by one skilled in the art, the Set T can be created utilizing a similar process as creating Set Y, as discussed with respect to FIGS. 6A, 6B, and 8A-8D. In particular, a combination of algorithms can be applied to the hereditary sequence 400 of the digital media file (e.g., Set A) and the hereditary sequence 400 for the existing portfolio (e.g., Set Y) to form a union of those primitive objects (e.g., Set T=Set A∪Set Y). Additionally, the resulting subset of Set T can be further modified to include a union with Set T (e.g., the hereditary code user's profile), as discussed in greater detail herein, such that the updated hereditary sequence 400 (e.g., subset of Set T) is the user's profile. Once the subset of Set T has been created, the subset is transformed into a corresponding hereditary sequence 400, as discussed in greater detail herein. In accordance with an example embodiment of the present invention, the user has a number of options for managing the digital media files within the portfolio. For example, the user can elect whether to display a digital media file publicly, privately, or list it for sale.

In accordance with an example embodiment of the present invention, if the user selects (auto-network) a digital media file(s), the hereditary processing unit 216 will receive instructions to network the digital media file(s) with hereditary similar digital media files, as discussed with respect to FIG. 8B. SN is a digital media file or group of files uploaded to the "my profile" page. SN is passed to the sensors 218 with instructions to network the digital media files. SN is placed into Set A. The hereditary processing unit 216 uses well known processes to find intersections with other hereditary sets. The hereditary processing unit 216 outputs Set Y which is a union of primitive objects from a broad range of sets. Set Y is written to Set T. Set Y is presented to the user through the user experience 500 representing SN as networked results.

In accordance with an example embodiment of the present invention, each of the Set Ys discussed with respect to FIGS. 6A, 6B, and 8A-8F can be transformed into hereditary sequences 400 to be used within the user experience and/or the hereditary system 100. In particular, the hereditary sequences 400 transformed from the Set Y will be Set T can be modified in a separate operation or can be included in the union of Sets A and Y and subsequently replaced by Set Y.

Figure 9:
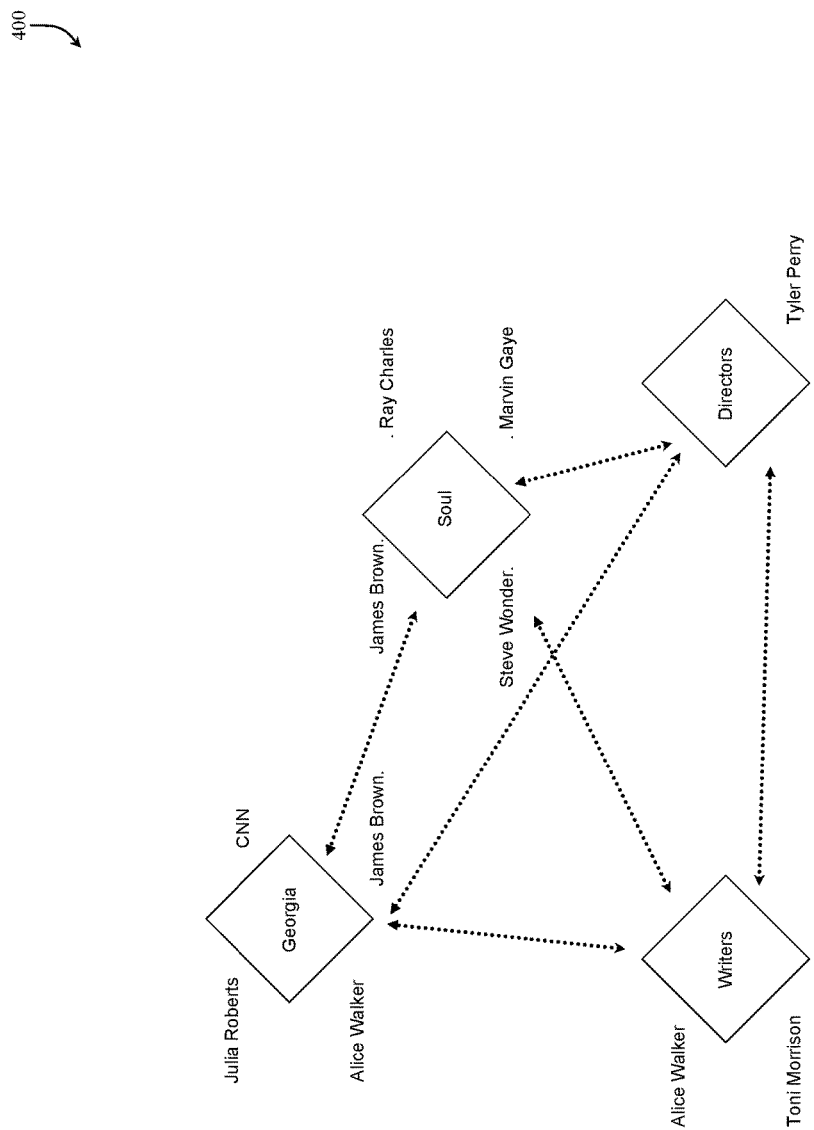
FIG. 9 is a diagrammatic illustration depicting a geometrically compressed network, in accordance with aspects of the invention.

In accordance with an example embodiment of the present invention, intersections from Set Y represent inheritance and networking relationships within the hereditary ontology 222 as derived by the hereditary processing unit 216. In particular, Set Y is the hereditary sequence 400 and inheritance and/or networking can be turned off as defined in the hereditary traits 404 (e.g., position seventeen) of the hereditary sequence 400. A single intersection (e.g., matching hereditary trait 404) represents a network and the network can be defined geometrically as a single node networked with other single nodes as depicted in FIG. 9. The network can be geometrically compressed into a new geometry (as depicted in FIG. 9) whereby each node is a complete network, networked with other networked nodes. For example, the hereditary processing unit 216 can read hereditary sequences 400 as geometry or as a string (e.g. Set Y {A1, B1, C4, . . . }) as an inheritance and communication network and/or search traversal order.

Figure 10:
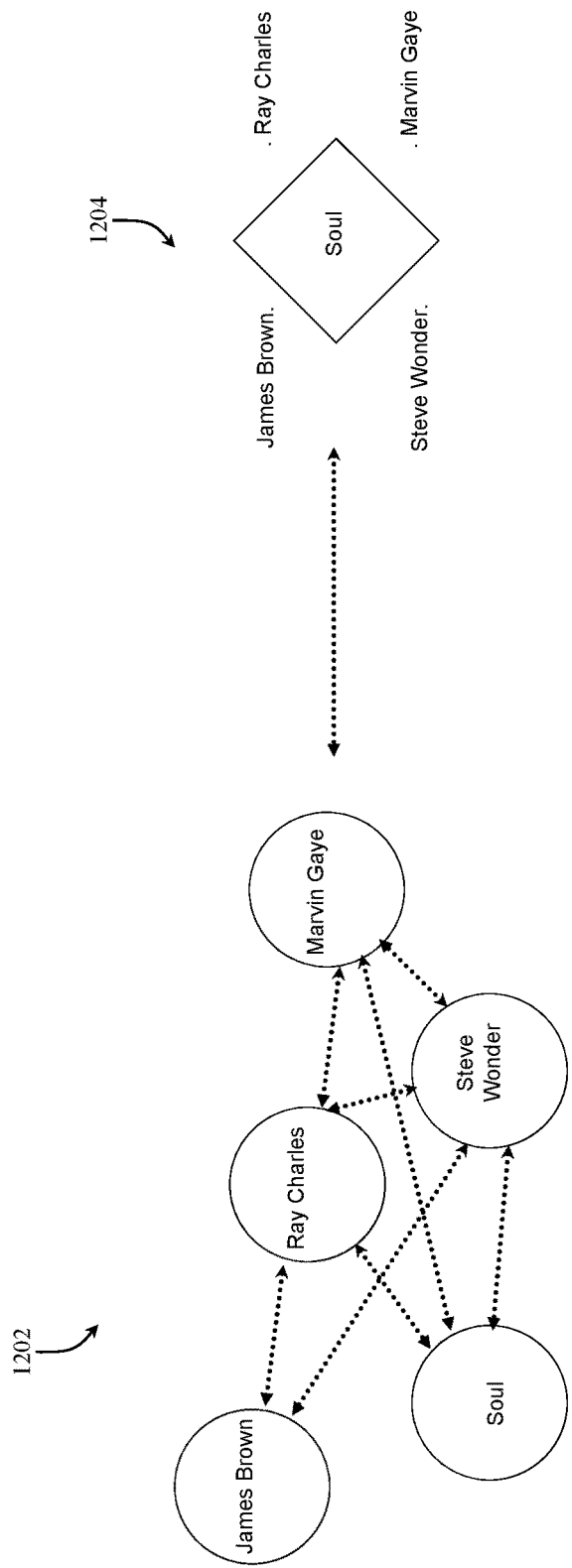
FIG. 10 is a diagrammatic illustration depicting an ontology mapping as it relates to a geometrically compressed network, in accordance with aspects of the invention.

In accordance with an example embodiment of the present invention, network for the single intersection can be defined in an ontology mapping 1202 as a plurality of nodes with each node networked with other nodes as depicted as network in FIG. 10. Each node in the hereditary ontology mapping 1202 is a network, networked with other network nodes, as discussed with respect to FIG. 4B. As would be appreciated by one skilled in the art, both the ontology mapping 1202 and the geometric compression 1204, as discussed with respect to FIG. 10 can be utilized to identify the same network of nodes in different matters, as depicted in FIG. 10.

An illustrative example of the operation of the present invention and improvements over existing technologies is disclosed herein. The illustrative example is not intended to limit the invention and is merely for statutory purposes to provide an example operation in accordance with the present invention. In the illustrative example, an Internet search term S1 is entered by a user into a hereditary searching system (e.g., a hereditary search system, hereditary search app, or hereditary operating system). In this illustrative example, the search term S1 is Ray Charles. As would be appreciated by one skilled in the art, the user can enter additional search terms to narrow the search and subsequent search results. For example, the user can enter additional search terms S2 . . . SN refer to a second search term thru N number of search terms. Each of the search terms S1-SN will be processed in the same manner by the hereditary processing unit 216, as discussed herein.

The search term S1 for "Ray Charles" is prepared by the user experience 500 and transmitted to the hereditary server 102 for processing. In particular, the user experience 500 can combine the search term S1 with instructions for the hereditary server 102 to perform processing for a search and to update a hereditary sequence 400 for a user's hereditary profile (e.g., representative of the user's hereditary ontology) to reflect interest in the searched term S1. The hereditary server 102 receives and preprocesses the received data input from the user experience 500 by identifying the search string, the hereditary sequence 400 for the user's hereditary profile, and instructions to perform a search and update the user profile hereditary sequence 400, as discussed in greater detail herein. The hereditary server 102 passes the appropriate data and instructions to the hereditary processing unit 216 for hereditary processing (e.g., generation, mutation, modification, etc. of hereditary sequences 400).

Figure 12:
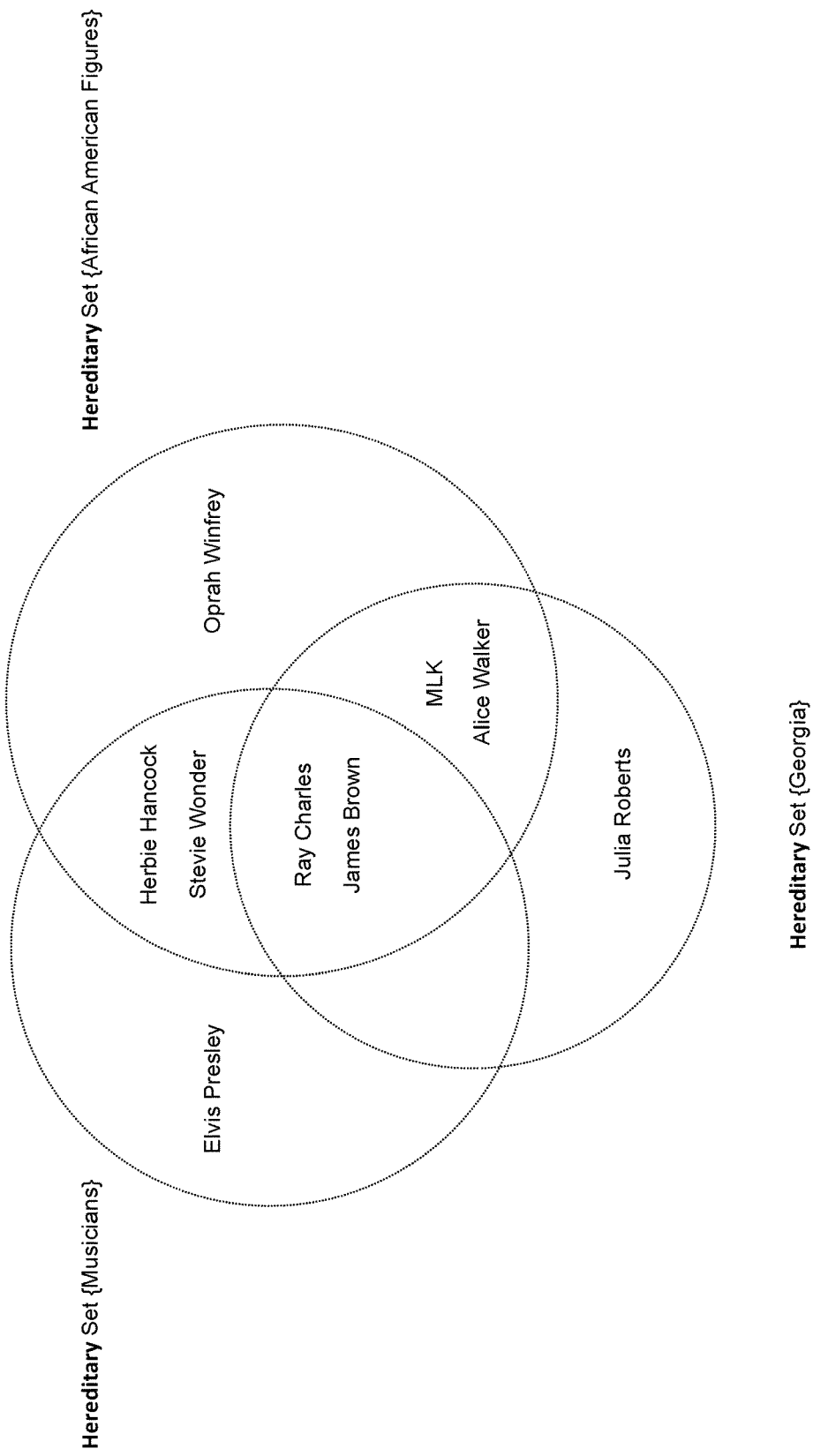
FIG. 12 is a diagrammatic illustration of an intersection of sets of primitive objects in accordance with aspects of the invention.

The hereditary processing unit 216 takes the object or primitive entity "Ray Charles" and adds it to a framework set, Set A. Thereafter the hereditary processing unit 216 compares all of the primitive objects (e.g., entities) in Set A (e.g., Ray Charles) to all of the primitive objects in a plurality of N number of Sets stored in the hereditary ontology 222 to identify intersections, as discussed in greater detail herein. For example, the hereditary processing unit 216 identifies that Set Musicians, Set African American Figures, and Set Georgia share the primitive object Ray Charles and thus are identified as intersecting. In the illustrative example, the Set Musicians includes primitive objects Ray Charles, Stevie Wonder, James Brown, Herbie Hancock, Elvis Presley, Set African American Figures includes primitive objects Ray Charles, Stevie Wonder, Oprah Winfrey, James Brown, Herbie Hancock, Alice Walker, and Set Georgia includes primitive objects Ray Charles, Julia Roberts, James Brown, Alice Walker. The hereditary processing unit 216 performs an intersection or union (according to received instructions) of the identified intersecting sets and Set A to create a new Set Y. In particular, the hereditary processing unit 216 combines the primitive objects from Set A (Ray Charles) and all of the primitive objects from Sets N (Musicians, African American Figures, and Georgia) into Set Y. Therefore, the resulting Set Y includes primitive objects Ray Charles, Stevie Wonder, Oprah Winfrey, Julia Roberts, James Brown, Herbie Hancock, Elvis Presley, Alice Walker. FIG. 12 depicts the Sets and their respective intersections representing genetic or hereditary inheritance and networking (these intersections are interpreted by the hereditary processing unit 216 as networking and inheritance instructions). Therefore, the original Set A for Ray Charles inherits all of the primitive objects from Sets Musicians, African American Figures, and Georgia.

Figure 11:
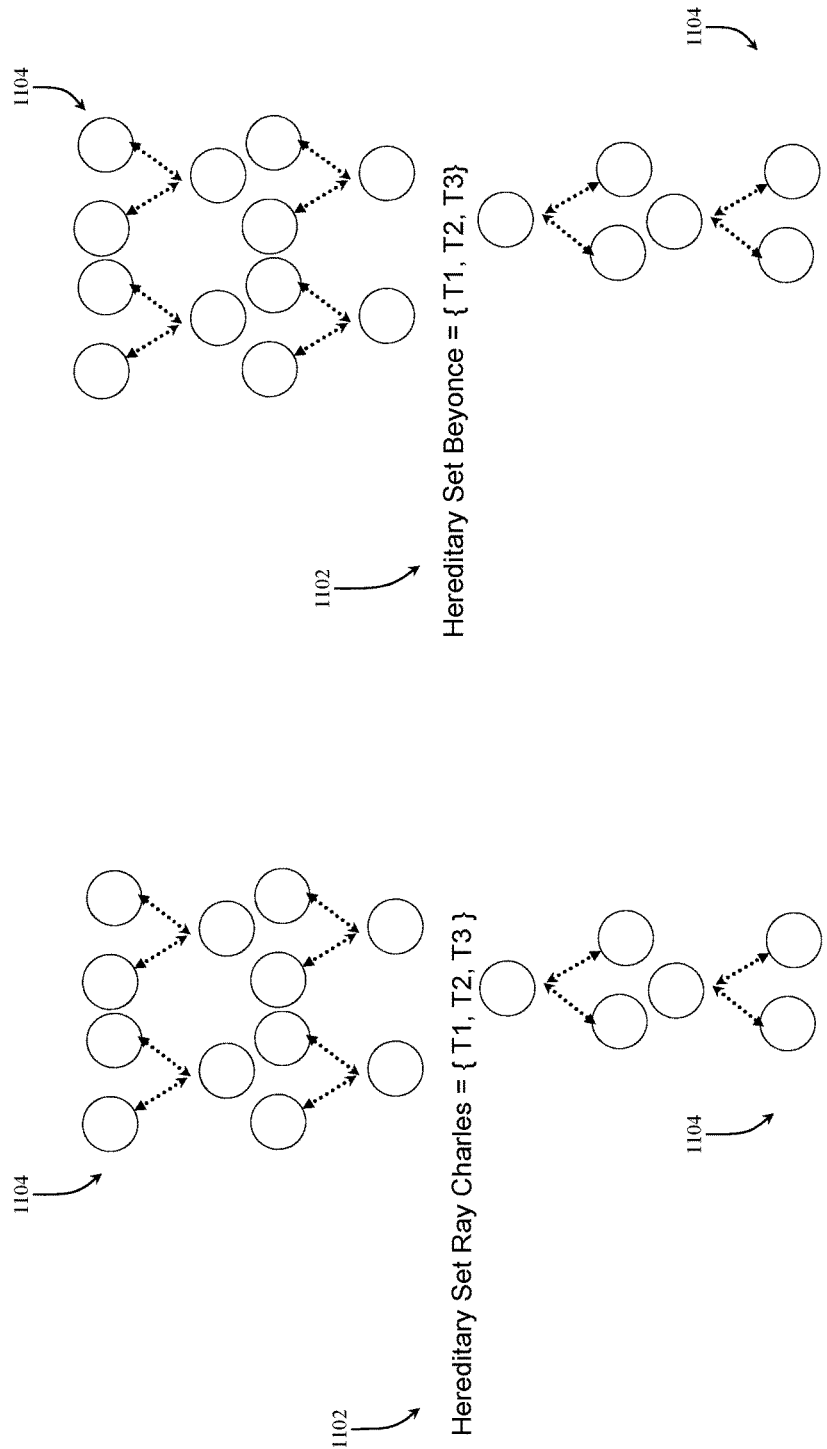
FIG. 11 is a diagrammatic illustration depicting inheritance as it relates to the present invention.

Continuing with FIG. 9, each node within a hereditary network for Ray Charles, as defined by the hereditary ontology 222, may represent a network node or hereditary trait 404 within the hereditary sequence 400. When hereditary trait 404 or nodes are expressed as a heredity set they may be illustrated as a set with hereditary networks, as depicted in FIG. 11. In particular, FIG. 11 depicts how the hereditary sets 1102 for Ray Charles and Beyonce are represented as a network through graphical relationships. As depicted in FIG. 11, each set includes a plurality of primitive objects or primitive entities (e.g., T1, T2, T3) that inherit from other primitive objects or sets 1104. Each of the mapped relationships (e.g., of primitive objects 1102 and 1104) from each object or primitive entity within a set inherits from the other primitive objects or entities at their nodal intersection. For example, each object T1, T2, T3 in the set 1102 for Ray Charles also inherits information from the other sets 1104 such that a search performed for Ray Charles can return content related to any of the primitive objects in sets 1102 and 1104.

Continuing with the illustrative example, the hereditary processing unit 216 associates a unique identifier with the created Set Y and stores the Set Y in the hereditary ontology 222. By saving the Set Y to the hereditary ontology 222, each of the other Sets N that are related to Set Y (e.g., through inheritance) will be updated to reflect the new relationships with Set Y, such that the hereditary ontology 222 is optimized over time. The hereditary processing unit 216 takes Set Y and transforms the set into a hereditary sequence 400 such that the hereditary sequence 400 will include hereditary traits 404 to identify and define digital media files associated with any of the primitive objects or primitive entities in Set Y will also include copyright, advertising, etc. instructions for every object included in Set Y. In particular, the hereditary processing unit 216 transforms the Set Y into a hereditary sequence 400 by utilizing the graphical inheritance defined in the hereditary ontology 222 to define each of the hereditary traits 404 based to define all of the primitive objects in the Set Y. Utilizing inheritance allows each hereditary trait 404 in the hereditary sequence 400 to act as a representation of N-number of primitive objects with each position being its own independent representative ontology. The hereditary sequence 400 for Set Y is returned to the user experience 500 and the user experience 500 can be utilized the hereditary sequence 400 to populate all digital media files associated with any of the primitive objects in Set Y. As would be appreciated by one skilled in the art, this same process can be applied for any inputs into the user experience 500. For example, the inputs can be an Internet search terms, webpages, image recognition data, metadata from text, documents, audio files, databases, programming archives, XML, etc.

Figure 13:
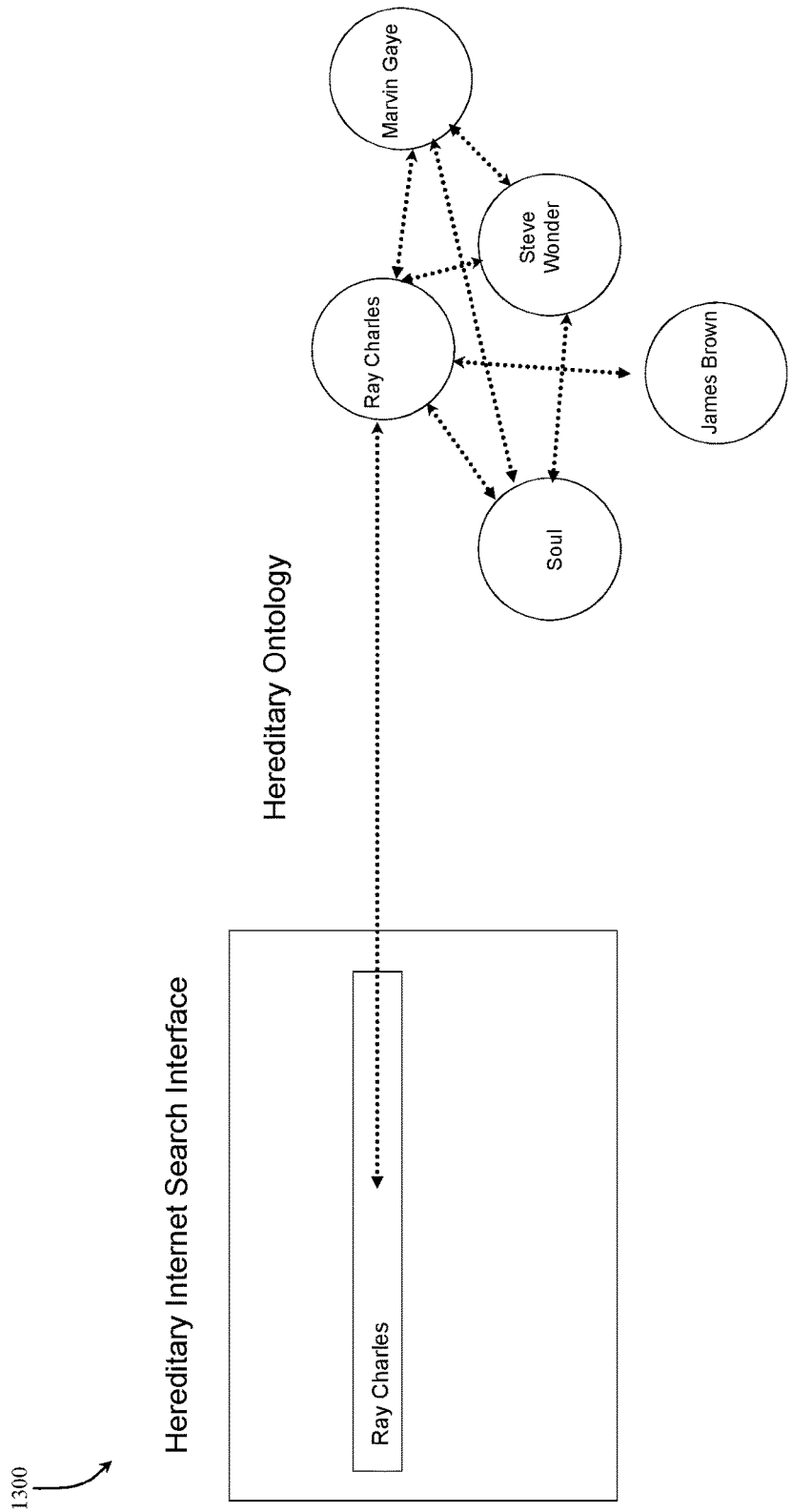
FIG. 13 is a hereditary search interface for use in accordance with aspects of the invention.

FIG. 13 depicts a hereditary search interface 1300, consistent with a standard web search interface illustrating a search term entered into a search bar and its resolution to a hereditary network node as processed by the hereditary processing unit 216. The node represents a network created by the search term and the resulting hereditary sequence 400 generated by the hereditary processing unit 216 and provides inherent traversal of the network. In accordance with an example embodiment of the present invention, continuing the search example, the results provided by Set Y can be varied based on the original search terms provided by the user in the user experience 500. For example, narrow search terms can facilitate narrow search results by the hereditary processing unit 216 re-arranging the traversal order of the hereditary ontology 222 mapping. The search term can be processed at varying nodes or an optional originating positon of the associated ontology mapping, such that the search results will be targeted to the appropriate subject matter of Ray Charles from the rest of the network associated with Ray Charles (e.g., Marvin Gaye, Soul, Stevie Wonder, James Brown), as depicted in FIG. 13. The varying nodes and optional position is one methodology for sorting the search results provided by Set Y. As would be appreciated by one skilled in the art, additionally, filtering and sorting algorithms can be applied to further define how the results of Set Y are populated in the user experience 500.

Figure 14:
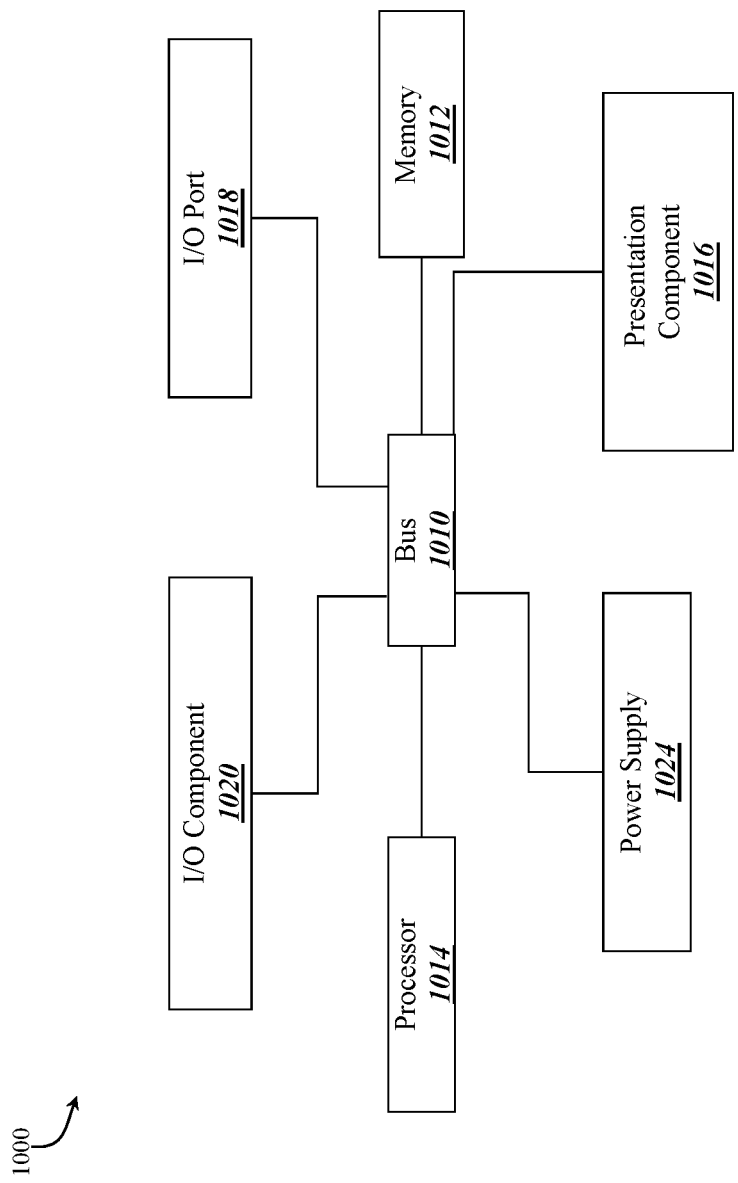
FIG. 14 is a diagrammatic illustration of a high level architecture for implementing processes in accordance with aspects of the invention.

Any suitable computing device can be used to implement the computing devices 200, 102, 104, 106 and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 1000 is depicted in FIG. 14. The computing device 1000 is merely an illustrative example of a suitable computing environment and in no way limits the scope of the present invention. A "computing device," as represented by FIG. 14, can include a "workstation," a "server," a "laptop," a "desktop," a "hand-held device," a "mobile device," a "tablet computer," or other computing devices, as would be understood by those of skill in the art. Given that the computing device 1000 is depicted for illustrative purposes, embodiments of the present invention may utilize any number of computing devices 1000 in any number of different ways to implement a single embodiment of the present invention. Accordingly, embodiments of the present invention are not limited to a single computing device 1000, as would be appreciated by one with skill in the art, nor are they limited to a single type of implementation or configuration of the example computing device 1000.

The computing device 1000 can include a bus 1010 that can be coupled to one or more of the following illustrative components, directly or indirectly: a memory 1012, one or more processors 1014, one or more presentation components 1016, input/output ports 1018, input/output components 1020, and a power supply 1024. One of skill in the art will appreciate that the bus 1010 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 14 is merely illustrative of an exemplary computing device that can be used to implement one or more embodiments of the present invention, and in no way limits the invention.

The computing device 1000 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 1000.

The memory 1012 can include computer-storage media in the form of volatile and/or nonvolatile memory. The memory 1012 may be removable, non-removable, or any combination thereof. Exemplary hardware devices are devices such as hard drives, solid-state memory, optical-disc drives, and the like. The computing device 1000 can include one or more processors that read data from components such as the memory 1012, the various I/O components 1016, etc. Presentation component(s) 1016 present data indications to a user or other device. Exemplary presentation components include a display device, speaker, printing component, vibrating component, etc.

The I/O ports 1018 can enable the computing device 1000 to be logically coupled to other devices, such as I/O components 1020. Some of the I/O components 1020 can be built into the computing device 1000. Examples of such I/O components 1020 include a microphone, joystick, recording device, game pad, satellite dish, scanner, printer, wireless device, networking device, and the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about" and "approximately" are intended to cover variations that may existing in the upper and lower limits of the ranges of subjective or objective values, such as variations in properties, parameters, sizes, and dimensions. In one non-limiting example, the terms "about" and "approximately" mean at, or plus 10 percent or less, or minus 10 percent or less. In one non-limiting example, the terms "about" and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A hereditary processing system for a self-organizing hereditary internet, the system comprising:
   at least a central processing unit (CPU), a hereditary processing unit (HPU), and a memory;
   the HPU comprising a hereditary ontology comprising hereditary networks further comprising hereditary digital media files embedded with hereditary keys and hereditary sequences, and well-known primitive objects and preprogrammed sets, each of the preprogrammed sets, Sets N, comprising a plurality of primitive objects, wherein each primitive object of the well-known primitive objects and the plurality of primitive objects is encoded with a hereditary sequence comprising hereditary traits comprising alphanumeric definitions for primitive objects associated with character representations forming hereditary terminus classifications and hereditary root classifications;
   the HPU configured to:
      receive a digital media file;
      receive instructions to perform hereditary processing on the digital media file;
      determine a datatype from the digital media file, using the hereditary ontology comprising hereditary networks, by using sensors to parse digital media file data and the instructions and identify existing data types matching digital media file data and designate new data types for digital media file data not matching existing data types;
      create a new Set A comprising one or more primitive objects of the well-known primitive objects, based on information derived from the digital media file and based on the datatype determined from the digital media file;
      combine at least one of the preprogrammed set Sets N, comprising a plurality of primitive objects, with the Set A to create a new superset, Set Y, thereby creating a self-assembling hereditary network wherein each new component hereditary sequence is encoded immediately to link to an existing hereditary network and the digital media file data included therein are linked to the hereditary digital media files via respective hereditary sequences; and
      apply one or more heuristics to create, modify, and/or embed a hereditary sequence or hereditary data to transform the Set Y into a plurality of outputs comprising at least one of a hereditary sequence embedded in the digital media file, a hereditary sequence separately existing from the digital media file, a hereditary key, a hereditary bytecode, a hereditary cryptographic cipher and key, a hereditary hologram, and a hereditary network.

2. The system of claim 1, wherein being configured to combine the at least one of the preprogrammed Sets N, comprising a plurality of primitive objects, further comprises the HPU configured to:
   compare the one or more primitive objects of the Set A with the plurality of primitive objects of each of the preprogrammed Sets N;
   identify at least one matching primitive object from the at least one of the preprogrammed Sets N; and
   transform the Set A into the Set Y by adding the at least one of the preprogrammed Sets N, comprising a plurality of primitive objects, to the one or more primitive objects of the Set A.

3. The system of claim 2, wherein being configured to identify at least one matching primitive object comprises being configured to perform an intersection operation between the one or more primitive objects of the Set A and the at least one of the preprogrammed Sets N, comprising a plurality of primitive objects, using an operation Set A∩Set N.

4. The system of claim 3, wherein being configured to transform the Set A into the Set Y comprises being configured to perform an union operation between the Set A and the at least one of the preprogrammed Sets N, comprising a plurality of primitive objects, using an operation Set Y=Set A∪Set N.

5. The system of claim 4, wherein being configured to transform the Set Y into a plurality of outputs further comprises being configured to perform inheritance and compression operations on the plurality of primitive objects in the Set Y to form a unique output of hereditary traits each with independent hereditary ontologies.

6. The system of claim 1, further comprising an interface, a hereditary server, an internet device, a user device, and at least one telecommunications network, wherein the HPU is configured to enable the user to create, modify, customize, broadcast, hereditary sequences that are stored and used separately from the digital media file, wherein the HPU builds hereditary sequences for the digital media file from inheritance and existing hereditary sequences are dynamic, mutating and evolving to incorporate primitive objects associated with new hereditary sequences representing any new digital media file, updating each time new data from a new hereditary sequence is added so as to refer to incorporated hereditary sequences, creating relationships or nodes linking data in graphs in a storage structure comprising a database.

7. The system of claim 1, wherein the digital media file is one of an image, a document, a video file, an audio file, text, or an Internet search term.

8. The system of claim 1, wherein the hereditary ontology is configured to operate as a classification system that stores classifications, types, relationships, descriptions, instructions, identifications, and nomenclature, and wherein the one or more heuristics determine a hereditary sequence for a search term wherein the hereditary sequence is searchable utilizing the inherited relationships from the hereditary ontology of hereditary traits to search content directly by traversing hereditary sequences in the hereditary ontology rather than searching indirectly by webpages.

9. The system of claim 1, wherein the one or more heuristics determine a hereditary sequence for the digital media file, wherein hereditary sequences are configured to link digital media files to other digital media files sharing sets of common hereditary traits.

10. The system of claim 9, wherein the one or more heuristics determine a hereditary sequence for the digital media file relating to networking abilities.

11. The system of claim 9, wherein the one or more heuristics determine a hereditary sequence for the digital media file relating to broadcasting abilities.

12. The system of claim 9, wherein the one or more heuristics determine a hereditary sequence for the digital media file relating to licensing abilities, wherein hereditary traits of the hereditary sequence identify whether licensing is enabled.

13. The system of claim 1, wherein the one or more heuristics comprises resolving at least one output of the plurality of outputs through at least one of ontological graphs and geometric compression.

14. A non-transitory computer-readable medium comprising computer executable instructions, that when executed, cause one or more processors to:
   create, using a hereditary processing unit (HPU), a memory, and sensors, a hereditary sequence natively compiled, interpreted, encoded or embedded into digital media files through a hereditary network, the hereditary sequence comprising:
   a plurality of hereditary root classifications, the plurality of root classifications each comprising a plurality of hereditary traits;
   wherein each of the plurality of hereditary traits are two character representations for descriptors of digital media file locations;
   wherein the hereditary sequence is encoded immediately to link to the hereditary network and digital media file location data included therein, adding inherited relationships from the hereditary ontology of the hereditary traits, updating the hereditary network, updating the hereditary network when the hereditary sequence is added so as to refer to incorporated hereditary sequences.

15. The non-transitory computer-readable medium of claim 14, wherein the hereditary root classifications comprise copyright, commerce, and communication.

16. The non-transitory computer-readable medium of claim 15, wherein the hereditary root classification of copyright comprises hereditary traits of a character representation for subject matter, a character representation for ontological position, a character representation for copyright owner, a character representation for media type, a character representation for hereditary system identifier, a character representation for license, a character representation for keywords, a character representation for semantics, a character representation for educational rank, a character representation for social rank, a character representation for content ranking, and a character representation for revocation rules, and wherein the hereditary root classification of copyright enables receiving a checksum, running the checksum against the database, and determining that any matching hereditary sequences comprising hereditary traits in the database indicate infringement.

17. The non-transitory computer-readable medium of claim 15, wherein the hereditary root classification of commerce comprises hereditary traits of a character representation for advertising, a character representation for syndication, a character representation for fees, and a character representation for payment methods.

18. The non-transitory computer-readable medium of claim 15, wherein the hereditary root classification of communication comprises hereditary traits of a character representation for networking rules, a character representation for broadcasting rules, a character representation for inheritance rules, a character representation for mutations, a character representation for compatible networks, and a character representation for blocked networks.

19. A method for creating or mutating a hereditary sequence for a digital media file used in a self-organizing hereditary internet, the method comprising:

receiving, using at least one central processing unit (CPU), a memory, an interface, a hereditary server, and at least one telecommunications network, input data and instructions for creating or mutating the hereditary sequence;

parsing, using sensors, the input data and the instructions; and creating or mutating the hereditary sequence using a specialized hereditary processing unit (HPU) and based on the input data and the instructions, the creating or mutating the hereditary sequence further comprising:

the HPU identifying one or more primitive objects in the input data matching well-known primitive objects stored in a hereditary ontology configured to operate as a classification system that stores classifications, types, relationships, descriptions, instructions, identifications, and nomenclature;

the HPU identifying one or more processes to be performed on the hereditary sequence based on the instructions;

the HPU creating or mutating one or more hereditary traits within the hereditary sequence, the hereditary traits comprising alphanumeric character representations for the one or more primitive objects and the one or more processes to be performed;

wherein each of the hereditary traits inherit relationships between the one or more primitive objects and a plurality of primitive objects is stored in the hereditary ontology and the hereditary ontology is updated to reflect the creating or mutating the one or more hereditary traits; and the HPU natively compiling, encoding or embedding the created or mutated hereditary sequence into a digital media file associated with the hereditary sequence in such a way that the hereditary sequence is networked to other digital media files sharing hereditary traits of the hereditary sequence and is searchable utilizing the inherited relationships from the hereditary ontology of the hereditary traits by traversing hereditary sequences in the hereditary ontology; and returning the encoded embedded digital mediate file as a hereditary digital media file and hereditary network.

20. The method of claim 19, wherein the hereditary traits are each organized into one of three hereditary root classifications, the three hereditary root classifications comprising copyright, commerce, and communication.

21. The method of claim 20, wherein the hereditary root classification of copyright comprises the hereditary traits of a character representation for subject matter, a character representation for ontological position, a character representation for copyright owner, a character representation for media type, a character representation for hereditary system identifier, a character representation for license, a character representation for keywords, a character representation for semantics, a character representation for educational rank, a character representation for social rank, a character representation for content ranking, and a character representation for revocation rules, and wherein the hereditary root classification of copyright enables receiving a checksum, running the checksum against the database, and determining that any matching hereditary sequences comprising hereditary traits in the database indicate infringement.

22. The method of claim 20, wherein the hereditary root classification of commerce comprises the hereditary traits of a character representation for advertising, a character representation for syndication, a character representation for fees, and a character representation for payment methods.

23. The method of claim 20, wherein the hereditary root classification of communication comprises the hereditary traits of a character representation for networking rules, a character representation for broadcasting rules, a character representation for inheritance rules, a character representation for mutations, a character representation for compatible networks, and a character representation for blocked networks.

* * * * *